United States Patent
Holenstein et al.

(10) Patent No.: US 9,904,721 B1
(45) Date of Patent: Feb. 27, 2018

(54) SOURCE-SIDE MERGING OF DISTRIBUTED TRANSACTIONS PRIOR TO REPLICATION

(71) Applicant: Gravic, Inc., Malvern, PA (US)

(72) Inventors: Paul J. Holenstein, Downingtown, PA (US); Bruce D. Holenstein, Media, PA (US); John R. Hoffmann, Kennett Square, PA (US)

(73) Assignee: Gravic, Inc., Malvern, PA (US)

( * ) Notice: Subject to any disclaimer, the term of this patent is extended or adjusted under 35 U.S.C. 154(b) by 73 days.

(21) Appl. No.: 14/942,481

(22) Filed: Nov. 16, 2015

Related U.S. Application Data

(63) Continuation of application No. 14/163,362, filed on Jan. 24, 2014, now abandoned.

(60) Provisional application No. 61/756,831, filed on Jan. 25, 2013.

(51) Int. Cl.
*G06F 17/30* (2006.01)

(52) U.S. Cl.
CPC .. *G06F 17/30578* (2013.01); *G06F 17/30377* (2013.01)

(58) Field of Classification Search
CPC .................................................. G06F 17/30575
USPC .................. 707/610, 615, 616, 634, 641
See application file for complete search history.

(56) References Cited

U.S. PATENT DOCUMENTS

| | | | |
|---|---|---|---|
| 6,122,630 A | 9/2000 | Strickler et al. | |
| 6,662,196 B2 | 12/2003 | Holenstein et al. | |
| 6,745,209 B2 | 6/2004 | Holenstein et al. | |
| 7,003,531 B2 | 2/2006 | Holenstein et al. | |
| 7,069,271 B1* | 6/2006 | Fadel | G06Q 10/00 705/26.62 |
| 7,103,586 B2 | 9/2006 | Holenstein et al. | |
| 7,136,354 B2* | 11/2006 | Fujita | H04L 45/02 370/232 |
| 7,177,866 B2 | 2/2007 | Holenstein et al. | |
| 7,321,904 B2 | 1/2008 | Holenstein et al. | |

(Continued)

OTHER PUBLICATIONS

Jim Gray, Andreas Reuter, Transaction Processing: Concepts and Techniques, pp. 18-21; Morgan Kaufmann Publishers, 1993, 6 pages.

(Continued)

*Primary Examiner* — Robert Beausoliel, Jr.
*Assistant Examiner* — Alexandria Bromell
(74) *Attorney, Agent, or Firm* — Panitch Schwarze Belisario & Nadel LLP

(57) ABSTRACT

Methods and apparatus are provided for performing source-side merging of distributed transactions prior to replication, wherein a distributed transaction occurs at a plurality of nodes. A first node includes a database and an audit trail that stores database change events from the database of the first node. One or more other nodes each include a database and an audit trail that stores database change events from the database of the respective node. In use, a transaction is initiated which updates the database of the first node and the database at one or more of the other nodes. The database updates are captured in the audit trails of the respective nodes involved with the transaction. The first node receives and merges the database change events from the audit trails of each of the nodes involved in the transaction. The merged database change events are replicated via a replication engine only from the first node.

10 Claims, 41 Drawing Sheets

Source-Side Merging of Distributed Transactions

(56) References Cited

U.S. PATENT DOCUMENTS

| | | | | |
|---|---|---|---|---|
| 7,379,983 | B2* | 5/2008 | Zaharias | G06F 9/4405 709/220 |
| 7,469,255 | B2* | 12/2008 | Kusterer | G06F 17/30961 707/707 |
| 7,523,110 | B2 | 4/2009 | Holenstein et al. | |
| 7,577,701 | B1* | 8/2009 | Johns | H04L 41/0213 709/203 |
| 7,603,389 | B2 | 10/2009 | Holenstein et al. | |
| 7,613,740 | B2 | 11/2009 | Holenstein et al. | |
| 7,626,925 | B1* | 12/2009 | Sivabalan | H04J 3/14 370/228 |
| 7,688,758 | B2* | 3/2010 | Denby | H04L 41/12 370/254 |
| 7,739,237 | B2 | 6/2010 | Holenstein et al. | |
| 7,801,851 | B2 | 9/2010 | Holenstein et al. | |
| 7,853,561 | B2 | 12/2010 | Holenstein et al. | |
| 7,882,062 | B2 | 2/2011 | Holenstein et al. | |
| 7,949,640 | B2 | 5/2011 | Holenstein et al. | |
| 7,962,458 | B2 | 6/2011 | Holenstein et al. | |
| 8,086,661 | B2 | 12/2011 | Holenstein et al. | |
| 8,117,154 | B2 | 2/2012 | Holenstein et al. | |
| 8,127,252 | B2* | 2/2012 | McKeon | G06F 9/4443 715/853 |
| 8,229,579 | B2* | 7/2012 | Eldridge | G05B 15/02 700/31 |
| 8,250,029 | B2 | 8/2012 | Holenstein et al. | |
| 8,301,593 | B2 | 10/2012 | Hoffmann et al. | |
| 8,458,150 | B2 | 6/2013 | Holenstein et al. | |
| 8,584,046 | B2* | 11/2013 | Lee | G06F 17/2211 707/797 |
| 8,620,862 | B2 | 12/2013 | Holenstein et al. | |
| 8,639,723 | B2* | 1/2014 | Sedky | G06F 3/1203 358/1.1 |
| 9,002,899 | B2* | 4/2015 | Lambov | G06F 17/148 703/17 |
| 9,400,815 | B2* | 7/2016 | Poppitz | G06F 17/30498 707/707 |
| 9,507,858 | B1* | 11/2016 | Lerner | G06F 17/30722 707/707 |
| 2003/0120662 | A1* | 6/2003 | Vishik | G06F 17/30734 707/707 |
| 2003/0182310 | A1* | 9/2003 | Charnock | G06F 17/30716 707/707 |
| 2003/0210693 | A1* | 11/2003 | Grabner | H04L 12/4633 370/392 |
| 2004/0010538 | A1* | 1/2004 | Miller | G06F 9/5061 709/201 |
| 2004/0120324 | A1* | 6/2004 | Hughes | H04L 12/5601 370/395.6 |
| 2005/0021567 | A1* | 1/2005 | Holenstein | G06F 11/2097 707/707 |
| 2005/0149471 | A1* | 7/2005 | Lassalle | G06F 17/30625 707/707 |
| 2006/0053163 | A1* | 3/2006 | Liu | H04L 67/38 707/707 |
| 2006/0123010 | A1* | 6/2006 | Landry | G06F 17/30575 707/707 |
| 2008/0046479 | A1* | 2/2008 | Pareek | G06F 17/30368 707/707 |
| 2009/0290511 | A1* | 11/2009 | Budampati | H04J 3/0641 370/254 |
| 2009/0313311 | A1* | 12/2009 | Hoffmann | G06F 11/2094 707/707 |
| 2009/0327643 | A1* | 12/2009 | Goodman | G06F 9/5077 711/173 |
| 2010/0191884 | A1* | 7/2010 | Holenstein | G06F 11/2094 710/200 |
| 2010/0250560 | A1* | 9/2010 | Shinjo | G06F 7/32 707/753 |
| 2010/0332564 | A1* | 12/2010 | Tantrum | G06K 9/6219 707/828 |
| 2011/0285691 | A1* | 11/2011 | Takasugi | G09G 3/3233 345/212 |
| 2011/0292838 | A1* | 12/2011 | Chiabaut | H04L 45/04 370/256 |
| 2012/0047209 | A1* | 2/2012 | Wang | G06F 17/30882 709/204 |
| 2012/0218996 | A1* | 8/2012 | Das | H04L 43/00 370/389 |
| 2012/0254176 | A1* | 10/2012 | Pradhan | G06K 9/0055 707/737 |
| 2014/0325464 | A1* | 10/2014 | Hsu | G06F 17/5072 716/112 |
| 2016/0063090 | A1* | 3/2016 | Plevyak | G06F 17/30979 707/740 |

OTHER PUBLICATIONS

W. H. Highleyman, P. J. Holenstein, B. D. Holenstein, Chapter 10, Referential Integrity, Breaking the Availability Barrier: Survivable Systems for Enterprise Computing; AuthorHouse, 2004, 55 pages.

* cited by examiner

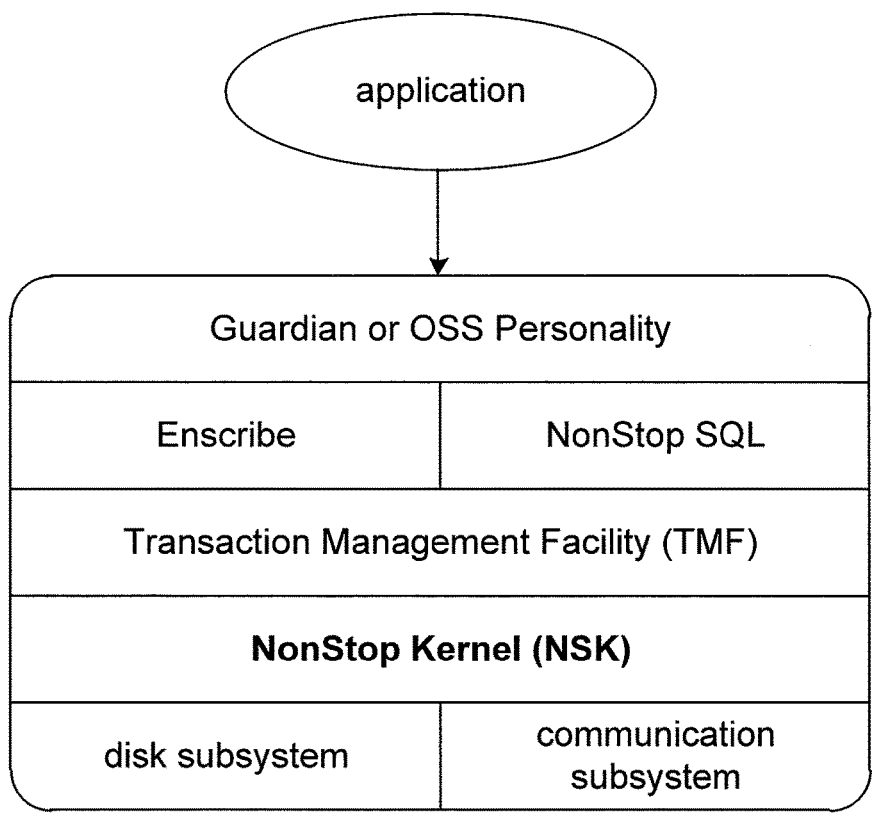
Figure 1: Prior Art - Simplified View of the HP NonStop Operating System

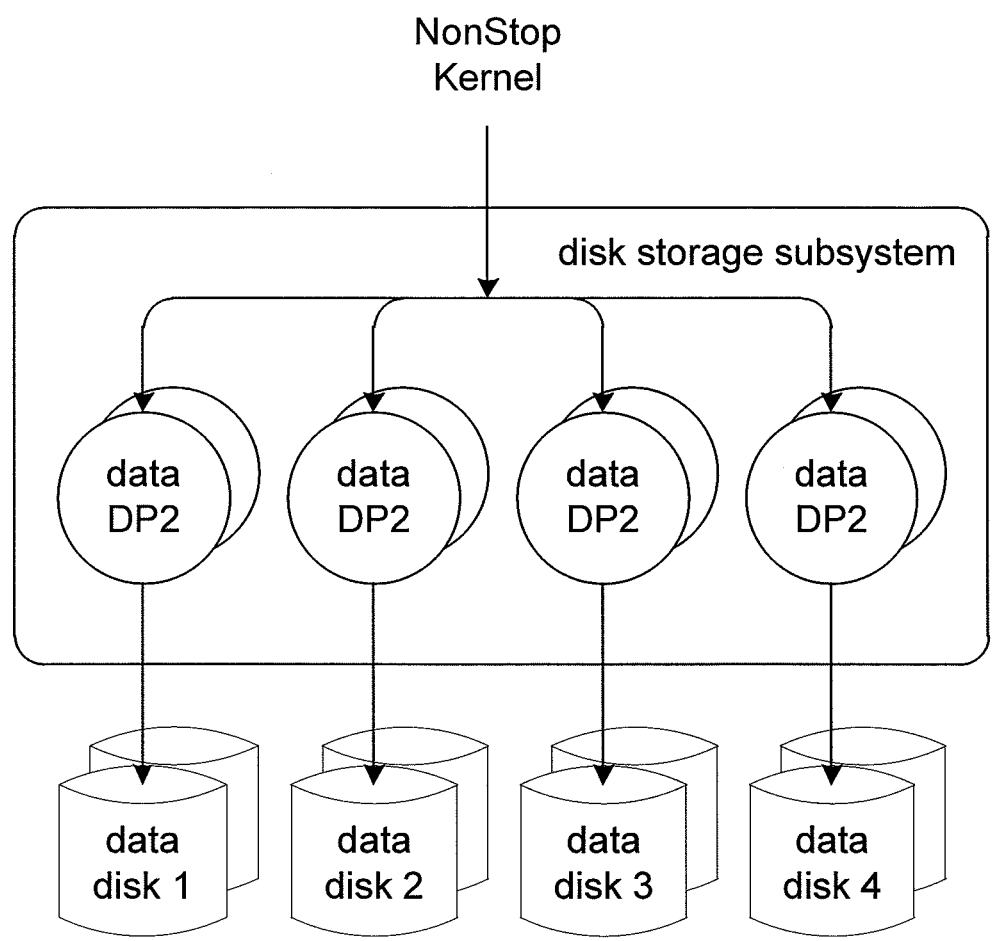
Figure 2: Prior Art - HP NonStop Disk Storage Subsystem

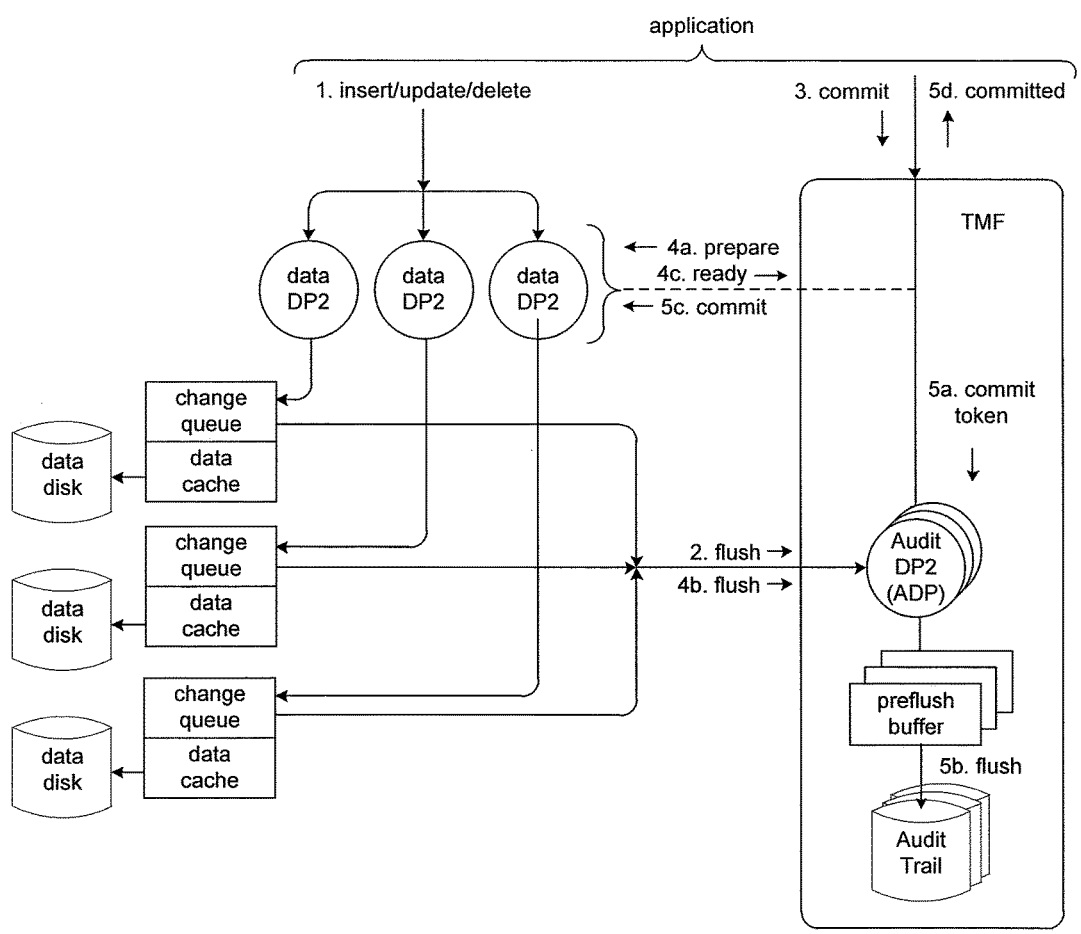
Figure 3: Prior Art - NonStop Transaction Management Facility (TMF)

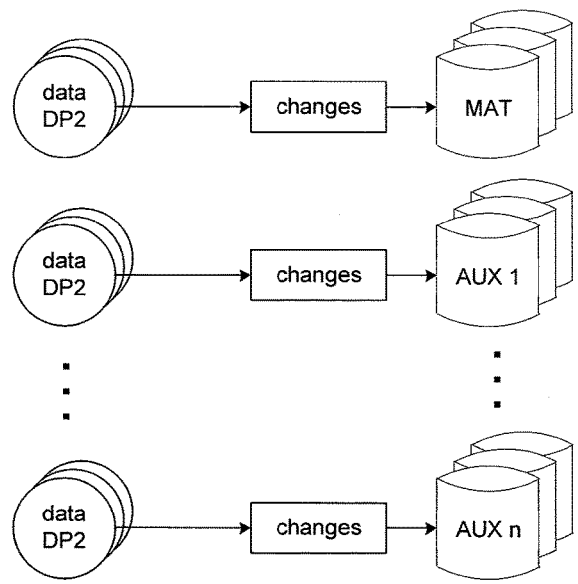
Figure 4: Prior Art - NonStop TMF Audit Trail
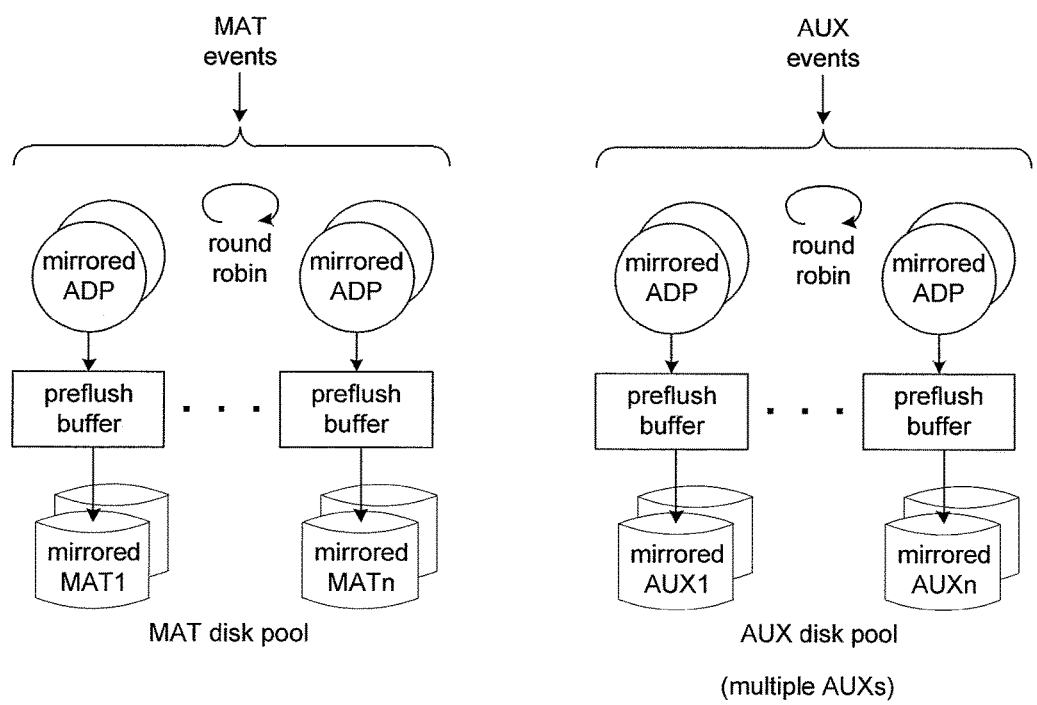
Figure 5: Prior Art - Audit Trail Disk Pools

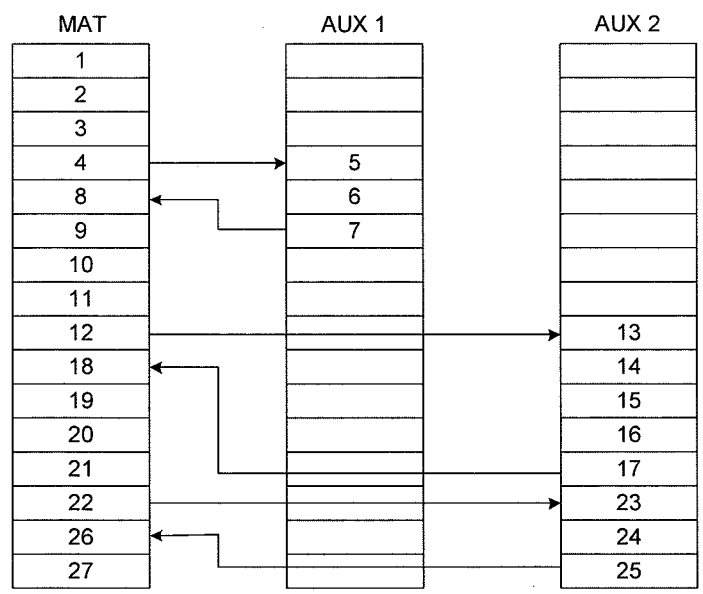
Figure 6: Prior Art - Audit Trail Linking

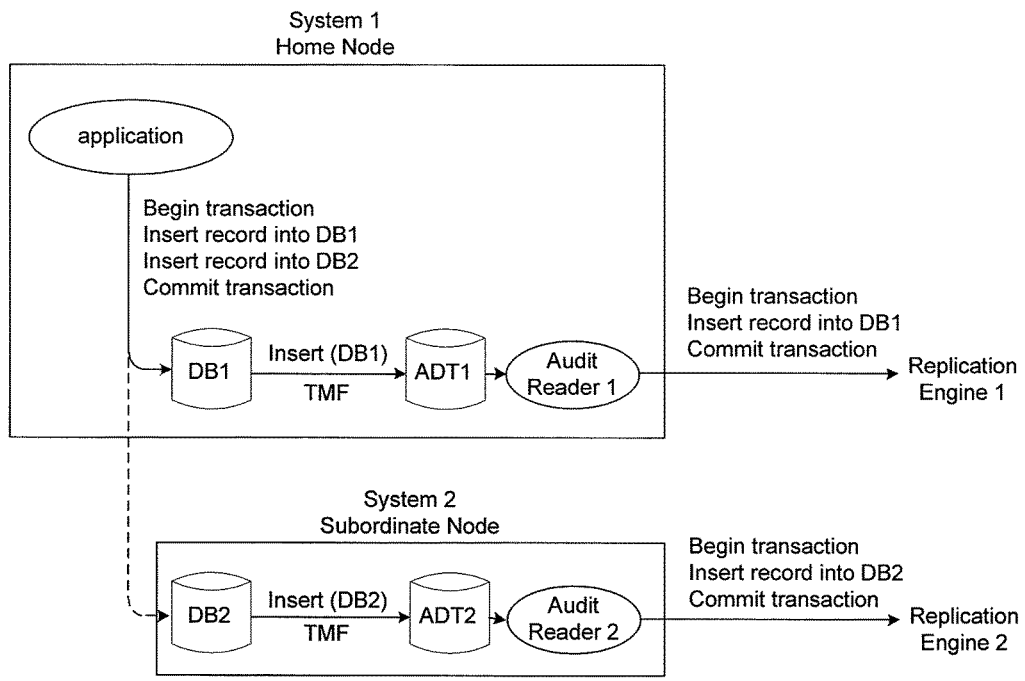
Figure 7: Prior Art - Distributed Transaction
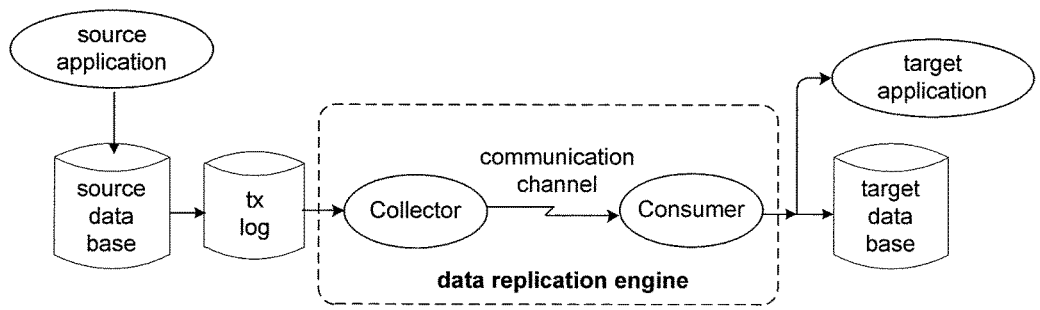
Figure 8: Prior Art - A Sample Data Replication Engine

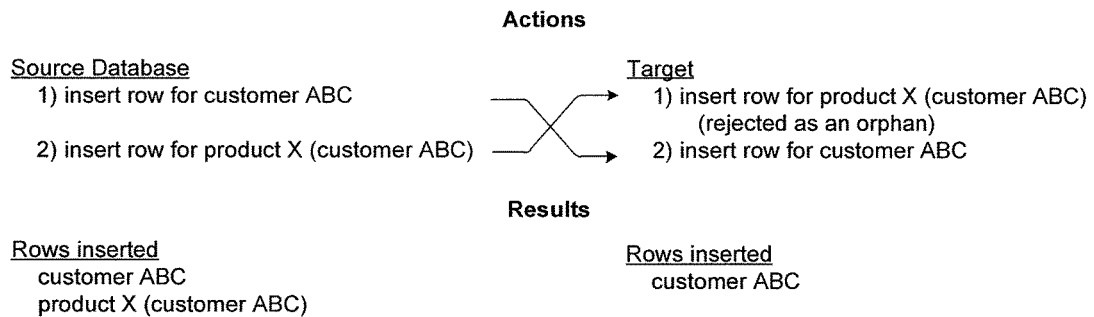
Figure 9: Prior Art - Consistency Violation
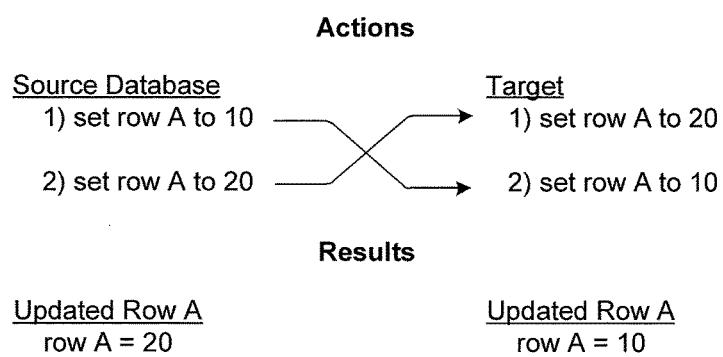
Figure 10: Prior Art - Correctness Violation

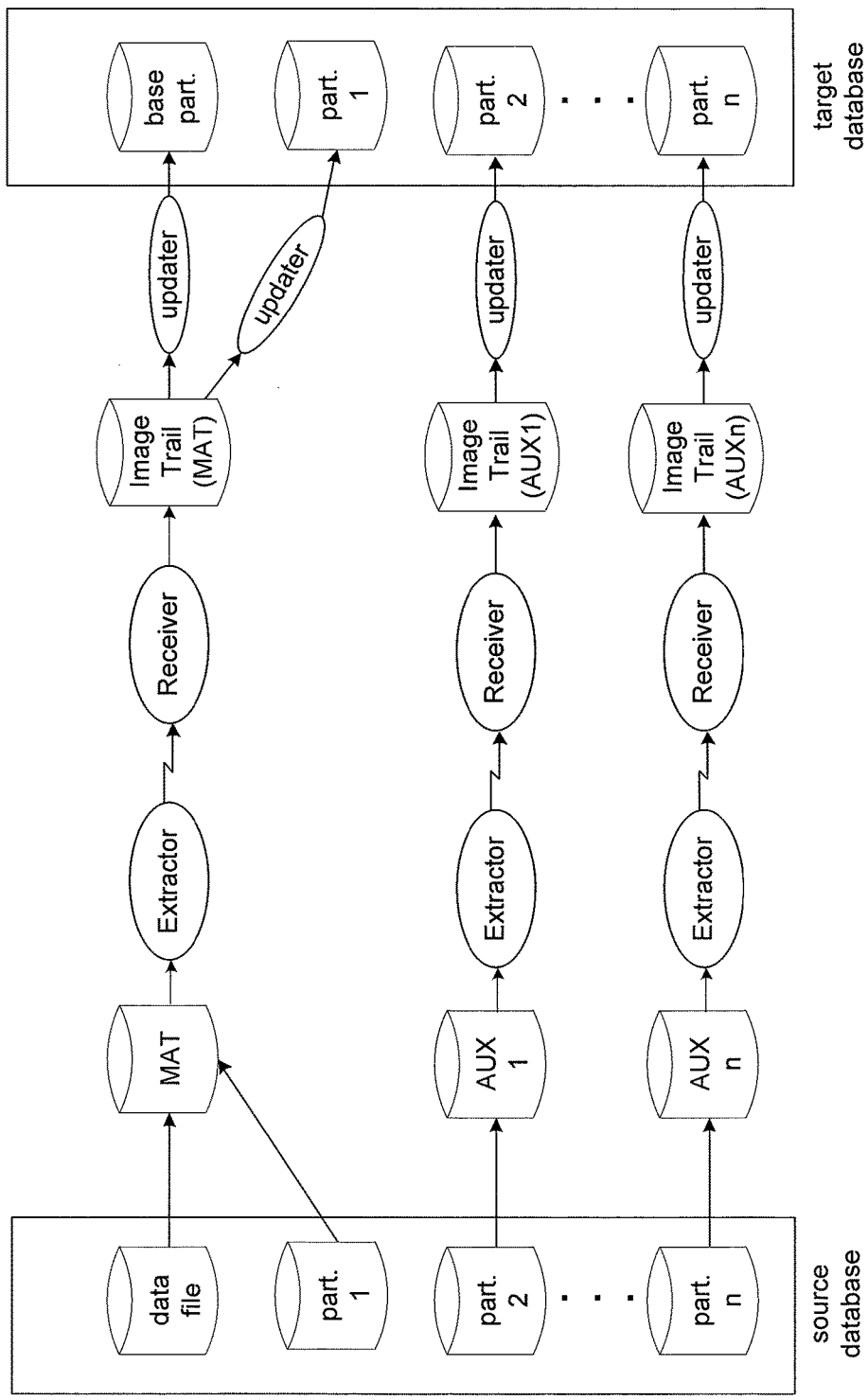
Figure 11: Prior Art - HP NonStop RDF Data Replication Engine (sample configuration)

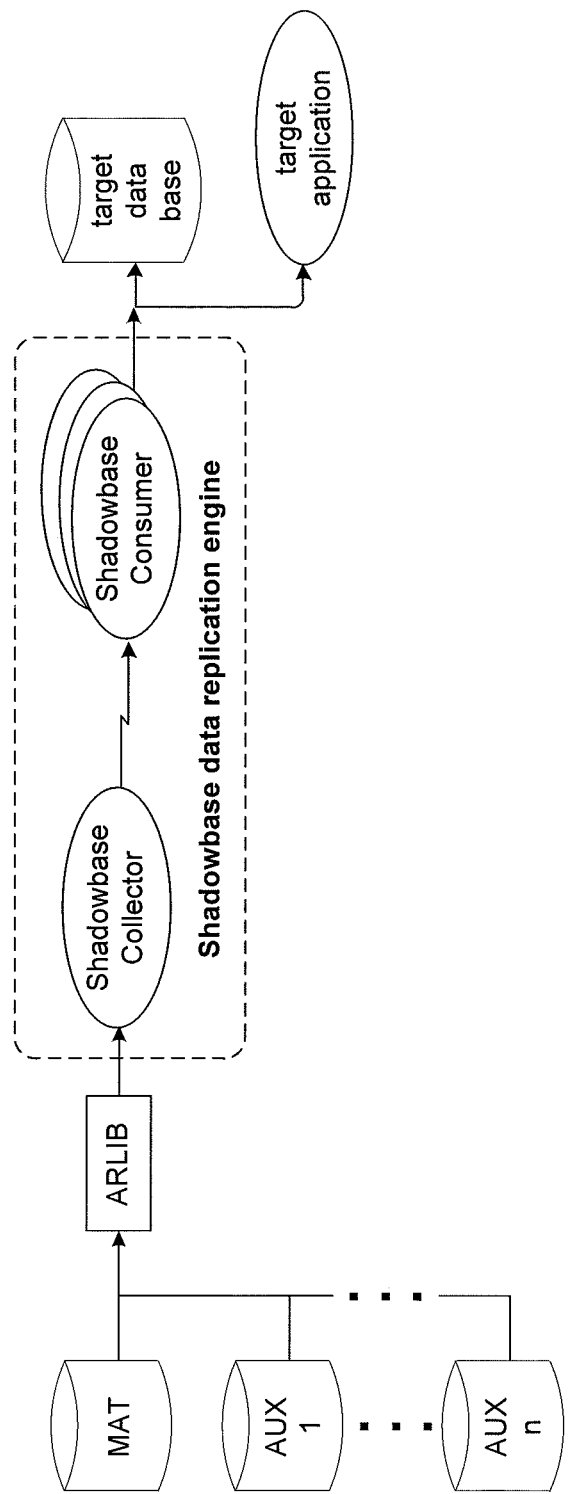
Figure 12: Prior Art - Gravic's Shadowbase Data Replication Engine

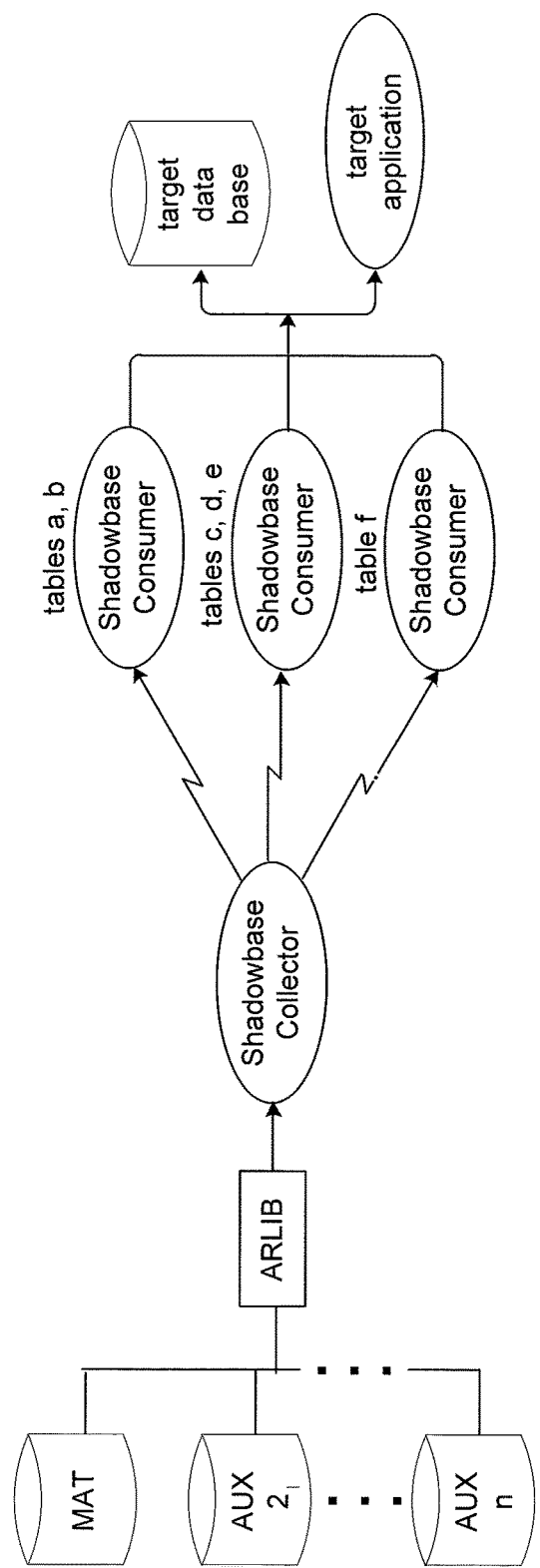
Figure 13a: Prior Art - Shadowbase Multithreaded Replication - Table Assignment: Single Shadowbase Collector

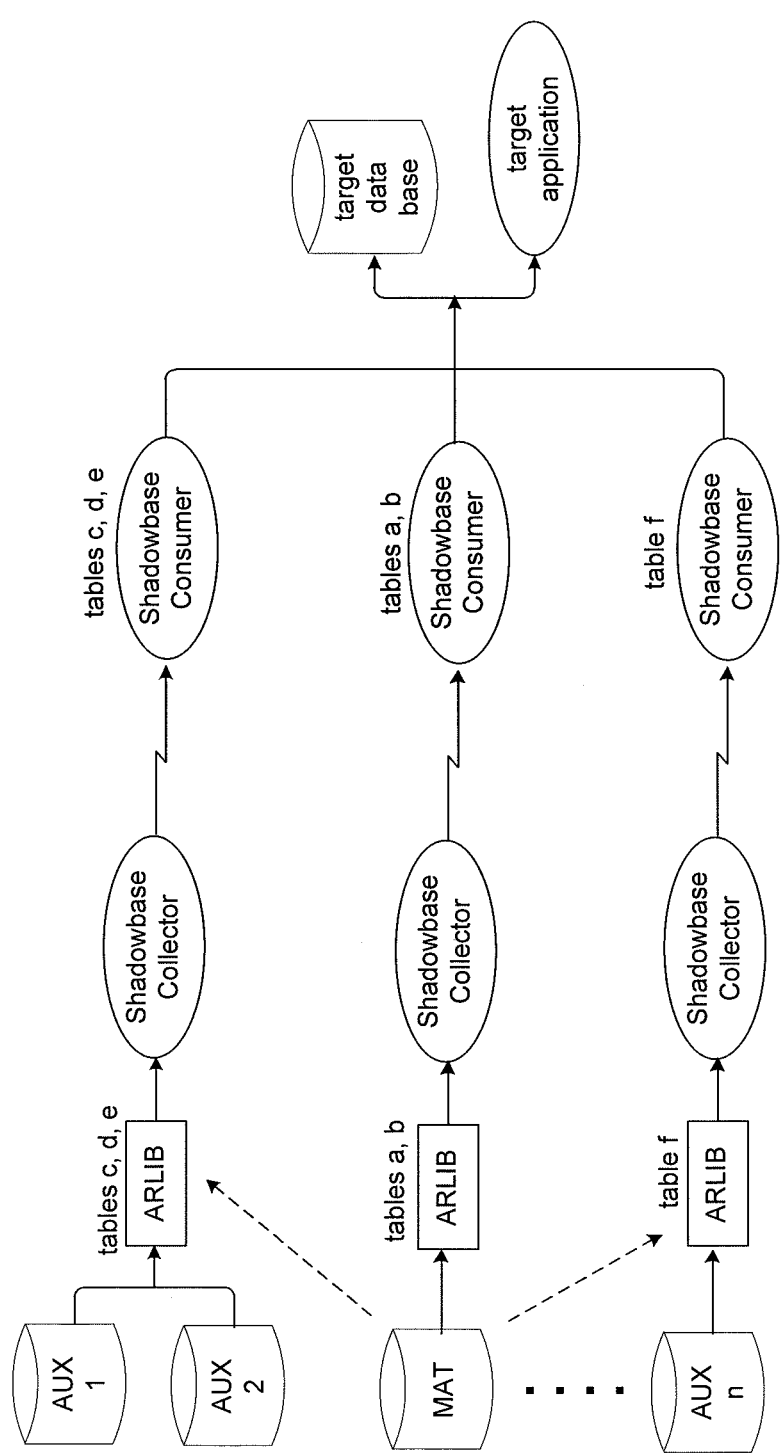
Figure 13b: Prior Art - Shadowbase Multithreaded Replication - Table Assignment: Multithreaded Shadowbase Collector

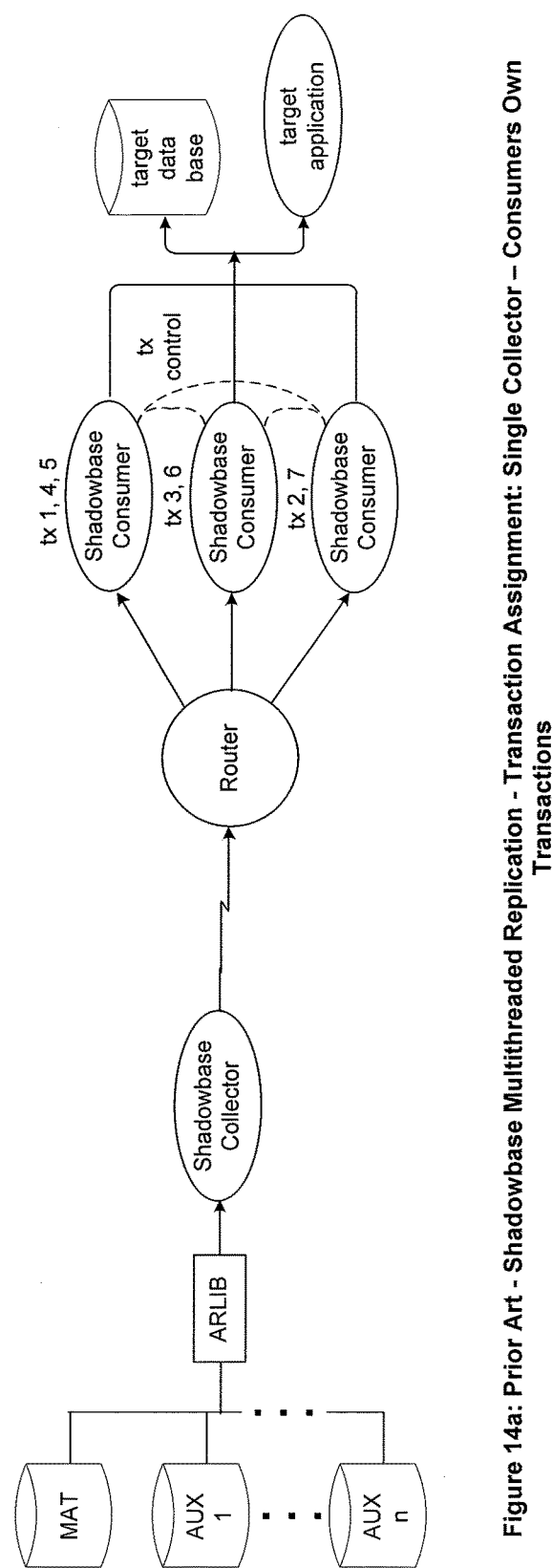
Figure 14a: Prior Art - Shadowbase Multithreaded Replication - Transaction Assignment: Single Collector – Consumers Own Transactions

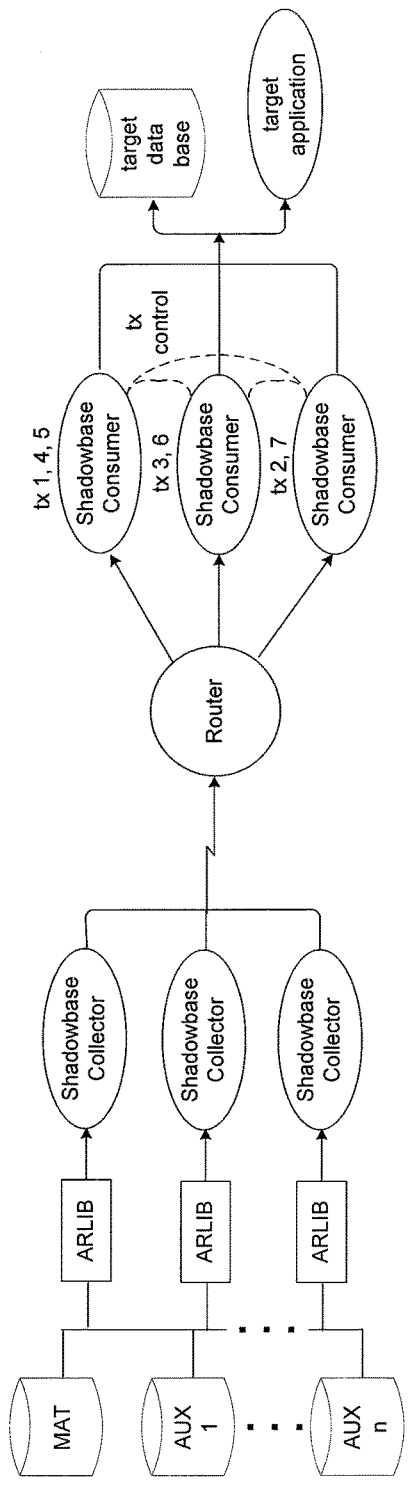
Figure 14b: Prior Art - Shadowbase Multithreaded Replication - Transaction Assignment: Multiple Collectors – Consumers Own Transactions
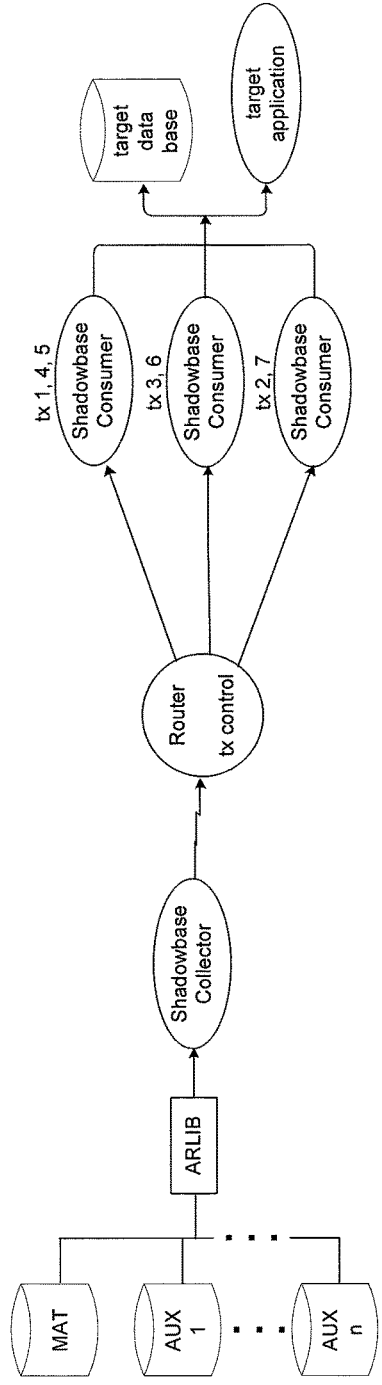
Figure 14c: Prior Art - Shadowbase Multithreaded Replication - Transaction Assignment: Single Collector – Router Owns Transactions

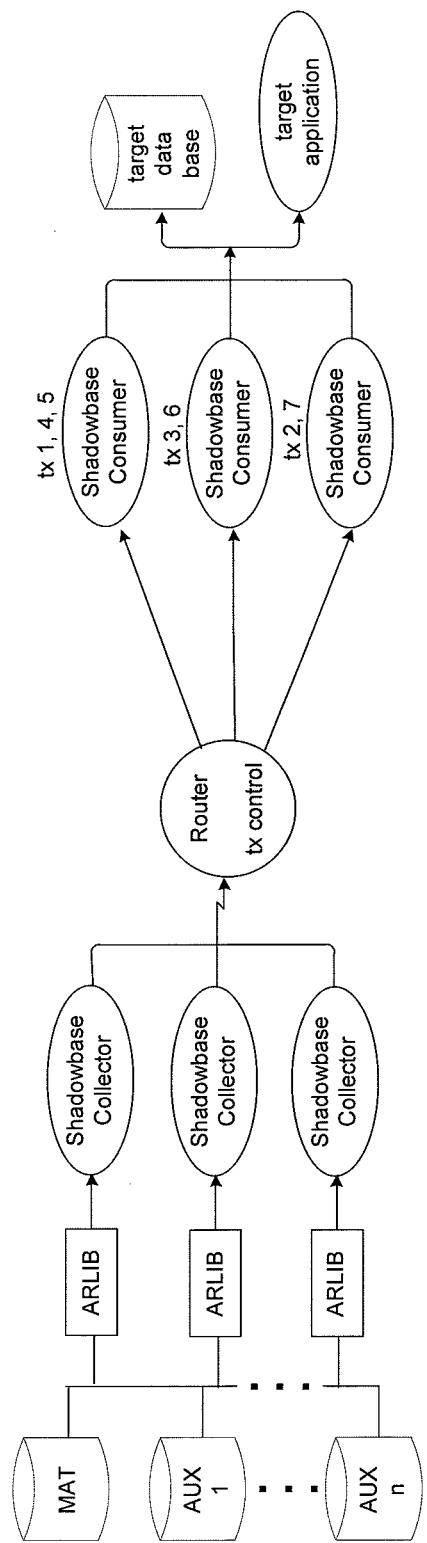
Figure 14d: Prior Art - Shadowbase Multithreaded Replication - Transaction Assignment: Multiple Collectors – Router Owns Transactions

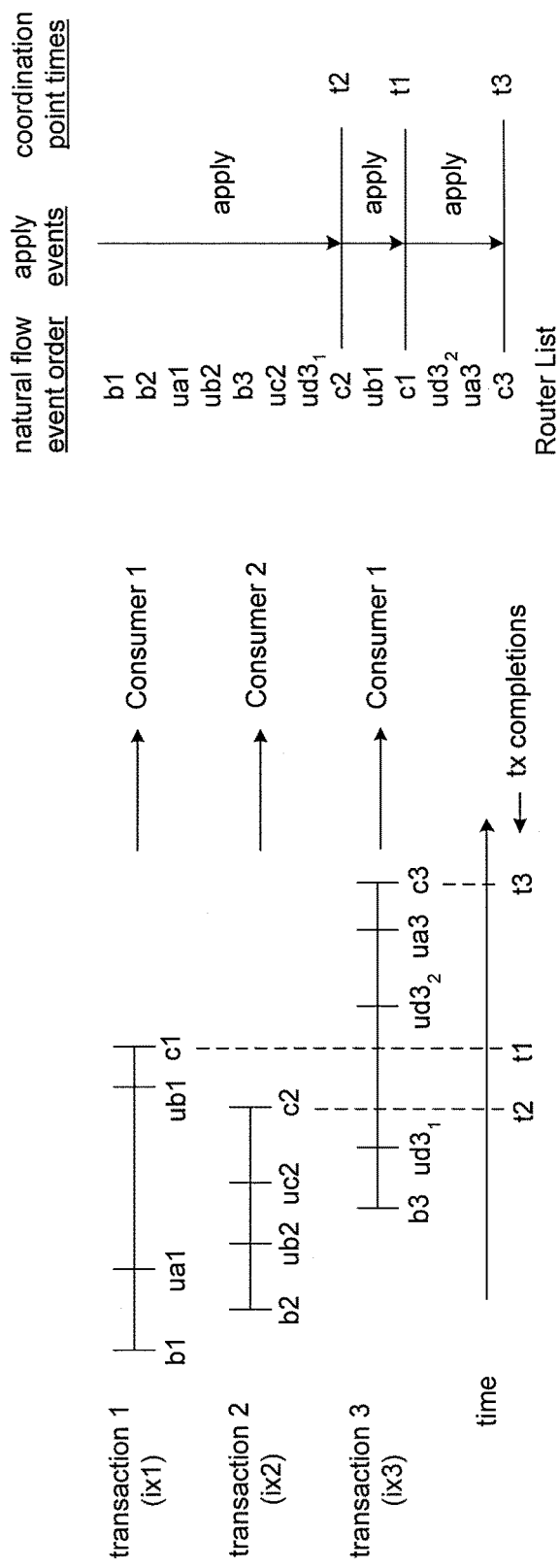
Figure 15a: Ensuring Natural-Flow or Landed Order with Multiple Consumers: Organizing Updates Into Landed Flow Order

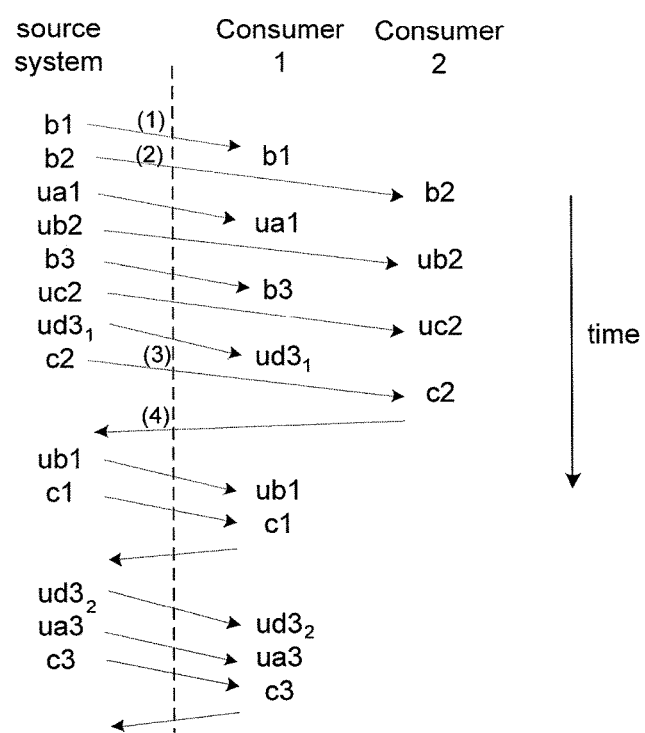
Figure 15b: Ensuring Natural-Flow or Landed Order with Multiple Consumers: Sending Updates to Consumers in Landed Flow Order

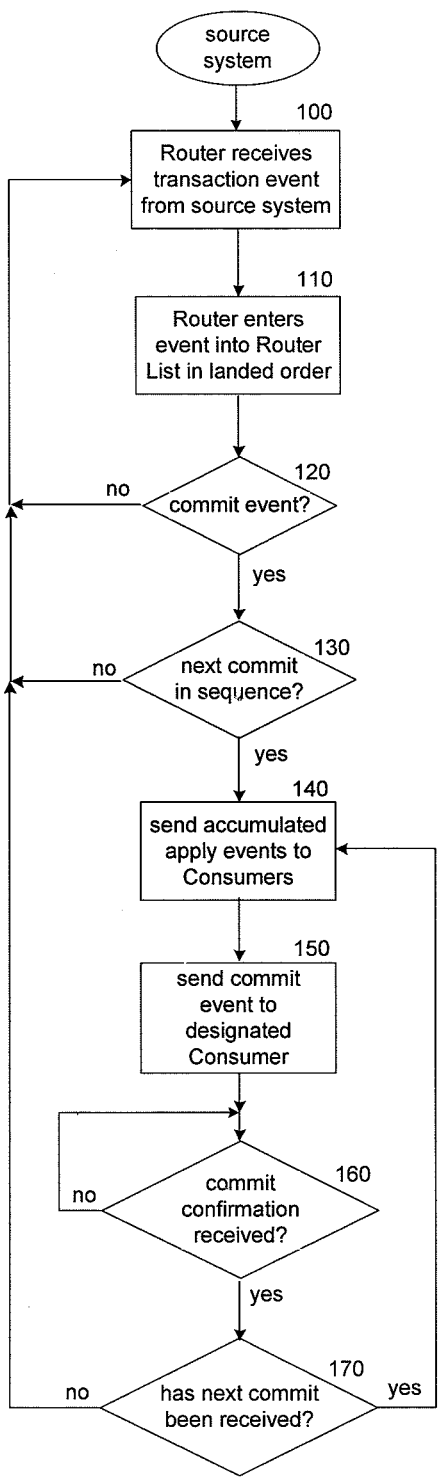
Figure 16: Flow Chart for Resynchronizing Target Transactions

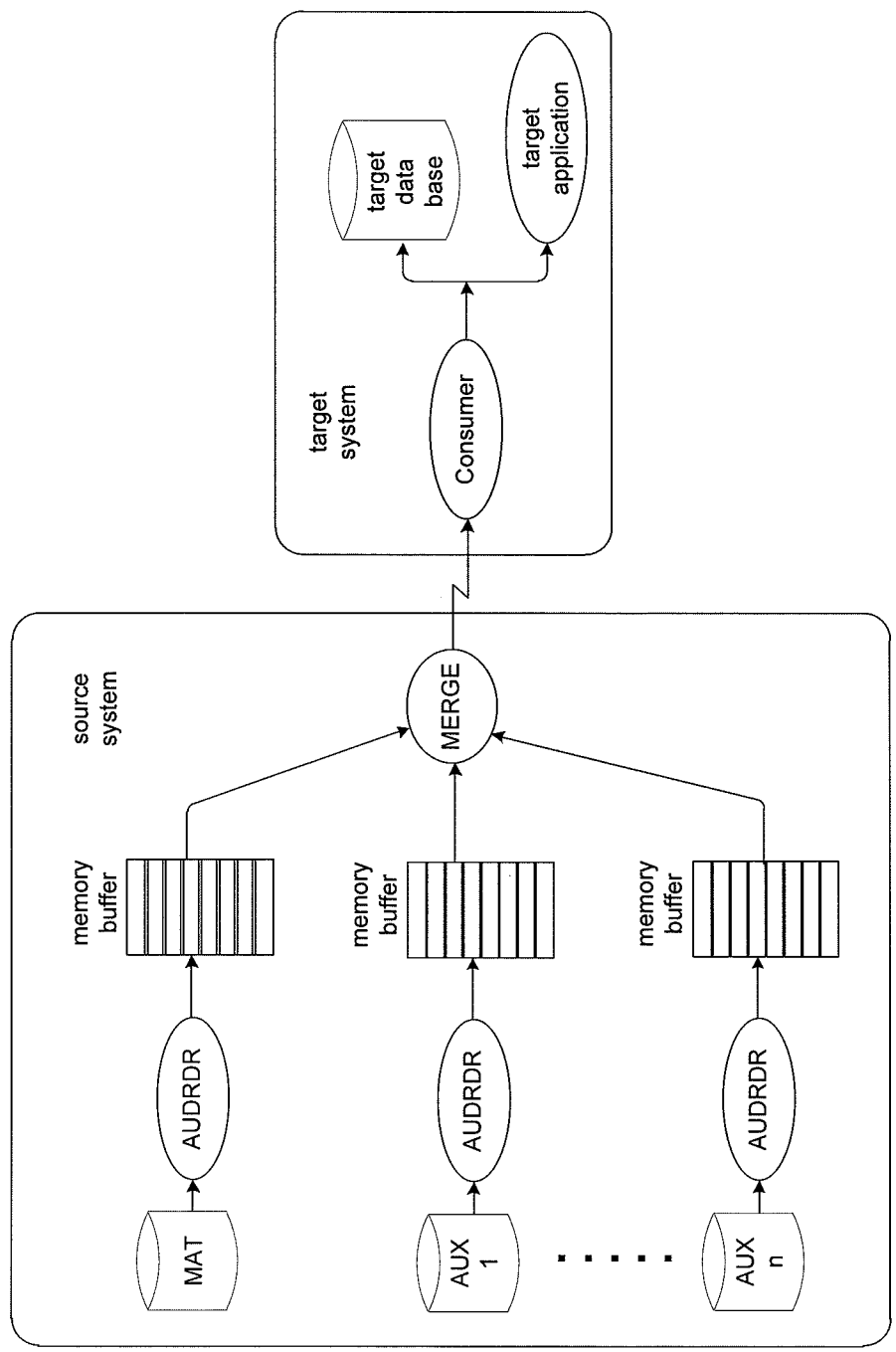
Figure 17a: Efficient Merging of Distributed Logs from Cache Memory: Single Processor System

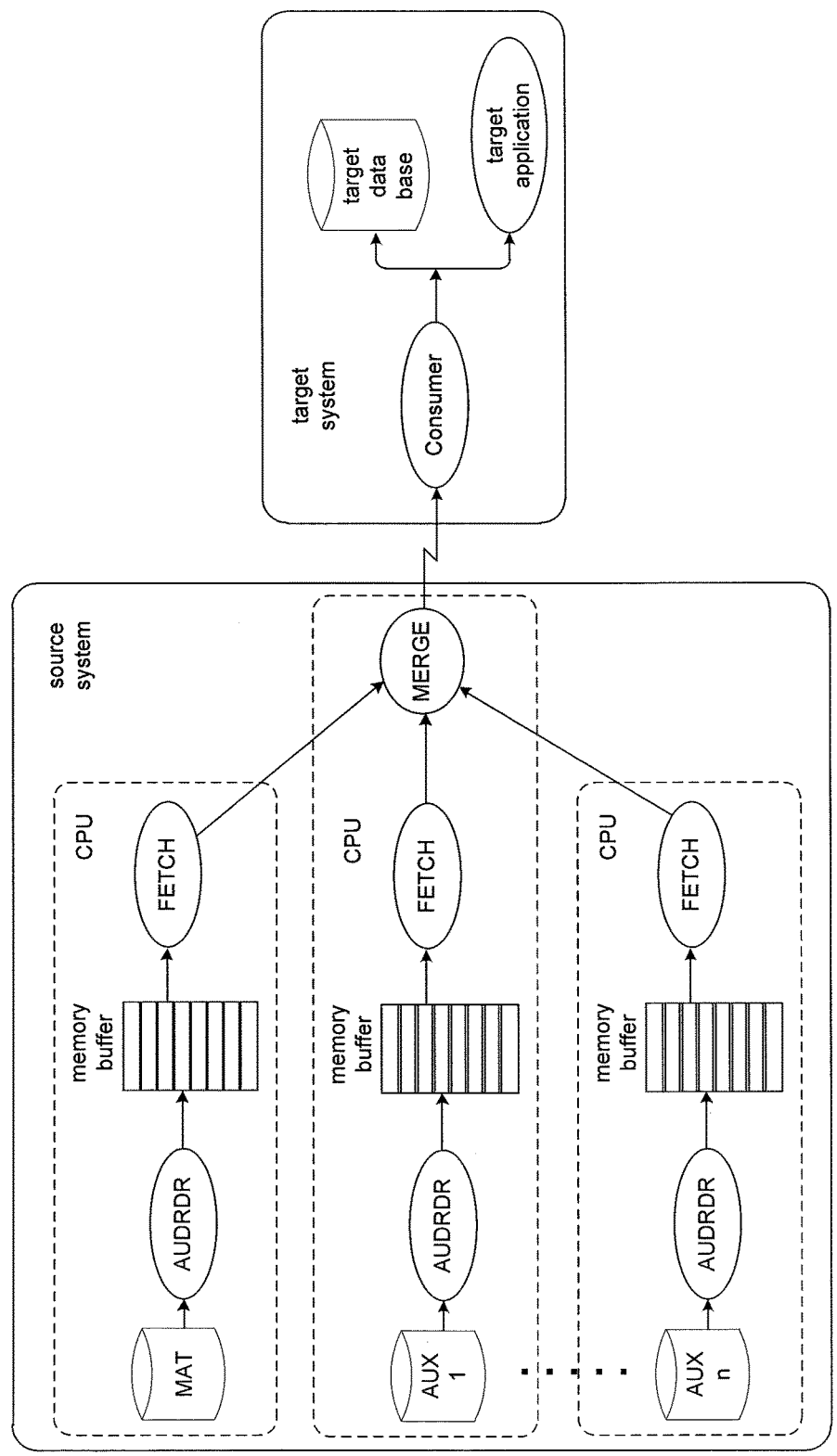
Figure 17b: Efficient Merging of Distributed Logs from Cache Memory: Multiprocessor System

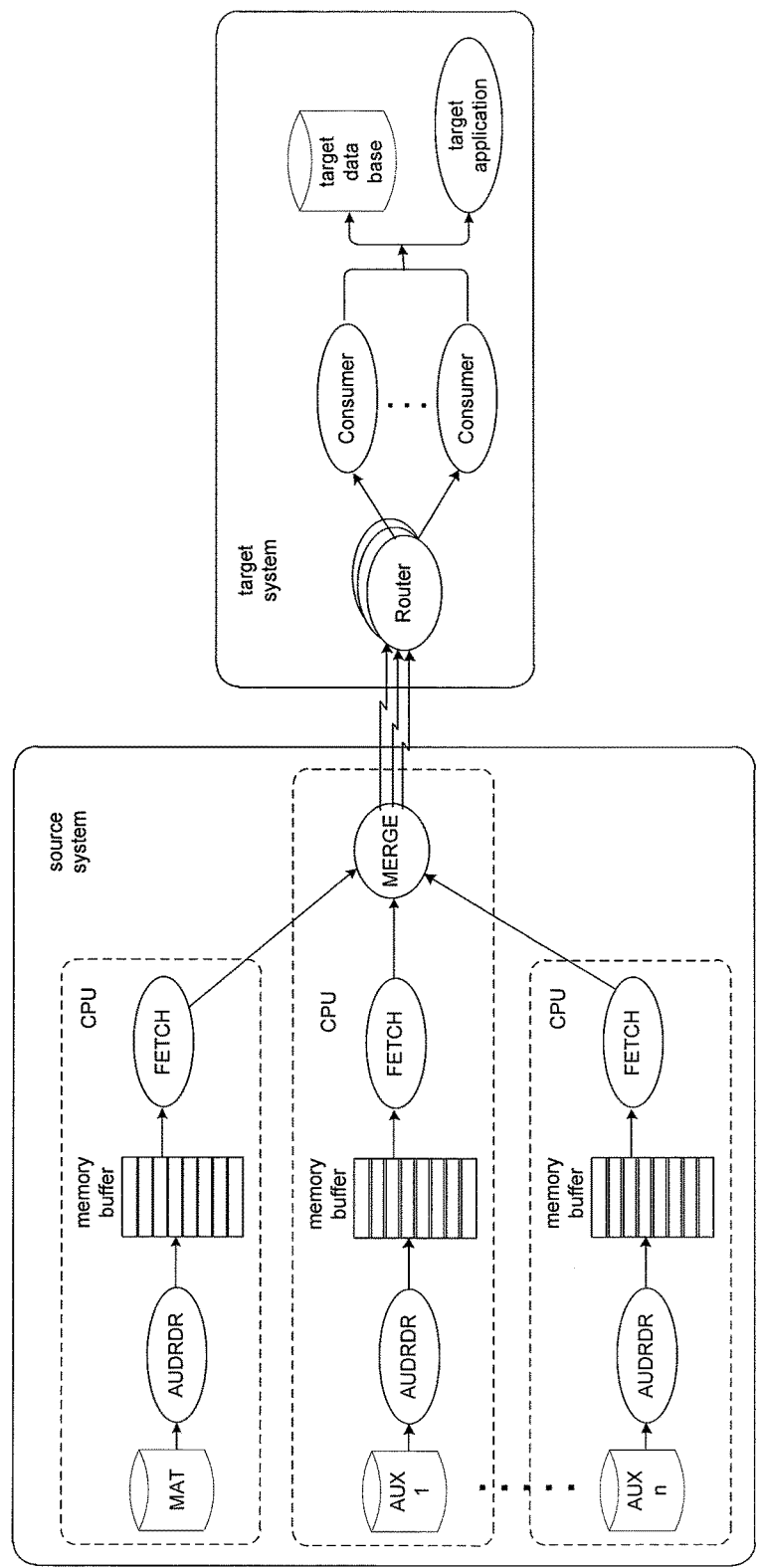
Figure 18: Efficient Merging of Distributed Logs from Cache Memory with Multithreading

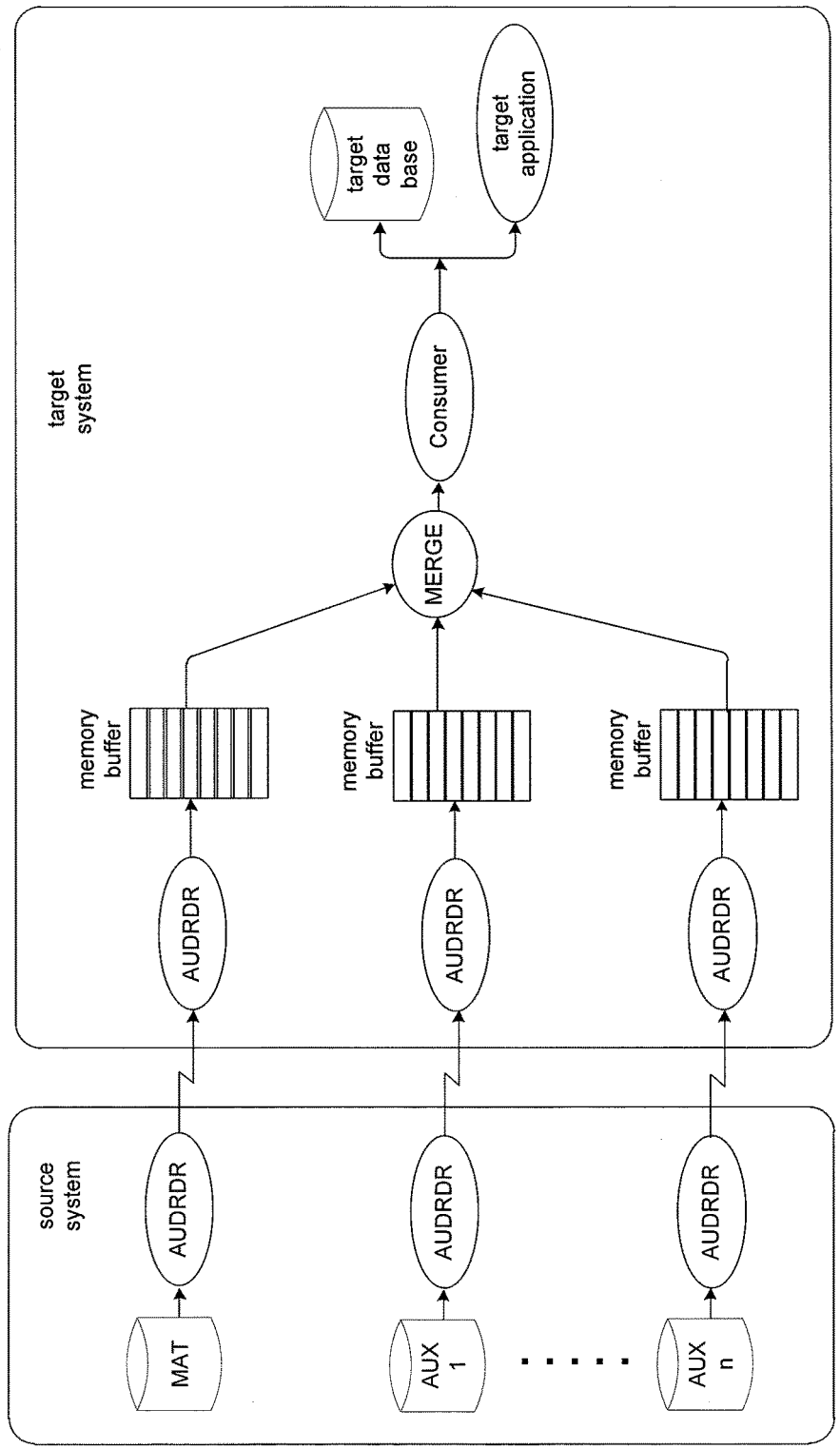
Figure 19a: Cache Merging on Target System with Single Consumer: Single Processor System

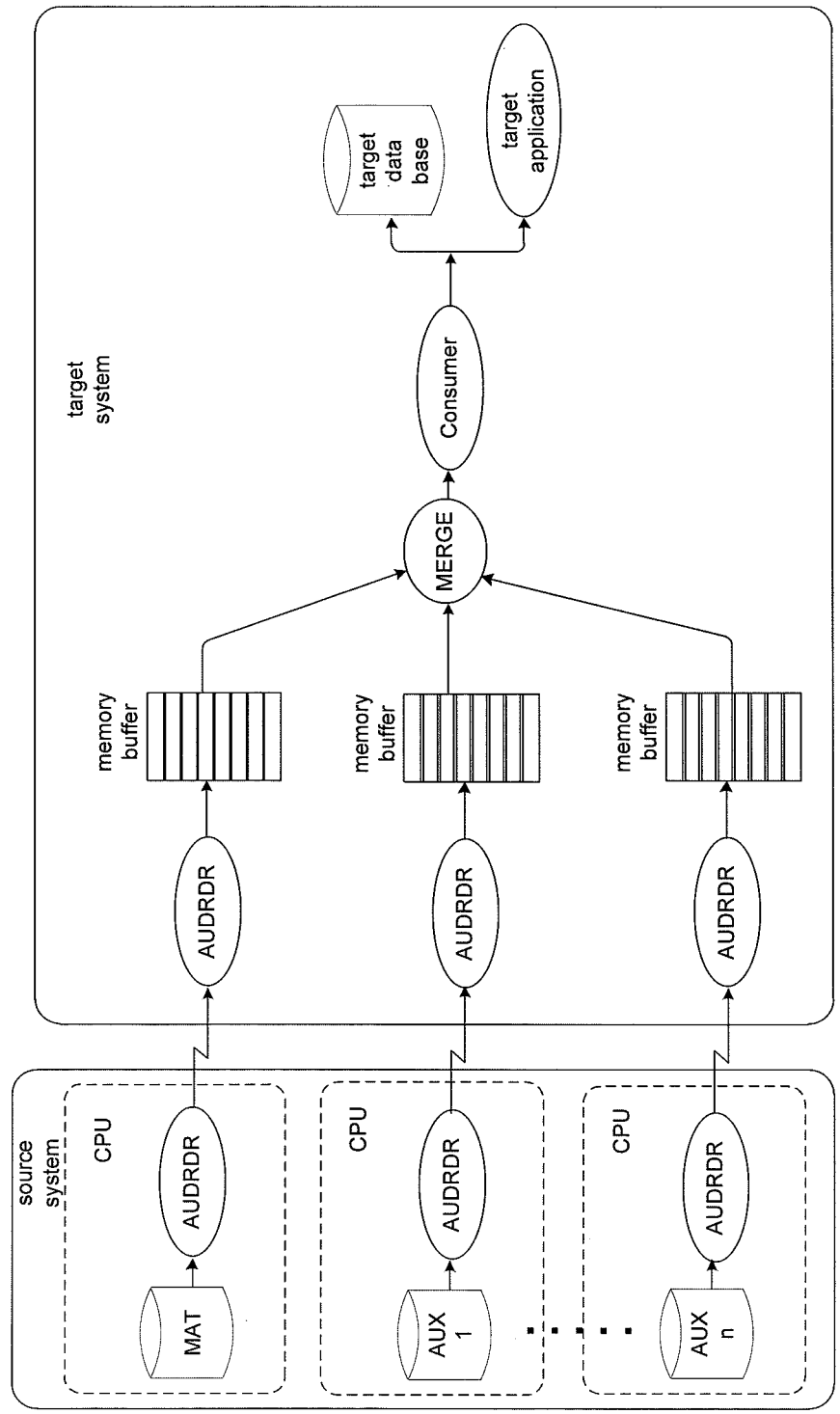
Figure 19b: Cache Merging on Target System with Single Consumer: Multiprocessor System

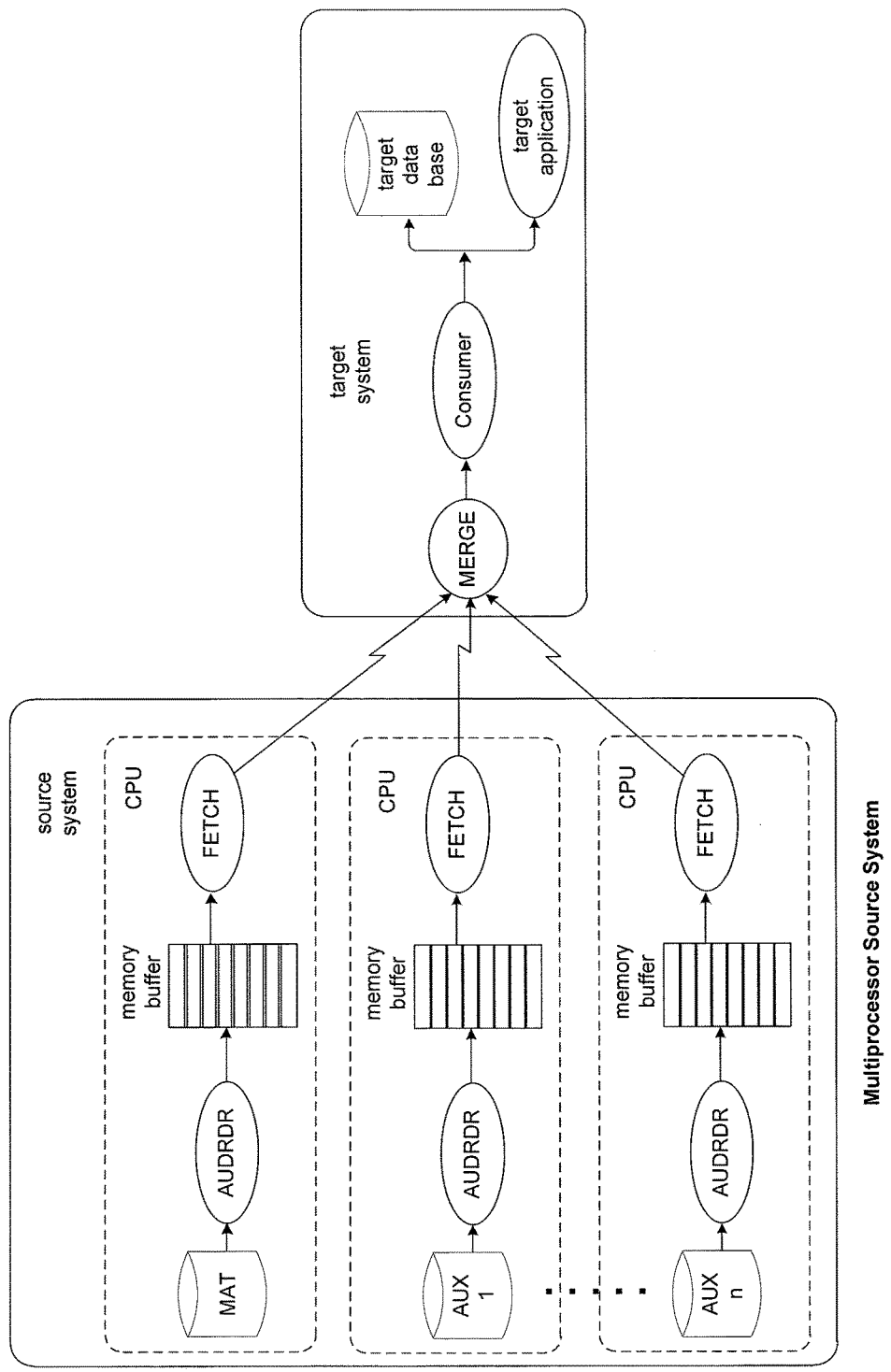
Figure 20: Cache Merging on Target System with Memory Buffers on Multi-CPU Source System

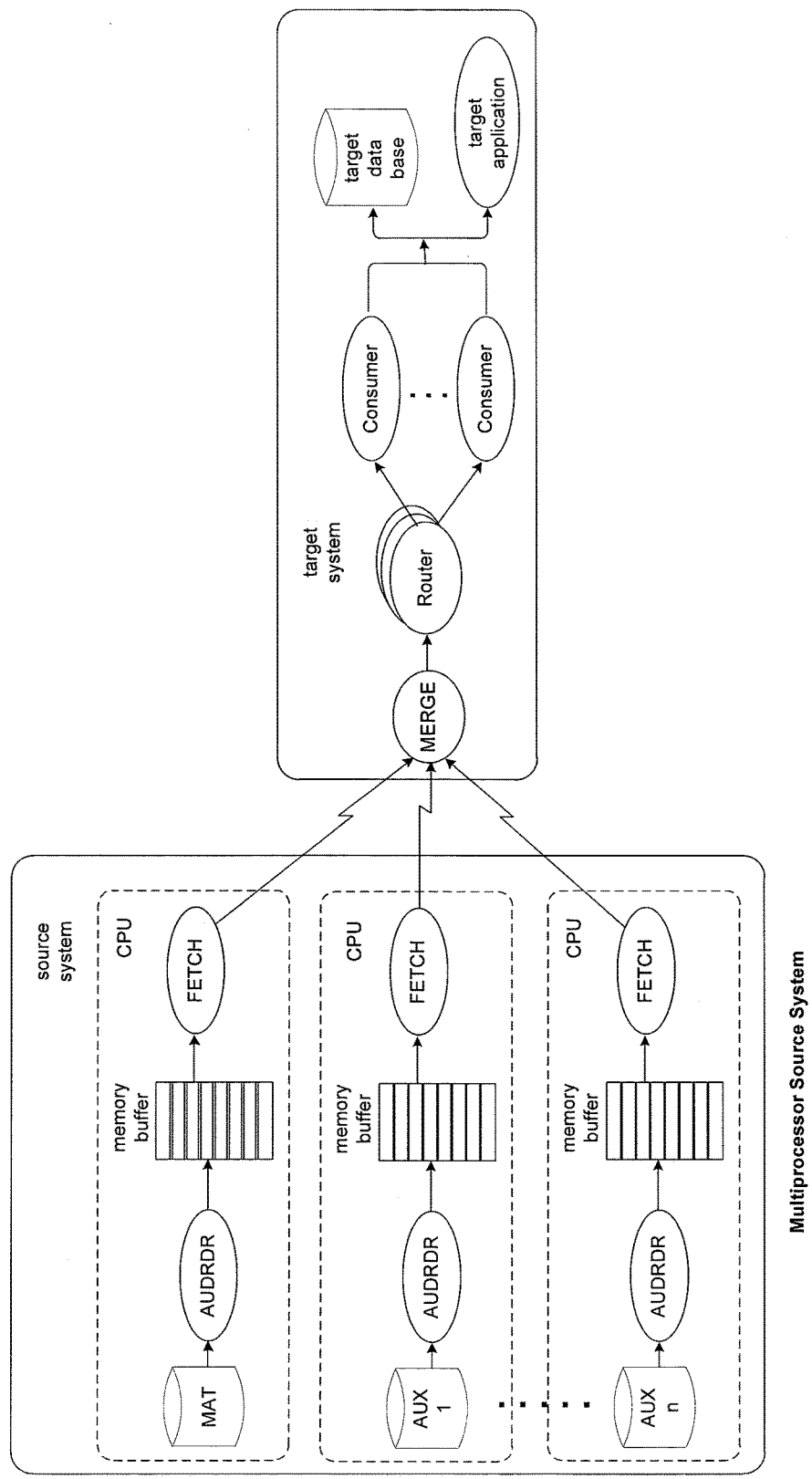
Figure 21: Cache Merging on Target System with Multiple Consumers

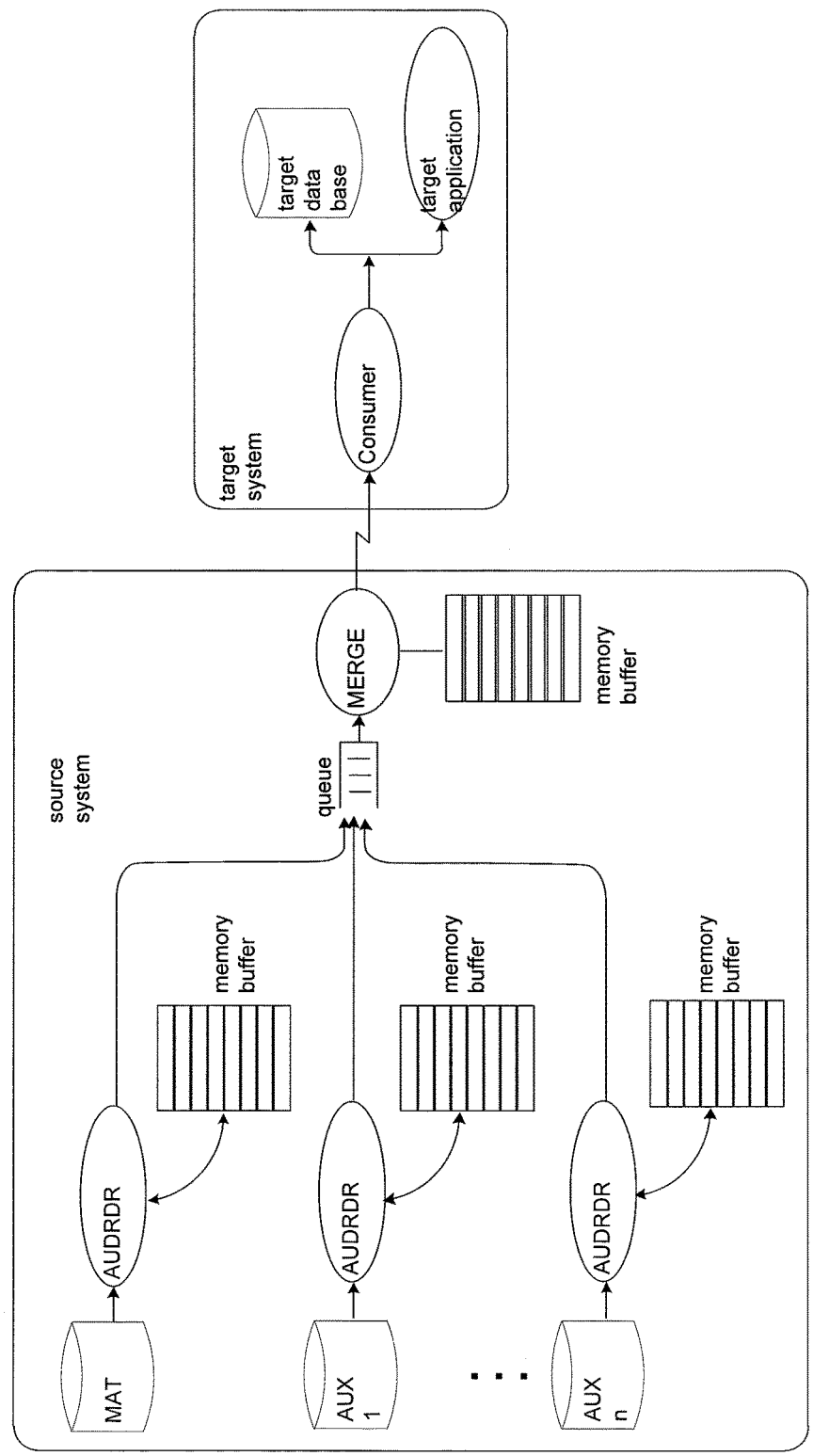
Figure 22: Efficient Merging of Distributed Logs using Publish/Subscribe

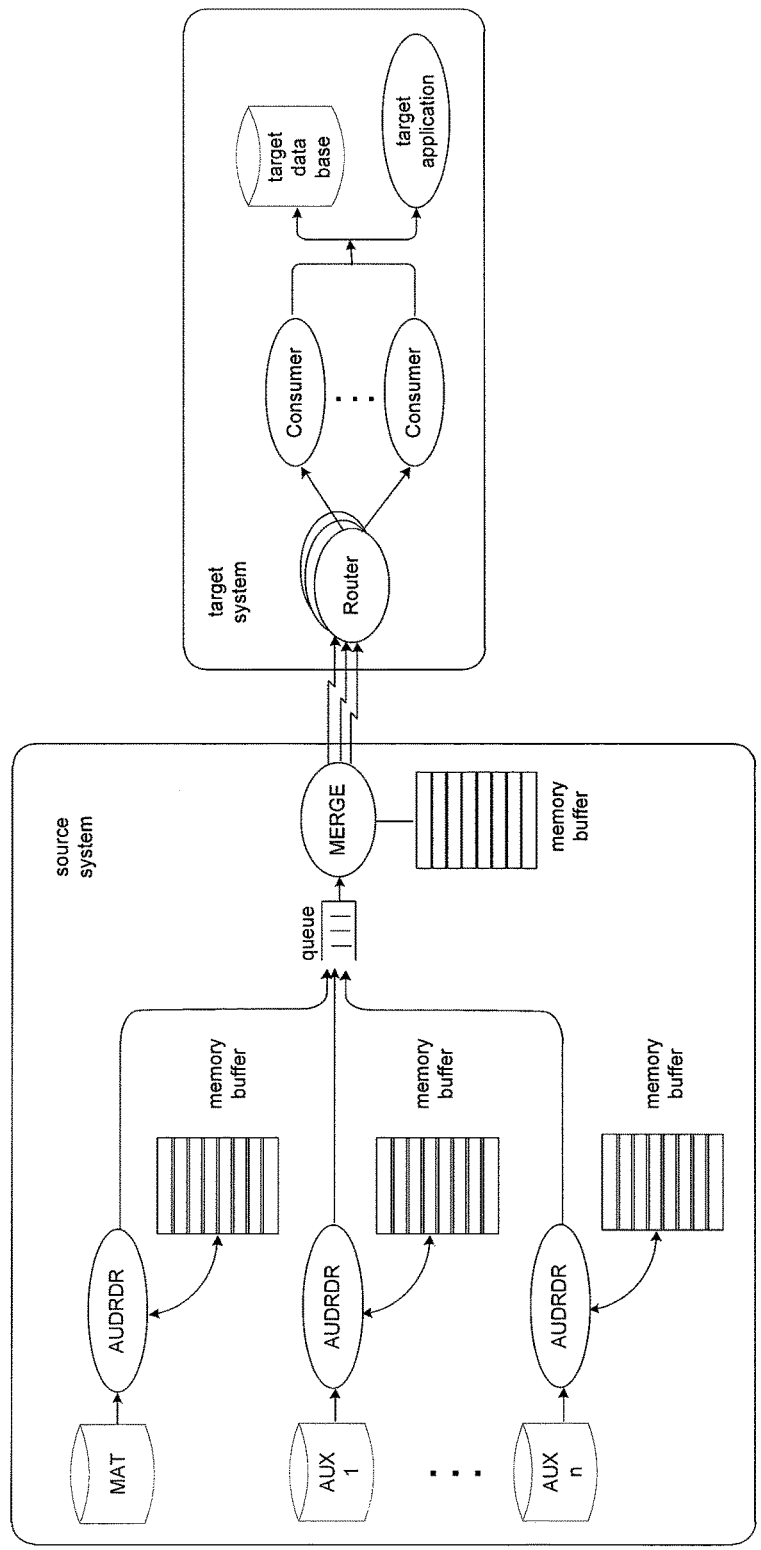
Figure 23: Efficient Merging of Distributed Logs using Publish/Subscribe with Multithreading

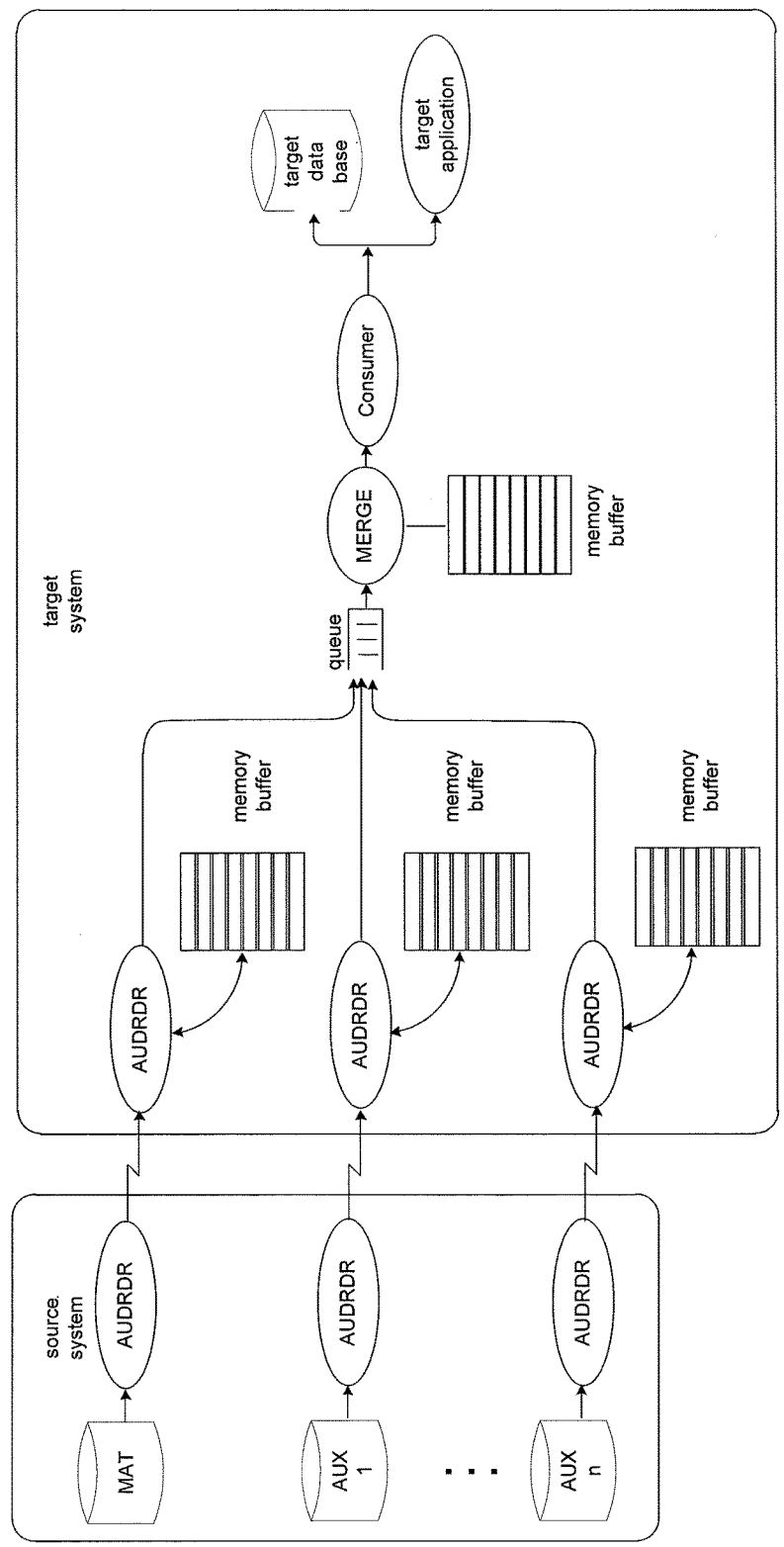
Figure 24: Efficient Merging on Target System of Distributed Logs using Publish/Subscribe

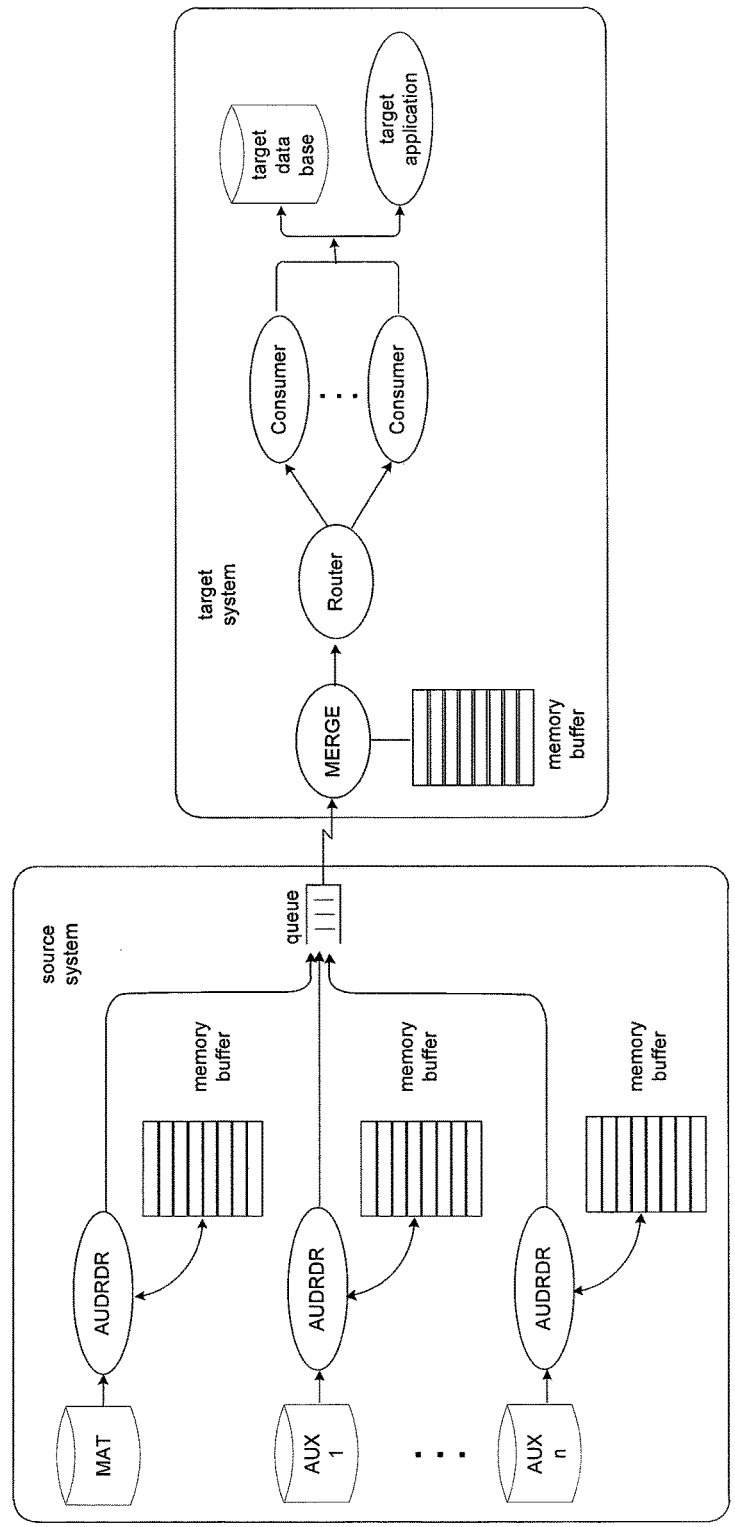
Figure 25: Efficient Merging on Target System of Distributed Logs using Publish/Subscribe with Multithreading

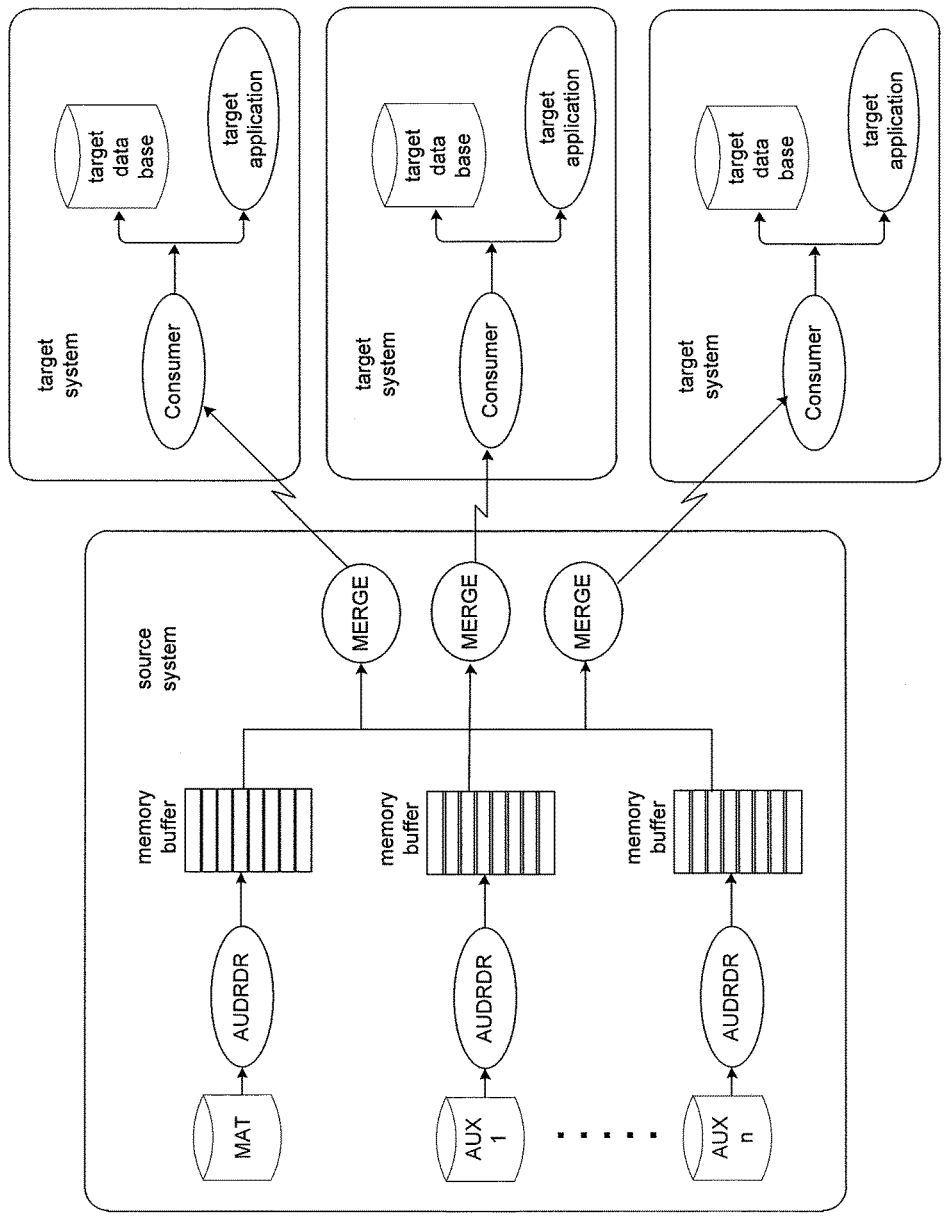
Figure 26: Efficient Merging of Distributed Logs to Multiple Target Systems

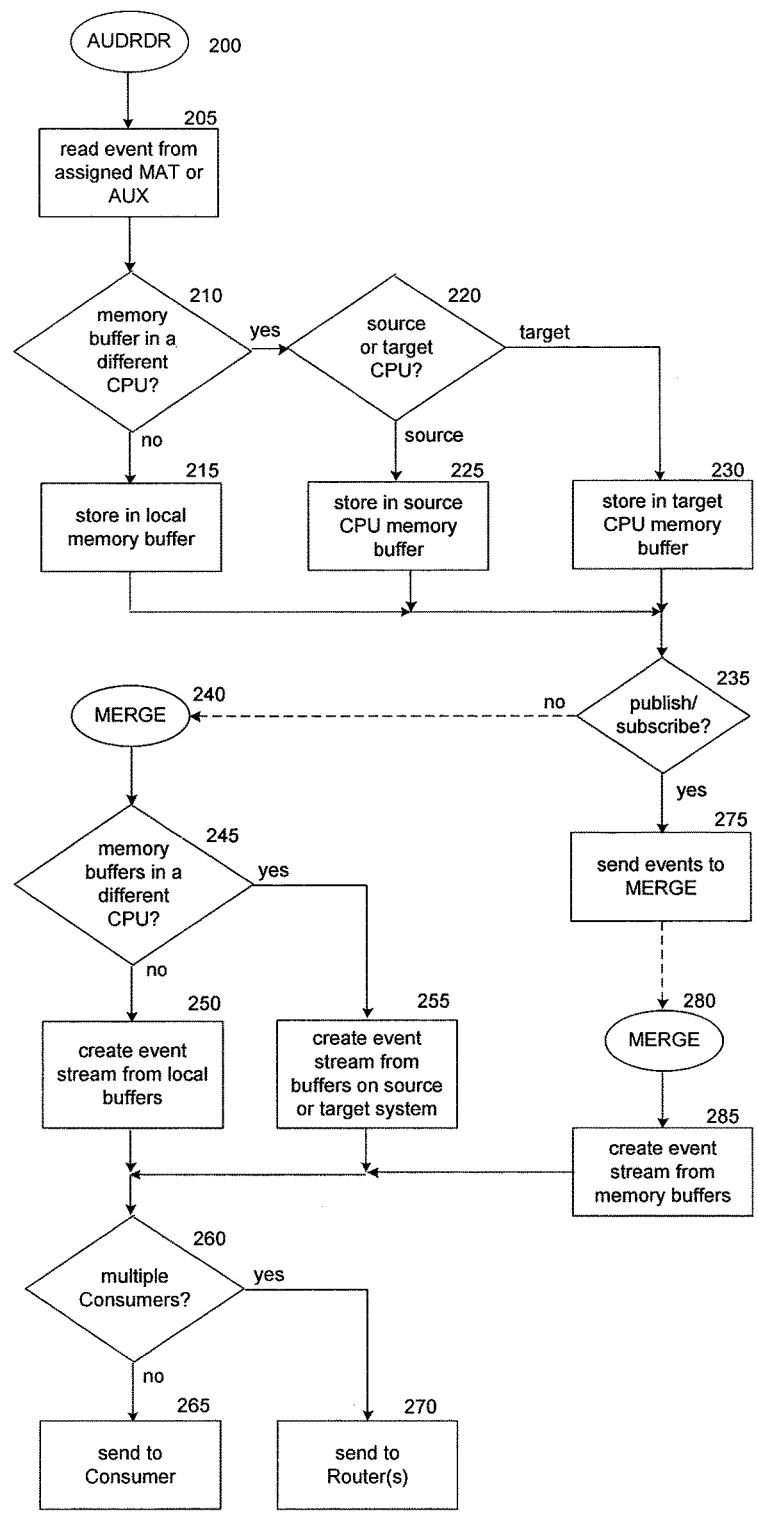
Figure 27: Flow Chart for Efficient Merging

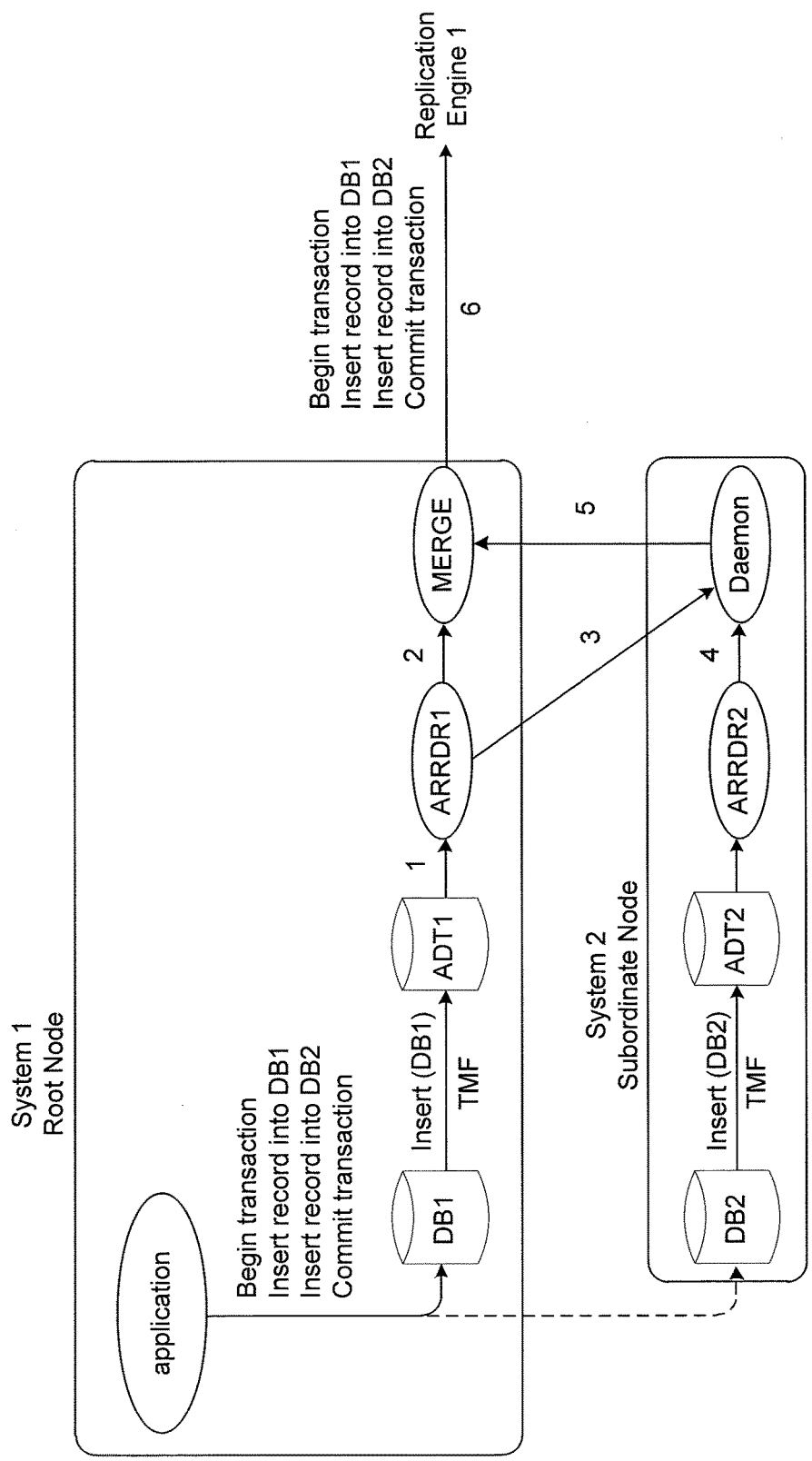
Figure 28: Source-Side Merging of Distributed Transactions

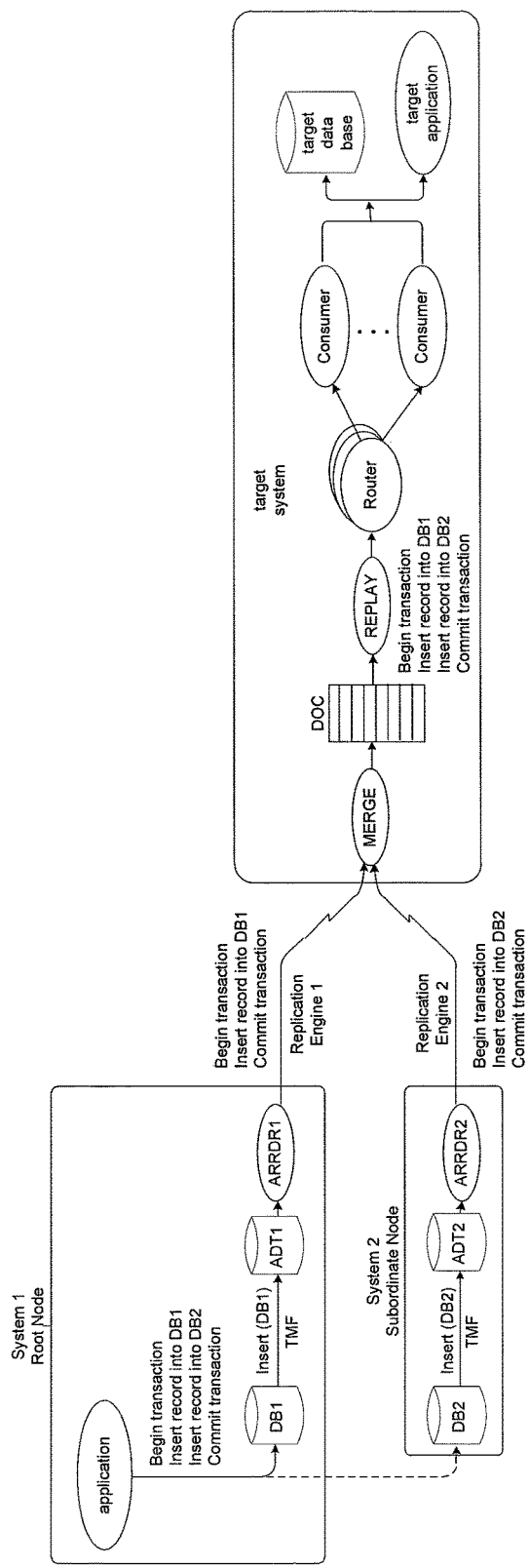
Figure 29: Target-Side Merging of Distributed Transactions

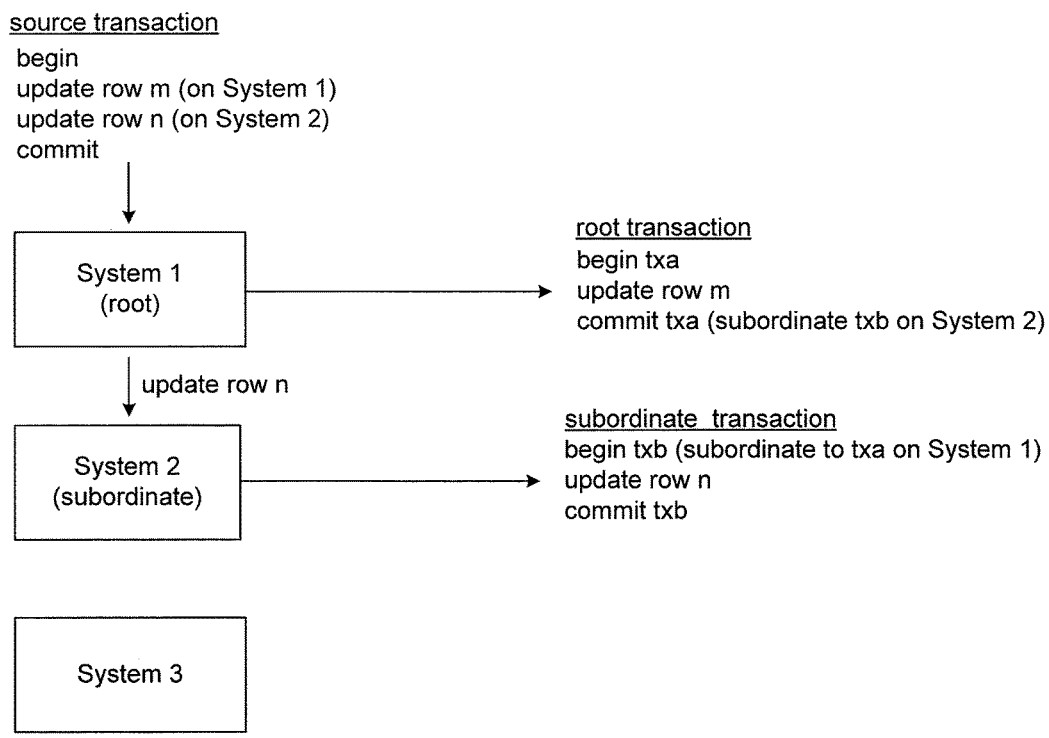
Figure 30: Merging Distributed Transactions via Linkage Information

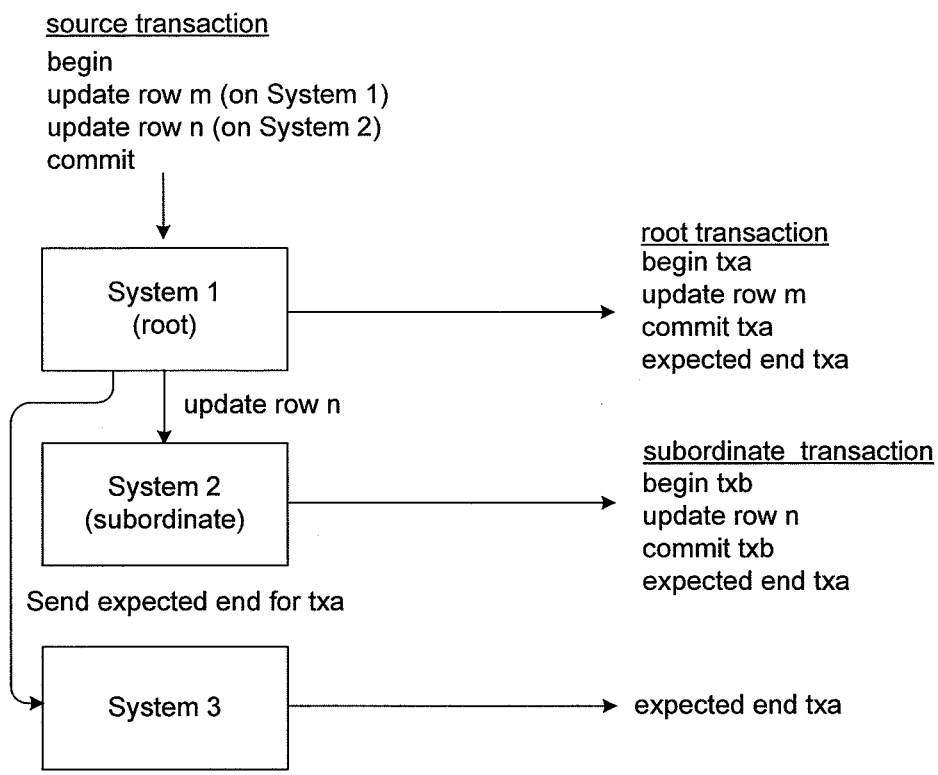
Figure 31: Merging Distributed Transactions via Expected Ends

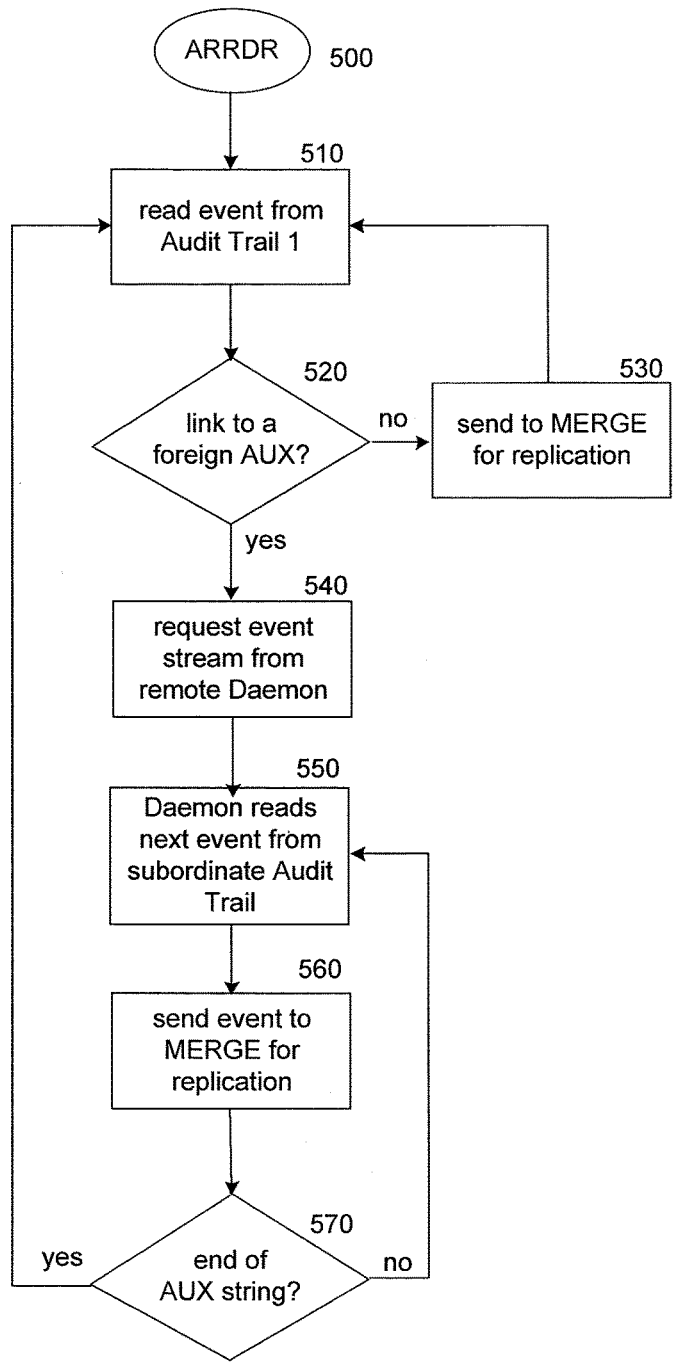
Figure 32a: Flow Chart for Distributed Transaction Merging: Source-Side Merging

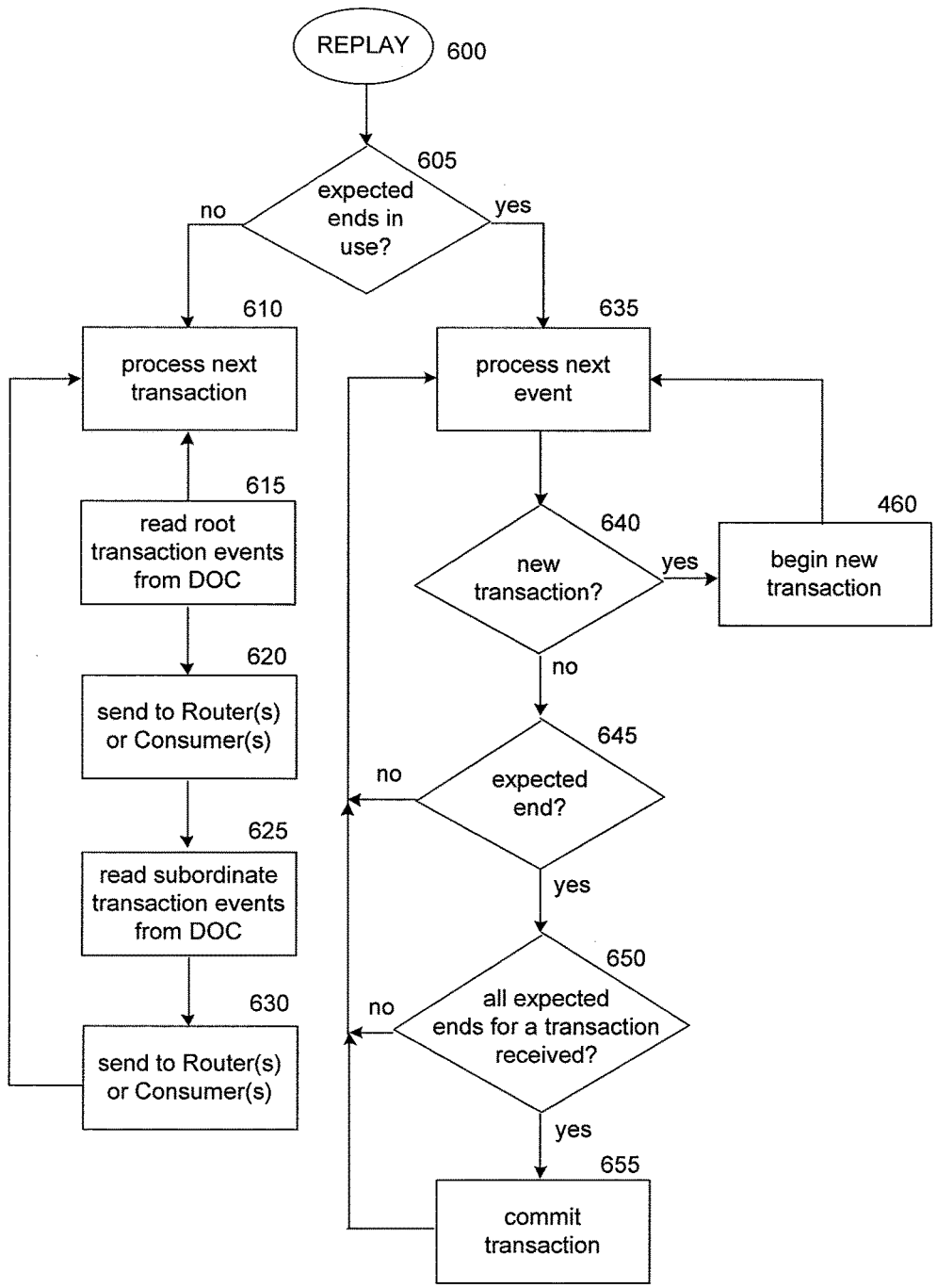
Figure 32b: Flow Chart for Distributed Transaction Merging: Target-Side Merging

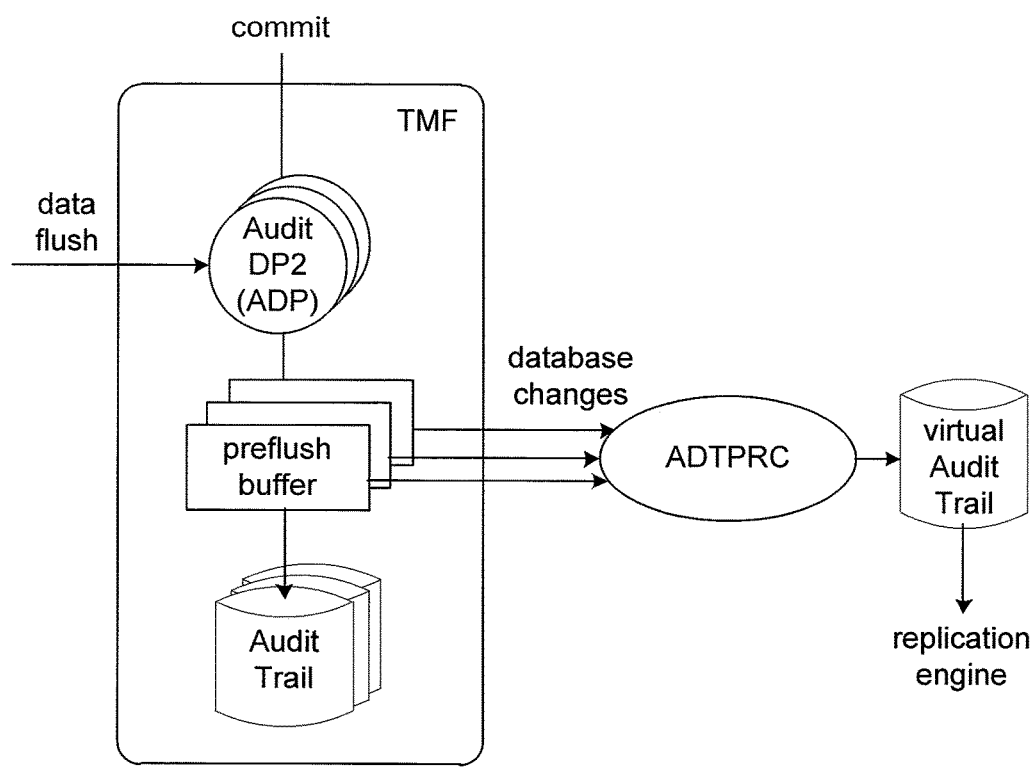
Figure 33a: Enhancements to Minimize Materialization Delays: Reading Changes from TMF Preflush Buffers

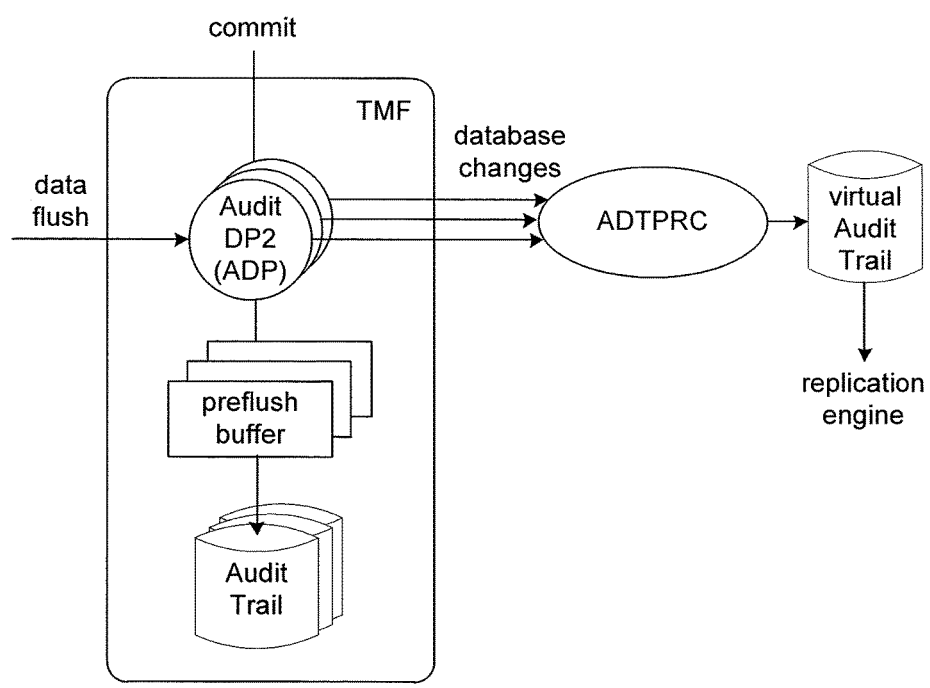
Figure 33b: Enhancements to Minimize Materialization Delays: Reading Changes from TMF ADP Processes

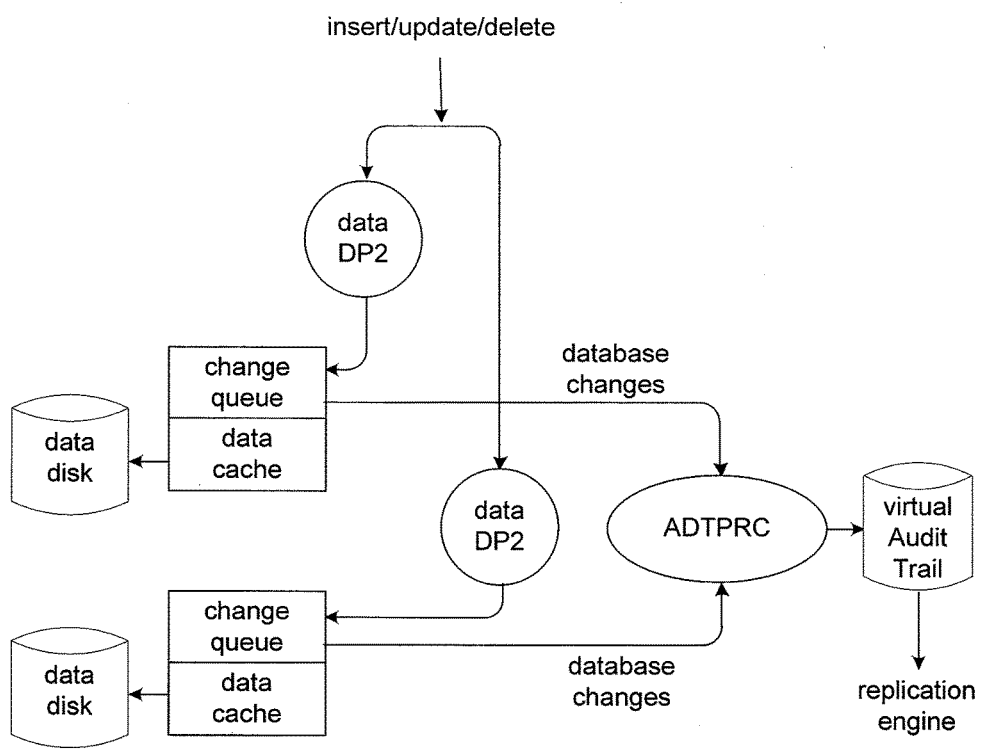
Figure 33c: Enhancements to Minimize Materialization Delays: Reading Changes from DP2 Change Queues

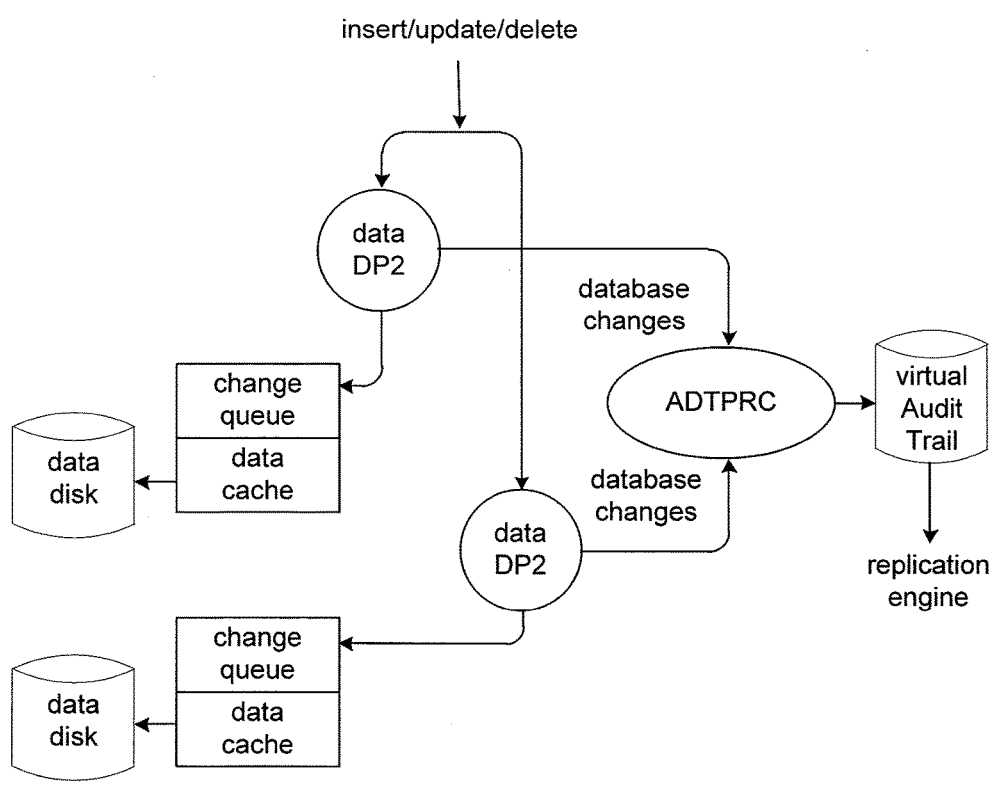
Figure 33d: Enhancements to Minimize Materialization Delays: Reading Changes from DP2 Processes

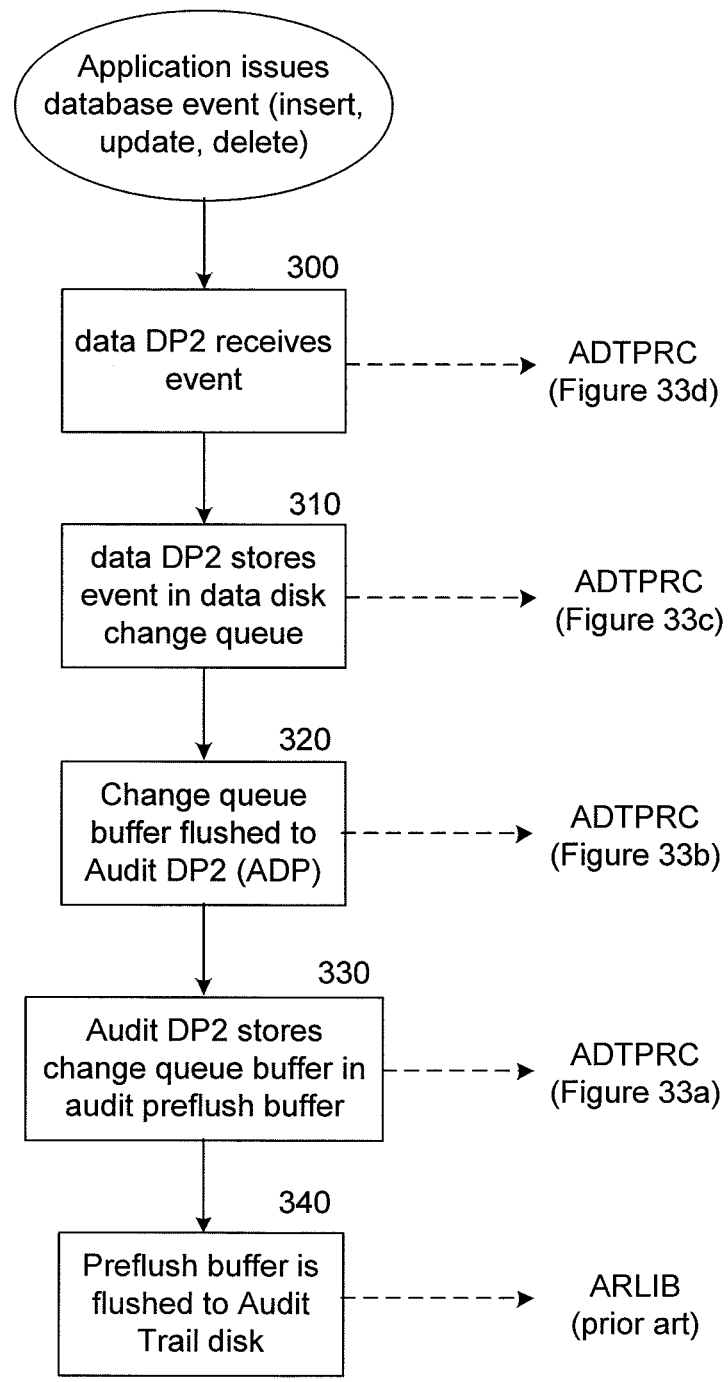
Figure 34: Flow Chart for Reducing Materialization Delay

SOURCE-SIDE MERGING OF DISTRIBUTED TRANSACTIONS PRIOR TO REPLICATION

CROSS-REFERENCE TO RELATED APPLICATIONS

This application is a continuation of copending U.S. patent application Ser. No. 14/163,362 filed Jan. 24, 2014, the entire disclosure of which is incorporated by reference herein.

This application claims priority to U.S. Provisional Patent Application No. 61/756,831, filed on Jan. 25, 2013, entitled "Efficient, Consistent, and Complete Merging and Replaying of Distributed Transaction Logs," the entire contents of which are incorporated by reference herein.

BACKGROUND OF THE INVENTION

Section 1: Definitions

The following definitions describe the use of certain terms in this specification and are provided to promote understanding of the present invention. They are hierarchically ordered in that each definition builds on previous definitions.

Table—A set of data values that is organized using a model of horizontal rows and vertical columns. The columns are identified by name, and the rows are uniquely identified by the values appearing in a particular column subset (the table's primary key, defined below). A table usually characterizes an entity set. Each row in the table describes an instance of the entity set. Each column describes an attribute of the entity set.

File—The equivalent of a table for nonrelational databases. A file is made up of records, and each record describes an entity instance. A record is made up of fields, each of which describes an attribute of the entity set. In this specification, the term "table" is to be interpreted as "table or file."

Database—A collection of related tables or files.

Relational Database—A highly structured database that allows rapid searching and aggregation of data via indices.

Data Manipulation Language—The operations that control the contents of a database, such as insert, update, and delete a row or record.

Data Definition Language—The operations that control the structure of a database, such as add or delete a column, a row, or a table.

Column—A table component that holds a single attribute of the entity set, such as SALARY.

Field—A file component that holds a single attribute of the entity set, such as SALARY. In this specification, the term "column" is to be interpreted as "column or field."

Row—A table component that represents an entity instance. It is a sequence of {column name, value pairs} usually implemented as a sequence of values positioned according to their corresponding column names. For instance, (EMPLOYEE NUMBER, 235), (NAME, Joe Smith), (DEPARTMENT, Accounting), (SALARY, $30,000).

Record—The same as a row, but "row" is usually used for relational databases; and "record" is usually used for file systems. In this specification, the term "row" is to be interpreted as "row or record."

Primary Key—A column or combination of columns that uniquely identifies each row in a table. For instance, EMPLOYEE NUMBER for the EMPLOYEE table. Alternatively, the physical or logical position of the row for certain database systems. There may be more than one primary key in a table.

Foreign Key—A column or combination of columns that contains the primary key(s) of another table or row. For instance, the DEPARTMENT column in an EMPLOYEE table, where the DEPARTMENT table contains the individual departments (as rows) in the company. There may be more than one foreign key in a row.

Child—A row that contains at least one foreign key.

Parent—A row that has a primary key equal to one or more foreign keys. Parent/child relationships are not necessarily hierarchical. For instance, two rows in different tables may point to each other. Each is a parent to the other row.

Consistency—A database attribute in which any column that is declared a foreign key can contain only values from a parent table's primary key. That is, every child must have a parent.

Correctness—A database attribute that indicates that all data item values are correct.

Referential Integrity—A database attribute in which the database is consistent, correct, and conforms to all application constraints.

Source Database—The current application database.

Source System—The system holding the source database.

Target Database—The database to which the source database changes are being replicated.

Target System—The system holding the target database (can be the same system as the source system).

Lock—Prevents data from being corrupted or invalidated when multiple users try to write to a row. Any single user can only modify those database rows to which it has been granted a lock that gives it exclusive access. Additionally, a lock is often used to prevent inconsistent data from being read by applications. For instance, data being updated is typically locked until its transaction is committed.

Program—An executable set of programming code for providing a specific function.

Process—A program running in a computer. One program can be spawned as multiple named processes.

Transaction—A delimited set of database operations (inserts, updates, deletes) that are either all made or none are made. A transaction is guaranteed to leave the database in a consistent and correct state, and its results are guaranteed to survive any system failures.

ACID Properties—Transactions maintain the ACID properties of atomicity, consistency, isolation, and durability. Atomicity means that either all operations contained within the transaction are executed against the database or that none are. Consistency means that at any time, the view of the database represents an accurate view of the application data. Isolation means that a transaction is unaffected by other transactions that are executing simultaneously. Durability means that the resulting modification to the database by a transaction will survive any subsequent system failures.

Begin Transaction—A directive that indicates the beginning of a transaction. A begin transaction directive may be explicit, or it may be implicit with the first database operation for a transaction, Commit Transaction—A directive that indicates that a transaction has successfully completed and should be made durable.

Abort Transaction—A directive that indicates that a transaction has been unsuccessful and should have no effect on the database.

Transaction Bracketing—Defines the scope of the transaction from the begin transaction directive to the terminating commit or abort event or token.

Two-Phase Commit—A technique used by a transaction manager to guarantee that all changes in a transaction are made to all involved systems, or that none are. The first phase is the prepare phase in which each resource is asked if it has safe-stored all database changes within the scope of the directive. If so, a commit directive is sent to all resources during the commit phase. If any resource replies negatively, an abort directive is sent to all resources.

Transaction End State—The commit or abort of a transaction. Usually represented by an event, a token, or a marker in the replication stream. A logical position may also be used.

Hung Transaction—A transaction whose end state is unknown until it is resolved. This can occur, for instance, if the replication network fails between the prepare phase and the commit phase of the two-phase commit protocol.

Transaction Manager—A facility for ensuring that transactional updates to a database maintain the ACID properties.

Distributed Transaction—A transaction that spans two or more systems.

Root Transaction—That part of a distributed transaction that contains the updates made by an application to the database resident on the application's system.

Subordinate Transaction—That part of a distributed transaction that contains updates to databases on systems other than that upon which the application resides.

Transaction Log—A file of all changes made to a database by a transaction manager.

Change Queue—A sequential list of all changes made to a database. A transaction log is one example of a change queue.

Materialization Delay—The time from when a change is made to a database to the time that the change appears in the transaction log.

Natural Flow Order—The sequence of data changes that are applied to the source database.

Related Data—Data updates that are interdependent and must be applied to the target database in natural-flow order in order to ensure the consistency and correctness of the target database.

Related Transactions—Transactions that are interdependent and must be applied to the target database in natural-flow order in order to ensure the consistency and correctness of the target database.

Landed Order—A relaxed version of natural flow order. Data changes are applied in natural-flow order within each table or partition or row, and related transactions are committed in natural-flow order. However, data changes to different tables or partitions or rows within the same transaction and unrelated transactions may not follow natural-flow order. Therefore, landed order does not necessarily guarantee database consistency during the transaction update since for example a child row in one table may be inserted before its parent row in another table. However, consistency is guaranteed at transaction commit time.

Audit Trail—A file of all changes made to a database. A transaction log is one example of an Audit Trail.

MAT—The Master Audit Trail in a multidisk audit trail that coordinates entries in auxiliary audit trails (AUXs).

AUX—An Auxiliary Audit Trail in a multidisk audit trail that contains changes to a database under the control of a MAT.

ARLIB—A facility for reading changes from an Audit Trail in landed order. Changes within a table are read in order. Changes in different tables are not necessarily read in order.

AUDRDR—A facility within ARLIB that reads the contents of an audit disk.

Data Replication—The propagation of changes from a source database to a target database or application intended to keep the target database in synchronization with the source database. Replication is often done at the transaction level.

Data Replication Engine—A facility for replicating source database changes to a target database or application.

Collector—A component of a data replication engine that reads database changes from a change queue and sends them to the target system over a communication channel. Also called an Extractor.

Consumer—A component of a data replication engine that receives changes made to a source database and applies them to a target database. Also called an Applier.

Replay Thread—A separate processing thread in a Consumer that can apply the updates for a single transaction independently from other threads within the Consumer. A replay thread can be instantiated as a separate process, as threads within a process, or as both.

Multithreaded Consumer—A Consumer containing multiple replay threads. The replay threads may be internal threads within the Consumer process, multiple Consumer processes, or multiple Consumer processes each with multiple internal threads. In this specification, the term "multiple consumers" is to be interpreted as "multithreaded consumer."

Router—A component of a data replication engine that receives database changes from a Collector and routes them according to some algorithm to one more Consumers.

DOC—A Database of Change file that temporarily stores database changes as they are sent from a Collector to a Consumer.

REPLAY—A component of a data replication engine that replays transactions found in a DOC and sends them to one or more Consumers.

MERGE—A component of a data replication engine that combines memory-resident change events into natural-flow or landed order.

FETCH—A component of a data replication engine that passes memory-resident database changes from a source system to a target system.

Multithreading—A technique for providing multiple parallel paths for simultaneous processing to improve capacity, load balancing, and performance. Any of the data replication engine components can be multithreaded.

Linkage—A method for combining distributed transactions at the target system in which the root and subordinate transactions contain information linking each other.

Expected Ends—A method for combining distributed transactions at the target system in which an indication such as a token is sent down each replication thread indicating the end state of a distributed transaction on that thread.

Section 2: Background of the Invention (Sections 3-6)

Section 3: Replication

Data replication has many uses in today's IT environments. A data replication engine tracks changes to a source database and sends those changes in real time to other databases or to other applications, subsystems, middleware feeds, etc. The changes are used to update remote databases to keep them in synchronization or to drive added functionality in disparate applications. Changes may include DML (data manipulation language) changes such as inserts, updates, and deletes; DDL (data definition language) changes that modify the structure or the schema describing the stored data; or locks on data objects.

One primary purpose for data replication is to maintain a remote copy of a database for disaster-recovery purposes. Should the production site fail, the backup site has an up-to-date copy of the application database and is prepared to take over application processing rapidly.

Data replication is also used to feed data warehouses for statistical analyses and data marts for real-time business intelligence. Replication can accomplish this on a real-time basis as events occur at the source, or it can batch the changes and replicate them as microbatches.

Data replication can integrate diverse applications by replicating critical data produced by one application to another to give the target application added functionality based on the data. Often, this can be accomplished without modifying any application code, allowing applications to be agile.

Data replication depends upon having a source of changes that can be sent by the replication engine to the target databases or to target applications. In transaction-processing systems, the underlying infrastructure often provides a log of all changes made to a source database. Alternatively, the application may provide the change log, also referred to as the transaction log. The transaction log can be followed to extract significant changes so that they can be replicated to the targets.

The transaction log may contain changes bundled into transactions, where each transaction begins with a begin transaction directive (which may be implied by the first event in a transaction) and ends with a commit transaction or abort transaction indication such as a token. A transaction exhibits the characteristic of atomicity. That is, either all changes bounded by the transaction are made to the database, or none are. Alternatively, transaction logs may simply contain the changes applied to a database with no transaction bundling.

A transaction log may contain all changes to an entire database. Multiple transaction logs may also be provided for individual applications, for individual processes that make up an application, or for individual systems or disks.

It is important that a replication engine apply changes to a target database or deliver transactions to a target application in the correct order. Natural-flow order means that the order of applying events to the target database or application is identical to the order in which the events were generated by the source system. Natural-flow order can be achieved either by sending the data stream in natural-flow order to the target database or application or by the target database or application reorganizing the flow into that order.

A relaxed version of natural-flow order is landed order, in which changes to different tables or partitions within the same transaction may not be in natural-flow order. Landed order is appropriate if the target database checks referential integrity only at commit time.

If natural-flow or landed order is violated, the resulting flow of changes at the target system may result in incorrect operations, as described later in more detail (see "Data Integrity and Natural Flow" in Section 16).

This background first introduces transaction-oriented databases and the characteristics of their transaction logs. It then looks at some of today's commercially available replication engines and explores their architectures for handling distributed transaction logs and distributed transactions. The background leads to descriptions of improved methods for merging a distributed transaction log. These methods ensure efficient data replication and the consolidation of independent transactions created by a distributed transaction to restore the original transaction so that it can be replayed at the target system preserving the consistency of the original source transaction.

Section 4: File Systems and Relational Databases

A computer application generally requires data upon which to operate. This data is stored in a database that is accessible to the application, which can generate, modify, and read the data in the database.

There are two primary ways in which a database is organized—file systems and relational databases. A file system containsfi/es that are composed of records. Records contain fields. For instance, a payroll file may contain a record for each employee. An employee's record may contain his name, address, social security number, and pay rate organized as separate fields in his record. Examples of file systems are Unix's flat-file systems, IBM's VSAM, and HP NonStop's Enscribe.

A relational database is similar in structure to a file system. It contains tables (analogous to files), rows (analogous to records), and columns (analogous to fields). Examples of relational databases are IBM's DB2, SQL Server, Oracle, and HP NonStop's SQL/MP and SQL/MX.

Both file systems and relational databases utilize a data manipulation language (DML) for inserting, updating, and deleting data and a data definition language (DDL) to describe the objects, attributes, and schema (format) of the data.

File systems were used in early computing applications. File systems were offered by computer vendors, and each file system used a proprietary format that was incompatible with other file systems.

Relational databases are a major advancement that came along decades after the first file systems were introduced. Their advantages come about through standardization. Though different vendors market their own relational databases, their databases all can be accessed and manipulated via a common standard language, SQL (Structured Query Language).

Section 5: Transaction-Oriented Databases

Many databases in modern-day, information-technology systems, whether file systems or relational databases, are transaction-oriented. They can only be modified via transaction semantics. A transaction is a group of related DML or DDL operations such as insert a data record or row, update a record or row, or delete a record or row. The key to transaction-oriented databases is that either all operations within a transaction are executed, or none are. (In some implementations, DDL commands are not required to be within the scope of a transaction. An example is the DDL command to drop (delete) a table in HP's SQL/MP.)

This gives transaction-oriented databases several characteristics that are important for maintaining the integrity of the databases. The characteristics are called the ACID properties of transaction-oriented databases—atomicity, consistency, isolation, and durability (W. H. Highleyman, P. J. Holenstein, B. D. Holenstein, Chapter 10, Referential Integrity, Breaking the Availability Barrier: Survivable Systems for Enterprise Computing; AuthorHouse, 2004). Atomicity means that either all operations contained within the transaction are executed against the database or that none are. Consistency means that at any time, the view of the database represents an accurate view of the application data. Isolation means that a transaction is unaffected by other transactions that are executing simultaneously. Durability means that the resulting modification to the database by a transaction will survive any subsequent system failures.

The atomicity property is key to all of the other ACID characteristics. Operations that must be executed as an atomic entity are held within the scope of a transaction. A transaction manager controls the execution of transactions. A transaction is initiated by an explicit begin transaction command or by an implicit command upon the first operation of the transaction. At the end of the sequence of operations comprising the transaction, the application generating the transaction will issue a commit transaction or abort transaction command. This indicates that the application has completed issuing all of the operations within the scope of the transaction. The changes now can be applied to the target database (commit) or backed out with no effect on the target database (abort).

Note that the transaction may span several disk units and even multiple systems. To handle this complexity, the transaction manager typically enters a two-phase commit process (Jim Gray, Andreas Reuter, *Transaction Processing: Concepts and Techniques*, pp. 18-21; Morgan Kaufmann Publishers, 1993). The first phase, the prepare phase, involves asking each entity if it is able to process and safe-store all of the updates within the scope of the transaction. All entities must ensure that the changes have been safe-stored to persistent storage such as disk before replying positively to the prepare directive. If an entity cannot guarantee the safety of the changes, it replies negatively to the commit directive.

If the transaction manager receives positive responses to its prepare directive from all entities, the transaction manager enters the commit phase. It instructs each entity to commit the transaction. Each entity will apply the changes to the target database or will pass them on to an application.

If one or more entities reply negatively to the prepare directive, the transaction manager instructs all entities to abort the transaction. All entities will undo any changes they have made as a result of the transaction. There will be no changes made to the target database or sent to applications.

A transaction may include subtransactions within its scope. A subtransaction is also bounded by begin/commit directives and is treated as any other transaction. If a subtransaction should abort, the primary transaction can still complete. However, if the primary transaction aborts, all subtransactions are also aborted.

Thus, the transaction guarantees the ACID properties of transaction-oriented databases. Transactions are atomic. All modifications are made, or none are. During the application of the transaction modifications to the database, all data objects that are being modified are locked so that no other application may access them. This guarantees consistency since no application can read "dirty data" that is in the process of being modified. It also guarantees isolation since no other application can modify that data until the transaction holding the locks releases them. Finally, since the result of the transaction commit is to ensure that all effects of the transaction are persistently saved, durability is ensured.

Section 6: The Transaction Log

An important component in transaction-oriented databases is the transaction log. The transaction log records all actions that have affected the contents and structure of the database. These actions include data manipulation language (DML) operations that change the database contents, such as begin transaction, insert, update, delete, and commit operations, and data definition language (DDL) operations that modify the database structure, such as creating new tables and adding columns to existing tables.

The transaction manager guarantees that all changes within the scope of a transaction have been made durable (typically by writing them to a persistent transaction log) before it completes the prepare phase of a transaction. For instance, the transaction log can reside in persistent storage such as disk so that it is durable.

If transactions span multiple systems, there is typically on each system a transaction log that records the database updates made by the system. Means are then provided by the transaction management facility to allow a transaction to be traced through the various logs on the systems that it impacted.

The transaction log provides many important functions. Perhaps the most important is that in many databases, it provides the durability function required by the ACID properties. The durability requirement is that database changes survive any subsequent system failure. This does not mean that the changes have to be physically applied to the database but only that they can be recreated if needed. It is much faster to write changes serially to a transaction log than it is to make them randomly to a database.

Therefore, for performance purposes, transaction managers usually ensure that changes are written to a durable transaction log while maintaining the actual current state of the database in non-durable cache memory. Cached database blocks are written to disk when it is convenient to do so at some subsequent time. Should a system failure cause the contents of the cache memory to be lost, the missing changes can be reconstructed from the durable transaction log by replaying transactions from the point of failure.

Another useful function for the transaction log is security monitoring. All activity associated with the database can be monitored and analyzed to verify that there have been no security breaches or to trace the source of a suspected security breach. The transaction log can also be mined for reporting and statistical analysis purposes.

Finally, since the transaction log is a sequential queue of all changes made to the database, it can be used to replicate changes to one or more remote copies of the database or to other applications. In this case, a separate data replication engine monitors the transaction log and selects changes that are important to replicate. It may filter and reformat the changes before sending them to one or more target sites via an appropriate communication channel.

BRIEF SUMMARY OF THE INVENTION

Section 7—Part I

Large transaction-processing systems today may handle hundreds, thousands, or even tens of thousands of transactions per second. A transaction log writing to a single disk may not be able to keep up with this volume of transactions.

Therefore, it is common to parallelize writing to the transaction log in some way, for example, by distributing it over multiple disk units. The transaction operations are partitioned in some manner so that they can be spread among the several disks comprising the transaction log. In this way, very high transaction rates can be accommodated.

To complicate matters further, multiple systems may be involved in the processing of each transaction. Thus, the transaction log may not only be distributed among several disks, but also across many systems.

This creates a problem for the data replication engine since it now must track changes over several disks that may be distributed across multiple systems. Consequently, the data replication engine can become a bottleneck as it tries to switch between disks and systems in order to properly track the transaction log.

Multithreading of replication-engine components can be used if the higher replication rates could overload replication-engine components. (See W. H. Highleyman, P. J. Holenstein, B. D. Holenstein, Chapter 10, Referential Integrity, *Breaking the Availability Barrier: Survivable Systems for Enterprise Computing*; AuthorHouse, 2004. See also, U.S. Pat. No. 7,801,851 (Holenstein et al.), which is incorporated by reference herein. However, the various replication threads may transfer transaction events at different rates. The result is that transaction events may be received at the target system in arbitrary order, not in the natural-flow or landed order that they were applied to the source database. It is the purpose of a first method of the present invention to provide a synchronizing facility between the replication threads to ensure that the transaction events are applied to the target database in landed order when multithreading of replication components is used.

Another problem created by a multithreaded replication engine is that each thread must read the transaction log to determine which transactions it is to handle. This places an even greater load on the transaction-log disk system. In addition, if replication streams are being generated for multiple environments, such as a disaster-recovery system and a separate data warehouse, separate replication engines are typically used for each environment. The combination of high transaction rates, multiple replication engines, and multiple threads per replication engine can overwhelm even a multidisk transaction log.

A second set of methods described in the present invention eliminates or resolves this problem (see "Methods to Improve the Efficiency of Reading Distributed Transaction Logs" in Section 32). The methods provide processes to pre-fetch change blocks from the transaction-log disks of all systems involved in the transactions and to store the change blocks in the memory of one or more systems. Consequently, the transaction logs only need to be read once for multiple replication environments using multiple replication threads. Data replication engines then can navigate their way through complex log structures in memory rather than on disk.

Another problem is that a transaction may be distributed across multiple systems. On each system, the changes made to that system's database are typically recorded as an independent transaction or subtransaction in the system's transaction log. Prior art replication engines replicate these as independent transactions to the target system, where they are applied as such. Thus, the original transaction consistency is lost—it appears on the target system as a set of independent transactions. A third set of methods is described in the present invention for consolidating the independent transactions created by a distributed transaction back into the original transaction before applying it to the target system (see "Methods to Consolidate Distributed Transactions" in Section 37).

An important parameter in the performance of a data replication engine is the time that it takes from when an update is made to the database to the time that the update is made available to the replication engine. This time is known as the materialization delay. A fourth set of methods is described in the present invention for reducing the materialization delay (see "Methods to Reduce Materialization Delays" in Section 43).

Section 7—Part II

In order to replicate changes, a data replication engine either needs to be told when a change is made to the database, or it needs to poll periodically for changes. Today's transaction-processing systems generally maintain for recovery purposes a log of changes that have been applied to the source database. The log of changes, which is referred to as a transaction log, can be used as a source of database changes to drive a data replication engine. In order to support recovery following a source-system failure, the transaction log must be persistent. Therefore, it typically is stored on disk.

It is important that the data replication stream be applied to the target database in natural-flow order. Natural-flow order means that the order of applying events to the target database is identical to the order in which the events were applied to the source database. Natural-flow order can be achieved either by sending the data stream in natural-flow order or by the target database reorganizing the flow into that order. This is necessary so that the target database or the target application receives changes in a correct and consistent order. That is, the sequence of changes applied by the target system should be in the same order as they were applied at the source system even if the transaction log does not preserve this order.

Precise natural-flow order requires that all changes are applied and all transactions are committed to the target database in the same order that they were at the source database. In this way, the target database will always be a consistent copy of the source database though perhaps delayed in time by the replication latency. A relaxed form of natural-flow order known as landed order can often be acceptable. In this case, related transactions must be committed in natural-flow order; but changes to differing rows within the transactions, and even unrelated transactions themselves, can often be ordered arbitrarily. If the target database checks referential integrity during a transaction, precise natural-flow order is generally required, at least for the events that are related to each other. For all other events, they can often be applied in an arbitrary order, still preserving the overall consistency and correctness of the target database. If the target database checks referential integrity only after the commit of a transaction, landed order is sufficient.

Large systems may handle thousands of transactions a second. Such a transaction rate can quickly overwhelm a single-disk transaction log. Therefore, transaction systems designed for high volume often distribute the log activity over several disks. This adds significant complexity and processing time for a data replication engine to properly follow or reorganize the transaction log so that it can replicate the changes in natural-flow or landed order. As a result, the replication engine may not be able to keep up with high replication rates because of disk access times.

Multithreading of replication-engine components can be used if the higher replication rates could overload replication-engine components (W. H. Highleyman, P. J. Holenstein, B. D. Holenstein, Chapter 10, Referential Integrity, *Breaking the Availability Barrier: Survivable Systems for Enterprise Computing*; AuthorHouse, 2004). However, each thread must now read the transaction log to determine which transactions it is to handle. This puts an even greater load on the transaction-log disk system. Furthermore, transaction events may flow at different rates over the different replication threads. Therefore, they may be received at the target system out of order and must be resynchronized.

In addition, if replication streams are being generated for multiple environments, such as a disaster-recovery system and a data warehouse, separate replication engines are typically used for each environment. The combination of high transaction rates, multiple replication engines, and multiple threads per replication engine can overwhelm even a multidisk transaction log. The methods described in this invention eliminate or resolve these problems. The methods provide a means to resynchronize transaction events at either the source and/or the target system into natural-flow or landed order. In addition, they provide processes to pre-fetch change blocks from the transaction-log disks and to store them in memory. Consequently, the transaction log only needs to be read once for multiple replication environments using multiple replication threads. Data replication engines then can navigate their way through complex log structures in memory rather than on disk.

Another problem is that a transaction may be distributed across multiple systems. On each system, the changes made to that system's database are recorded as an independent transaction. Prior art replication engines replicate these as independent transactions to the target system, where they are applied as such. Thus, the original transaction is lost—it appears on the target system as a set of independent transactions. Methods are described in this invention for consolidating the independent transactions created by a distributed transaction back into the original transaction before applying it to the target system.

The performance of replication engines is affected by the time delay from when an update is made to the source database to the time that the update is made available to the replication engine. This delay is known as materialization delay. Methods are described to reduce or eliminate materialization delay.

(Section 8 appears below in the Brief Description of the Drawings section.)

Section 9: Additional Background (Sections 10-26)

An example of a prior-art, transaction-oriented database and its transaction log is the Transaction Management Facility (TMF) used by HP NonStop systems. TMF's distributed transaction log is called the Audit Trail. The Shadowbase suite of replication products from Gravic, Inc., Malvern, Pa., U.S.A., can be configured to replicate events from the TMF Audit Trail. The Shadowbase replication engine detects database changes and replicates them to other databases and applications. In the following description, TMF and the Shadowbase data replication engine are used for illustrative purposes. The methods described for the present invention to efficiently read and merge the log partitions in a distributed transaction log apply equally well to any distributed transaction log and to any replication architecture.

Section 10: The HP NonStop Operating System

The core of the HP NonStop operating system (FIG. 1) is the NonStop Kernel (NSK). The NSK controls all of the input/output functions of a NonStop system—the communication subsystem and, of most importance to this discussion, the disk storage subsystem.

The transaction manager, TMF (Transaction Management Facility), uses the facilities of NSK to control the commit or abort of transactions and to create the Audit Trail.

The operations comprising a transaction are generated by the Enscribe file system and the NonStop SQL relational database system in response to commands issued by an application. The NSK provides the functions to apply these operations to the application database, and TMF monitors the operations to provide transaction control.

Two personalities exist for applications to use the NonStop operating system. The Guardian personality offers the proprietary NonStop interface used since developers designed the original system, then known as Tandem, in the late 1970s. The OSS (Open System Services) personality adds the modern, UNIX-like interface commonly used as one of the standard programming models today.

A NonStop system can include up to sixteen independent processors. The various software components are distributed among these processors in such a way that the system will survive any single processor failure.

Software components are implemented as processes. A process is a program running in a computer. Any given program can have several instantiations of separately named processes running at any one time. Critical processes are configured as process pairs, with each process of a process pair running in a separate processor. Should the primary process fail either due to a hardware or software problem, its backup takes over immediately with no interruption in processing.

Section 11: The HP NonStop Disk Storage Subsystem

The NonStop disk storage subsystem (FIG. 2) underlies both the Enscribe file system and the NonStop SQL relational database. A typical NonStop system will have tens or hundreds of disk volumes. The Enscribe file systems and NonStop SQL databases usually are distributed across the disk volumes.

All disk volumes are typically mirrored. That is, there generally are two physical disks for each logical volume; and all updates are made to both volumes simultaneously. Should a volume fail, its mirror can be used to continue processing.

Each mirrored disk volume is managed by a separate disk process known as a data DP2 (Disk Process Version 2) process. Critical to the operation of the system, data DP2 processes are implemented as process pairs. One of the processes in the pair is designated as the primary process, and it manages its disk volume. The backup DP2 process is available to instantly take over should the primary DP2 process fail. Primary and backup DP2 processes run in different processors to protect access to the database against a processor failure.

Section 12: The HP NonStop Transaction Management Facility (TMF)

The HP NonStop Transaction Management Facility (TMF) is responsible for managing transactions. A simplified view of TMF is shown in FIG. 3. It will begin a transaction either explicitly based on a begin transaction command issued by the application or implicitly based upon the first operation for a transaction.

Insert, update, and delete database commands generated by the application (1) are routed by the NonStop Kernel to the appropriate data DP2 processes for the database partitions they manage. When a data DP2 process receives a database command, it locks that data object so that no other application can modify it. The data DP2 also stores the change in a change queue and updates the database image in its data-cache memory.

TMF manages a set of Audit Trail disks (the reason for multiple Audit Trail disks will be described later). As with the data disks, there is an Audit Trail DP2 (ADP) disk process for each Audit Trail disk. Each Audit Trail disk also has a preflush buffer. Under certain conditions, a data DP2 will flush its change queue to an Audit Trail's preflush buffer (2). This will happen if the data DP2 change queue fills, if a specified timeout has elapsed, or if (as described next) a commit command is received by TMF.

When the application issues a commit command (3), the command is routed to TMF. TMF will execute its two-phase commit protocol to ensure that all updates within the scope of the transaction are made or that none are.

Upon receiving a commit command from the application, TMF enters the Prepare phase for that transaction. It sends a Prepare request to all data DP2 processes that were involved in the transaction (4a) (a data DP2 is involved in the transaction if it has performed any operation on behalf of the transaction). The Prepare request causes each data DP2 process to flush its change queue to an ADP preflush buffer (4b). Each data DP2 that is successful in doing so returns a Ready indication to TMF (4c).

When TMF has received a Ready signal from all data DP2s involved in the transaction, it knows that all changes associated with the transaction being committed are in the ADP preflush buffers or have already been flushed to disk along, of course, with many other changes. At this point, TMF enters a commit indication for the transaction into the ADP preflush buffers (5a). If any DP2 does not respond positively, TMF instead issues an abort command and enters an abort indication (not shown) into the ADP preflush buffers.

At some point, the ADP preflush buffers will be flushed to the Audit Trail disks (5b). At this point, the changes are said to be materialized. They have been safe-stored in the Audit Trail; and the transaction is now durable, as it can be reconstructed from the Audit Trail should the database changes be lost by the data DP2s because of some failure. (The time between TMF's decision to commit and the flush of changes to the Audit Trail is governed by a complex algorithm designed to optimize the functions of TMF while minimizing the performance impact on applications.)

As soon as the changes have been flushed to the Audit Trail disks, TMF will notify the data DP2s involved in the transaction that the transaction has either been committed or aborted (5c). If the transaction was committed, each data DP2 will apply the changes to its portion of the database. If the transaction was aborted, each data DP2 will roll back the changes and ignore them. In any event, each data DP2 will release its locks on the data objects that it modified. At this time, the application is also notified that the transaction has been committed or aborted (5d).

Section 13: The TMF Audit Trail

Large transaction-processing systems can generate transaction rates that can overwhelm writing to a single disk. To solve this problem, TMF distributes its Audit Trail over several disks, as shown in FIG. 4. A Master Audit Trail (the MAT) guides the distributed access to the Audit Trail. In addition to the MAT, the Audit Trail may have one or more Auxiliary Audit Trails (the AUXs) using independent disks. The MAT and the AUXs can be accessed in parallel. The MAT provides the information to resequence the changes in the proper order.

Several disks typically are available for each MAT and AUX, as shown in FIG. 5. Each disk in a MAT or AUX pool is managed by a mirrored ADP. These disk pools allow TMF to close a MAT or an AUX file and to begin a new one on a different disk, choosing disks in a round-robin fashion. In this way, several past Audit Trails are always available online for data recovery or for backup to tape to avoid contention with the active audit trail's disk. When a MAT or AUX file is to be reused, its contents are typically first written to magnetic tape or to virtual tape for historical archiving. Writing round-robin files on different disks allows an audit file to be backed up from one disk without interfering with the efficient sequential writing of the current Audit-Trail file on another disk.

The MAT and each AUX service a specified number of data DP2 processes. In TMF, a data DP2 process is typically not split between the MAT and AUXs. This ensures that all changes made to a disk by a data DP2 will be reflected in the Audit Trail in the correct order—a requirement for database consistency. If the changes made by a data DP2 process are split between a MAT and AUXs, these events must be sequenced via another method such as a global sequencer saved with each event.

As described above, a data DP2 periodically flushes the changes accumulated in its change queue to the preflush buffer of the MAT or AUX to which it is assigned. These changes are ultimately written to an Audit Trail disk, thus materializing the changes.

The MAT coordinates the writing and reading of the MAT and the AUXs. Changes made to the disks whose data DP2s the MAT is servicing are written to the MAT. However, changes made to disks whose data DP2s are being serviced by an AUX are written to that AUX's disks; and pointers in the MAT link all changes in the proper time or event sequence.

The organization of data on the MAT and the AUXs is shown in FIG. 6. In this figure, the sequence of change records starts with the beginning of the file (Record 1) in the MAT. The MAT is read sequentially through Record 4, at which point a link to Record 5 in AUX 1 is found. AUX 1 is next read sequentially through Record 7, when the Audit Trail is linked back to Record 8 in the MAT. This process continues, reading Records 8 through 12 from the MAT, Records 13 through 17 in AUX 2, Records 18 through 22 in the MAT, Records 23 through 25 in AUX 2, and Records 26 through 27 in the MAT.

Thus, using the MAT as a guide, the changes in the distributed Audit Trail are read in the proper sequence.

Section 14: Distributed Transactions

A database can span multiple systems. If a transaction against that database spans multiple systems, each system has an Audit Trail that records the changes made to its portion of the database. A transaction has a root node that is the system on which the transaction was begun. The transaction's subordinate nodes are the other systems to which the transaction has applied changes. On each node is an Audit Trail that records the changes to the database on that node. The MAT on the transaction's root node contains the information required to link the changes made by the transaction across all nodes—the transaction's root node and its subordinate nodes. Changes in the Audit Trail on a specific system can be read via an Audit Reader process resident on that system.

For instance, consider two systems, System 1 and System 2, as shown in FIG. 7. System 1 has a database, DB1. TMF writes DB1's changes to its NonStop Audit Trail, ADT1, in System 1. ADT1 is read by the process Audit Reader 1, which feeds changes to Replication Engine 1. Likewise, System 2 has a database, DB2, whose changes are written to Audit Trail ADT2. Audit Reader 2 reads changes from ADT2 and feeds data to Replication Engine 2.

Consider following a transaction of the following form as issued by an application on System 1:
Begin transaction
Insert record into DB1
Insert record into DB2
Commit transaction TMF will treat this as a distributed transaction. It will create two related transactions, one on each system:
System 1: (root transaction)
  Begin transaction
  Insert record into DB1
  Commit transaction
System 2: (subordinate transaction)
  Begin transaction
  Insert record into DB2
  Commit transaction TMF associates the two transactions via links in the root and subordinate transactions. However, in current state-of-the-art data replication engines, the change to DB1 in system 1 is replicated as an independent transaction via Replication Engine 1 to the target system. Likewise, the change to DB2 is replicated as an independent transaction via Replication Engine 2. TMF uses the two-phase commit protocol to ensure that all changes are made to both DB1 and DB2 or that none are.

State-of-the-art replication engines do not typically recognize distributed transactions. Rather, the transaction changes on the root node and the transaction changes on the subordinate nodes are replicated by individual replication engines on each node as separate transactions. Unless some mechanism is available to combine these transactions into a single transaction, they will be treated as separate transactions at the target node and will be applied as such to the target database or will be sent as such to target applications. One purpose of the present invention is to teach combining these separate transactions into a common transaction reflecting the original transaction.

The problem of distributed transactions has been described with respect to HP NonStop TMF. However, this same problem permeates other state-of-the-art transaction monitors whether the database spans multiple systems or not.

Section 15: Data Replication

Most commercially available data replication engines today follow a basic architecture, as shown in FIG. 8. A Collector or Extractor process follows the transaction log and selects changes that are to be replicated. It sends these changes over a communication channel to a Consumer or Applier that applies the changes to a target database and/or transfers the data changes to a target application.

The Collector process may either poll the transaction log to periodically read changes, or it may register with the transaction-processing system to receive changes as they are applied to the database, thus eliminating polling delays.

Section 16: Data Integrity and Natural Flow
(Sections 17-21)

Section 17: Natural Flow

It is important that the data applied to a target database or sent to a target application is consistent and correct. Otherwise, the data may become corrupted either temporarily or permanently. Consistency and correctness at the target can be guaranteed if the data is applied to the target in the same sequence as that applied to the source database. This is called the natural flow of database modifications. Natural-flow order can be achieved either by sending all changes over the replication channel in natural-flow order or by reordering the changes received at the target system into natural-flow order before applying or consuming/processing them.

Section 18: Landed Order

Landed order is a relaxed version of natural-flow order. With landed order, all updates to any given table or partition or row or column are made in natural-flow order so that the partition or table contents are always correct. Furthermore, transactions are committed in natural-flow order to ensure the referential integrity of the database. However, updates within a transaction to different partitions or tables may be made in an arbitrary order.

Landed order is appropriate for transaction management systems in which referential integrity checking is done only at transaction commit time (or deferred to commit time). However, if referential integrity checking is applied to each update, the updates must be in natural-flow order. Otherwise, for instance, a foreign key reference may be inserted for a target row that does not yet exist (see "Consistency Violations" in Section 19), and the transaction will be rejected.

HP NonStop systems currently only support landed order.

Section 19: Consistency Violations

Among other requirements, consistency requires that foreign keys are satisfied. A foreign key is a link in one row to another row in the database by specifying the primary index or key of the target row. The row containing the foreign key (the value of the primary key of the target row) is the child. The row to which its foreign key points is the parent. If a child row is received at the target without a parent or before the parent row is received, it may be useless in any further computation until the parent row is received. Depending upon how the database manager is configured, a child row that is an orphan may be rejected by the target.

The effects of a consistency violation due to not following natural-flow or landed order are shown by example in FIG. 9. A new customer, ABC, places an order for product X. The application generates a new row in the Customer Table containing the information about the customer (name, address, etc.). The application then generates in the Order Table a row describing the order. This is a child row, and it contains a link to the new customer row, the parent row (the link is the primary index of the customer row such as the customer number). If these changes are applied to the target database out of sequence, causing the order row to be applied at the target before the customer row, the order row may not be able to be processed and may be rejected by the target since there is no customer for the order. The result is that a new customer has been added to the source database, but his order has been lost in the target database.

If the Customer Table and Order Table updates described in the example above are part of the same transaction and updates are made in landed order, these updates may not be applied in natural-flow order. It is possible that the Order Table update will be applied before the customer update. This would cause an intratransaction consistency violation. The target database may or may not allow an out-of-order sequence. If the target database checks consistency as it applies each change event, the transaction may be rejected. However, if the target database checks consistency only at commit time (e.g. it defers consistency checking to commit time), it is tolerant to intratransaction consistency violations so long as the result is correct when the commit is processed.

Section 20: Correctness Violations

Correctness requires that the values within a column always be correct. A correctness violation caused by the failure to enforce natural-flow or landed order is shown in FIG. 10. Row A is the subject of two consecutive updates at the source database. The first update sets it to a value of 10. The second update sets it to a value of 20. However, if these updates are received in opposite order at the target either within a transaction or via two separate transactions, the result will be that row A at the target is left with a value of 10, which is wrong.

Section 21: Intratransaction and Intertransaction Natural-Flow and Landed Order

There are two cases of natural-flow and landed order to be considered—intratransaction natural flow and intratransaction natural flow. Intratransaction natural flow is the correct ordering of changes within a transaction. Intertransaction natural-flow or landed order is the correct ordering of transactions.

Returning again the NonStop system that was described earlier with reference to FIG. 1 through FIG. 4, in this system, correctness is not a problem since all changes to a particular data volume or partition are controlled by a single DP2 process. Therefore, all changes to that data volume and to the files and tables that it contains will be recorded in the Audit Trail in the correct order. Correct replication, of course, depends upon the replication engine ultimately applying the sequence in which changes are recorded in the Audit Trail.

However, intratransaction consistency cannot be guaranteed by the NonStop architecture since related tables or files may be on different volumes; and the order in which flushing occurs to these volumes from their respective data DP2s is indeterminate. Thus, it is possible that a child row on one volume may be replicated before its parent on another volume since there is currently no guarantee of proper ordering of changes across DP2s. Thus, HP NonStop systems support landed order but not natural-flow order. This may present a problem to a target that enforces intratransaction consistency.

In order to prevent database corruption following a transaction commit, related transactions (those that affect a common set of data) must be committed in natural-flow order (which landed order also accomplishes). This guarantees intertransaction consistency. Since the transaction-commit tokens are all recorded in the MAT in the same order that they occurred at the source database, following the Audit Trail via the MAT ensures that transactions will be accessed in the proper order. It is up to the data replication engine to ensure that they will be applied in this order. However, if there are multiple Extractor threads following the Audit Trail, other steps must be taken to ensure intertransaction integrity since proper transaction ordering is no longer guaranteed. Examples of such steps are addressed later (see "Multithreaded Replication" in Section 26).

Section 22: Database Partitioning

Typically, large or heavily accessed databases are split into several partitions. For instance, one partition may be the database tables; and other partitions hold indices into these tables. Alternatively, the database itself may be split into partitions based on primary keys. For instance, all customers whose names begin with A through M are assigned to one partition; and the remaining customers whose names begin with N through Z are assigned to another partition. Again, other partitions hold the indices into the partitioned tables.

Partitions allow a large database to be spread across multiple data disks. In some cases, the database size exceeds the capacity of a single disk; and multiple data disks are required to store the entire database. In addition, by spreading an active database across several data disks, performance can be improved significantly because the disks can be read from and written to in parallel.

A partition can be assigned only to the MAT or to one AUX, though the MAT and AUXs may service multiple partitions. All changes to a partition are recorded in its associated MAT or AUX. The MAT contains the linking information that allows a transaction to be traced through all of the Audit Trail disks on its system.

Section 23: Data Replication with NonStop RDF

HP includes with its NonStop systems a prior-art data replication engine, RDF (Remote Database Facility), for replicating a database from one NonStop system to another. The architecture of RDF is shown in FIG. 11.

RDF provides a set of Extractor processes (equivalent to the Collector process in FIG. 8) to read the MAT and each AUX on the source system. Each Extractor communicates the contents of its assigned Audit Trail disks to a Receiver on the target system. The Receiver writes the contents of the replicated MAT or AUX to its Image Trail disk. The result is that the Image Trail disks represent a slightly delayed up-to-date copy of the source system's Audit Trail (though some unrelated content on the source system may be filtered out and not replicated).

One or more RDF Updater processes for each Image Trail follow the changes added to the Image Trail and apply them to the target database. Each partition is assigned to only one Updater to ensure that all updates to that partition are made in natural-flow order so as to avoid correctness violations. However, an Updater may handle multiple partitions resident on the Image Trail to which it is assigned.

RDF ignores source-transaction boundaries and makes no attempt to ensure the consistency of the target database. RDF creates its own transactions for each Updater. Each RDF transaction may include updates from several different source transactions. Consequently, updates for a single source transaction may be included as part of multiple independent transactions spread across the target database partitions. Because RDF does not preserve the source transaction's boundaries, the target database is generally inconsistent and potentially in a corrupted state during replication.

Moreover, records already applied and committed to the target database by RDF may be subsequently aborted. This adds to the invalidity of target data as read by a target application. If a source transaction is aborted, RDF must replicate, apply, and commit the backout events from the source system in order to make the target database consistent.

Thus, the target database cannot be accessed by other applications during replication unless they can tolerate the data corruption. Records may be in the process of being modified, and the database may be inconsistent because transaction boundaries are not recognized. In no event can applications write to the target database while data is being replicated by RDF.

In addition, failover is complex and relatively time-consuming, typically taking several minutes or longer to repair the database before it can be put into service. If the target system must take over processing following a source-system failure, it must go through a complex process to bring its database into a consistent state. RDF uses its Image Trails to roll forward completed transactions and uses the source system's Audit Trail to roll back incomplete transactions. Compounding this problem is that the transactions stored on the Image Disks bear no relation to the transactions that were committed on the source system. Some updates may be committed on the Image Trails that were not committed on the source. Other updates may have been committed on the source but not on the Image Trails.

However, all RDF functions are performed at the operating-system level and are very efficient, thus lessening the load on the source and target systems during normal replication.

Section 24: Data Replication with the Shadowbase Replication Engine (Sections 25-26)

The Shadowbase data replication engine, from Gravic, Inc., replicates database changes from a source database to one or more target databases or target applications. The Shadowbase data replication engine supports heterogeneous environments and can replicate from a number of database products to the same or different database products. The manner in which the prior-art Shadowbase data replication engine interfaces with the NonStop Audit Trail to perform its functions is described next.

Section 25: Single-Threaded Replication

As shown in FIG. 12, the Shadowbase replication engine uses the ARLIB Audit Reader Library supplied by HP to follow the Audit Trail. The Shadowbase Collector process follows the sequence of changes controlled by the MAT. The Shadowbase replication engine maintains persistent cursers for the MAT and for each AUX. A cursor is a pointer to the next change in a MAT or AUX for the Collector to read.

The Collector reads changes from the MAT via ARLIB until it gets to a link to an AUX. As shown in FIG. 6, the link tells the Collector which AUX to use, where to start in the AUX, and how many changes to read from that AUX. The Collector then reads the specified number of change events from the designated AUX, starting at the current cursor position for that AUX. After reading the requisite number of changes, the Collector resumes reading changes from the MAT, starting at the MAT's current cursor position.

Prior art Audit Trail Readers from various vendors replicate to only one environment. They configure separate reading subsystems to replicate to different environments, such as a backup system and a data warehouse. The preferred-embodiment methods described herein require only one reading subsystem for all replication environments.

The changes read by the Collector are sent over a communication channel to a Shadowbase Consumer process. The Consumer applies the changes to a target database or forwards them to a target application.

Target transactions are managed by the Consumer. When a Consumer receives a begin transaction command or the first change for a new transaction (an implicit begin-transaction command), it begins a separate transaction on the target. All further changes associated with that transaction that are received by the Consumer are applied within the scope of the Consumer's transaction. When a Consumer receives a commit or abort token in the replication stream, it commits (or aborts) its transaction. Since commit or abort tokens are applied in the same sequence as the source database commits or aborts were executed, natural-flow or landed order is ensured; and intertransaction integrity is guaranteed.

Section 26: Multithreaded Replication

Transaction-processing systems handling very high transaction rates can exceed the replication bandwidth of a single Shadowbase Consumer. To handle these situations, the Shadowbase replication engine supports multiple replication threads. See, U.S. Pat. No. 7,801,851 (Holenstein et al.); U.S. Pat. No. 8,117,154 (Highleyman et al.); and U.S. Pat. No. 8,250,029 (Holenstein et al.), each of which are incorporated by reference herein. However, transaction commits now are flowing over separate threads and can arrive at the target in any order. Unless some provision is made, intertransaction natural-flow or landed order is lost.

Furthermore, it typically takes a Consumer more time to apply a change than it does for a Collector to read a change. Therefore, there are generally many more Consumers than Collectors. In fact, the Consumers may come from a pool. If transaction rates increase, more Consumers can be spawned from the pool. If transaction rates decrease, some Consumers can be returned to the pool or can be stopped to recover system resources.

There are several ways in the prior art to provide resynchronization of transaction events at the target system in a multithreaded environment. Two such methods are shown in FIG. 13a and FIG. 13b. In FIG. 13a, a single Collector drives two or more Consumer threads. In this case, the Collector must read the entire Audit Trail. Alternately, as shown in FIG. 13b, two or more independent Collector/Consumer threads may be configured and each assigned to one or more Audit Trail disks (MAT or AUXs). In this case, each Collector must read only the Audit Trail disks to which it is assigned. Collectors reading AUX disks usually also read the MAT disk to determine transaction bracketing, since this information is contained only in the MAT.

Each Consumer is assigned a set of tables that are used by related transactions. Related transactions are those that must commit in natural-flow or landed order with respect to each other. For instance, a customer table and an order table are related, as are a department table and an employee table. In this case, the customer and order tables can be replicated to one Consumer; and the department and employee tables can be replicated to a separate Consumer.

When a Consumer receives a transaction commit, it will commit all updates within the scope of that transaction to the tables that it is managing. Thus, a single source transaction may result in multiple target transactions if the transaction updates are spread across multiple Consumers. Since updates for all related tables are sent in natural-flow or landed order to only one Consumer, that Consumer guarantees that all updates to its related tables are made in natural-flow or landed order. The order of updates and commits of transactions carried by other threads is immaterial to the Consumer since these other transactions bear no relationship to its transactions.

However, in some applications, transactions are so interrelated that such an assignment may result in most tables being assigned to the same thread, thus minimizing the performance advantages of multithreading. If this assignment cannot be made, alternate architectures may be used. Several examples are shown in FIG. 14a through FIG. 14d.

In FIG. 14a and FIG. 14b, one or more Collectors participate in reading the Audit Trail with no particular restriction on which changes are read so long as the design ensures that every change is replicated once and only once. The Collectors send their changes to a common Router on the target system. The Router has at its disposal a set of Consumers. The Router assigns each new transaction to one of the Consumers, and the Consumer begins a transaction for that specific transaction on the target system. Thereafter, all changes associated with that transaction are passed to the assigned Consumer, which will apply the changes and will commit or abort the transaction when it receives a source commit or abort directive from the Router. The Consumers coordinate among themselves to ensure that updates, commits, and aborts are executed in natural-flow or landed order.

Alternatively, as shown in FIG. 14c and FIG. 14d, the commit responsibility can be shifted from the Consumers to the Router. In this approach, one or more Collectors participate in reading the Audit Trail with no particular restriction on which changes are read so long as the design ensures that every change is replicated once and only once. The Router controls all transactions and assigns each transaction to a particular Consumer. The Consumer will begin transactions on the target database for the transactions assigned to it. Thereafter, the Router will send all changes for a particular transaction to the Consumer that has been assigned responsibility for that transaction. As the Router receives transaction commits, it will send the commits to the appropriate Consumers, ensuring that commits are applied in the proper order.

A Consumer can be assigned multiple transactions simultaneously by the Router. The Consumer will apply all changes for its transactions as it receives them from the Router under the appropriate transaction ID. If a completed transaction is being held up until its commit can be executed, the Consumer handling that transaction nevertheless may continue to process changes for other transactions currently in progress that committed prior to the transaction being held by the Consumer.

In the examples of FIGS. 14a-14d, the Router may receive events and commits out of sequence since they are being sent to it over separate threads. Furthermore, the multiple Consumers represent different threads, and some may be faster than others. There is no guarantee that the events distributed by the Router to the Consumers will be applied to the target database in the sequence that they were sent to the Consumers. Therefore, some mechanism must exist to ensure that events are ultimately applied to the target database by the Consumers in natural-flow or landed order.

It is a purpose of the present invention to provide a means to synchronize transaction events received in an arbitrary order from multiple replication threads so that the multiple Consumers will apply the events to the target database in natural-flow or landed order.

In FIG. 14a and FIG. 14c, the single Collector may be implemented to subsume the functions of the Router and route transactions directly to specific Consumers.

BRIEF DESCRIPTION OF THE DRAWINGS

Section 8

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

FIG. 1 shows at a high level the organization of the prior art HP NonStop operating system. The heart of the operating system is the NonStop Kernel (NSK).

FIG. 2 shows the organization of the prior art HP NonStop disk storage subsystem. Each pair of mirrored data disks is managed by a redundant disk process (DP2).

FIG. 3 shows the steps executed by the prior art HP NonStop Transaction Management Facility (TMF) as it begins, manages, and commits a transaction.

FIG. 4 shows the organization of the prior art HP NonStop TMF Audit Trail with its Master Audit Trail disk (MAT) and an optional number of Auxiliary Audit Trail disks (AUXs).

FIG. 5 shows the prior art organization of disk pools for the MAT and each AUX.

FIG. 6 shows the prior art process of tracking changes to a NonStop database through a MAT and one or more AUXs.

FIG. 7 shows the prior art architecture for distributing a transaction across multiple systems.

FIG. 8 shows a sample prior art data replication engine reading changes from a transaction log and sending changes to a target database or a target application.

FIG. 9 shows an example of a prior art consistency violation caused by not following natural-flow or landed order in the replication stream.

FIG. 10 shows an example of a prior art correctness violation caused by not following natural-flow or landed order in the replication stream.

FIG. 11 shows a sample configuration of the architecture of the prior art HP NonStop Remote Database Facility (RDF) data replication engine.

FIG. 12 shows the architecture of the prior art Shadowbase data replication engine from Gravic, Inc.

FIG. 13a shows a prior art Shadowbase configuration with a single Collector and with multithreaded Consumers Each Consumer is assigned a set of related tables.

FIG. 13b shows a prior art Shadowbase configuration with multithreaded Collectors and multithreaded Consumers. Each Collector is assigned a set of related tables.

FIG. 14a shows a prior art Shadowbase configuration with a single Collector and multithreaded Consumers and a target-side Router. The Router assigns each Consumer a transaction to manage.

FIG. 14b shows a prior art Shadowbase configuration with multithreaded Collectors and multithreaded Consumers and a target-side Router. The Router assigns each Consumer a transaction to manage.

FIG. 14c shows a prior art Shadowbase configuration with a single Collector, multithreaded Consumers, and a target-side Router that coordinates the transactions.

FIG. 14d shows a prior art Shadowbase configuration with multithreaded Collectors, multithreaded Consumers, and a target-side Router that coordinates the transactions.

FIGS. 15a and 15b illustrate a technique for ensuring natural-flow or landed order when multiple Consumers are employed in accordance with one preferred embodiment of the present invention.

FIG. 16 shows a flow chart for resynchronizing multithreaded target transactions in accordance with one preferred embodiment of the present invention.

FIG. 17a shows a configuration for efficiently creating one or more replication streams by directly accessing and merging changes on the source system that have been preloaded into Audit Trail memory buffers from the Audit Trail disks. This is in accordance with one preferred embodiment of the present invention when the Audit Trail disks are all on the same processor.

FIG. 17b shows a configuration for efficiently creating one or more replication streams by directly accessing and merging changes on the source system that have been preloaded into Audit Trail memory buffers from the Audit Trail disks. This is in accordance with one preferred embodiment of the present invention when the Audit Trail disks are distributed across multiple CPUs in the same system.

FIG. 18 shows the configuration of FIG. 17b with multithreaded Consumers in accordance with one preferred embodiment of the present invention.

FIG. 19a shows the merge function moved to the target system with a single-processor source system and a single Consumer in accordance with one preferred embodiment of the present invention.

FIG. 19b shows the merge function moved to the target system with a multiprocessor source system and a single Consumer in accordance with one preferred embodiment of the present invention.

FIG. 20 shows the merge function moved to the target system with memory buffers on multiple source systems in accordance with one preferred embodiment of the present invention.

FIG. 21 shows the merge function moved to the target system with a multiprocessor source system and multi-threaded Consumers in accordance with one preferred embodiment of the present invention.

FIG. 22 shows a configuration for efficiently creating one or more replication streams on the source system by subscribing to change streams from Audit Trail memory buffers that have been preloaded from the Audit Trail disks in accordance with one preferred embodiment of the present invention.

FIG. 23 shows the configuration of FIG. 22 with multithreaded Consumers in accordance with one preferred embodiment of the present invention.

FIG. 24 shows a configuration for efficiently creating a replication stream on the target system by subscribing to change streams from source-system Audit Trail memory buffers that have been preloaded from the Audit Trail disks in accordance with one preferred embodiment of the present invention.

FIG. 25 shows the configuration of FIG. 24 with multithreaded Consumers in accordance with one preferred embodiment of the present invention.

FIG. 26 shows the efficient merging of distributed transaction logs and the generation of independent replication streams to multiple target systems in accordance with one preferred embodiment of the present invention.

FIG. 27 shows a flow chart for the various methods of using cache memory to increase the efficiency of reading Audit Trails.

FIG. 28 shows the merging of distributed transactions into a single replication stream on the source system in accordance with one preferred embodiment of the present invention.

FIG. 29 shows the merging of distributed transactions into a single transaction on the target system in accordance with one preferred embodiment of the present invention.

FIG. 30 shows the merging of distributed transactions by using information linking the root and subordinate transactions in accordance with one preferred embodiment of the present invention.

FIG. 31 shows the merging of distributed transactions by using expected ends in accordance with one preferred embodiment of the present invention.

FIGS. 32a and 32b show flowcharts for methods to merge distributed transactions into a single transaction applied to the target database or target application in accordance with one preferred embodiment of the present invention.

FIGS. 33a-33d show methods of improving the NonStop TMF and disk subsystems to minimize materialization delays according to one preferred embodiment of the present invention.

FIG. 34 shows a flow chart for the various methods to minimize materialization delays in accordance with one preferred embodiment of the present invention.

DETAILED DESCRIPTION OF THE INVENTION

Certain terminology is used herein for convenience only and is not to be taken as a limitation on the present invention.

| Table of Contents | |
|---|---|
| Section 1: | Definitions |
| Section 2: | Background of the Invention |
| Section 3: | Replication |
| Section 4: | File Systems and Relational Databases |
| Section 5: | Transaction-Oriented Database |
| Section 6: | The Transaction Log |
| Section 7: | Brief Summary of the Invention |
| Section 8: | Brief Description of the Drawings |
| Section 9: | Additional Background |
| Section 10: | The HP NonStop Operating System |
| Section 11: | The HP NonStop Disk Storage Subsystem |
| Section 12: | The HP NonStop Transaction Management Facility (TMF) |
| Section 13: | The TMF Audit Trail |
| Section 14: | Distributed Transactions |
| Section 15: | Data Replication |
| Section 16: | Data Integrity and Natural Flow |
| Section 17: | Natural Flow |
| Section 18: | Landed Order |
| Section 19: | Consistency Violations |
| Section 20: | Correctness Violations |
| Section 21: | Intratransaction and Intertransaction Natural-Flow and Landed Order |
| Section 22: | Database Partitioning |
| Section 23: | Data Replication with NonStop RDF |
| Section 24: | Data Replication with the Shadowbase Replication Engine |
| Section 25: | Single-Threaded Replication |
| Section 26: | Multithreaded Replication |
| Section 27: | Detailed Description of the Invention |
| Section 28: | A Method to Resynchronize Target Transactions in a Multithreaded Replication Environment |
| Section 29: | Router Transaction Control |
| Section 30: | Consumer Transaction Control |
| Section 31: | Flow Chart for Target Transaction Resynchronization |

-continued

| Table of Contents | |
|---|---|
| Section 32: | Methods to Improve the Efficiency of Reading Distributed Transaction Logs |
| Section 33: | Log Merging from Cache Memory |
| Section 34: | Log Merging Using Publish/Subscribe |
| Section 35: | Multiple Targets |
| Section 36: | Flow Chart for Efficient Merging |
| Section 37: | Methods to Consolidate Distributed Transactions |
| Section 38: | Source-Side Consolidation |
| Section 39: | Target-Side Consolidation |
| Section 40: | Linkage |
| Section 41: | Expected Ends |
| Section 42: | Flow Chart for Merging Distributed Transactions |
| Section 43: | Methods to Reduce Materialization Delays |
| Section 44: | Reducing or Eliminating Materialization Delays |
| Section 45: | Flow Chart for Reducing Materialization Delay |
| Section 46: | Summary |

Section 27: Detailed Description of the Invention (Sections 28-46)

When a multithreaded replication engine is used, a means must be provided to reorganize transaction events into natural-flow or landed order at the target system. The invention described below provides parallel replay to the target database or application while preserving natural flow or landed order of the events applied to the target. The ability to replay events in parallel can greatly increase the speed and efficiency of replication.

Section 28: A Method to Resynchronize Target Transactions in a Multithreaded Replication Environment (Sections 29-31)

Section 29: Router Transaction Control

Such a mechanism is illustrated in FIG. 15a. In this figure, three transactions, tx1, tx2, and tx3 are shown in the time sequence of the natural-flow order in which they were generated at the source system. The Router assigns tx1 to Consumer 1, tx2 to Consumer 2, and tx3 to Consumer 1 (Consumer 1 has been assigned two transactions). In the figure, the begin directive for transaction n is represented by bn. The commit directive for transaction n is represented by cn. An update to row X by transaction n is designated uxn. Thus, transaction 1 makes updates to row A and row B before it is committed.

Source-side locking of data objects within the scope of a transaction guarantees that the source target database maintains referential integrity. That is, it is consistent and correct. However, since the Router may receive the events comprising these transactions out of order should multiple Collectors or multiple paths from the Collector to each Consumer be employed, the first step is for the Router to resequence the events into their natural-flow or landed order. It does this via sequencing information contained in the event stream such as timestamps, event numbers, and/or event positions. The result is shown in the "Router List" under "natural flow event order" in FIG. 15a.

Note that transaction 1 cannot update row B (ub1) until transaction 2 has committed (c2) at time t2 since transaction 2 has updated row B (ub2) first. Transaction 2 holds a lock on Row B from the time that it updates row B to the time that it is committed. Likewise, transaction 3 cannot update row A (ua3) until transaction 1 has committed (c1) at time t1 since transaction 1 is holding a lock on row A until it is committed.

Also note that transaction 3 makes two updates to row D ($ud3_1$ and $ud3_2$). These updates must be made in natural-flow or landed order to ensure the end-state correctness of row D.

In the case of Router transaction control, as shown in FIG. 14c and FIG. 14d, the Router forwards the events to the associated Consumers from its Router List until it reaches a commit directive as shown in FIG. 15b. This includes all of the events in the "apply" sequence shown in FIG. 15a. As shown in FIG. 15b, there is a delay from the time that the Router receives an event until that event is sent to a Consumer due to the processing delay in the Router (1) (2).

The Consumers can apply these updates to the database in the landed order in which they are received since they are guaranteed to be independent events (except for those events affecting the same data object, which must be applied in natural-flow order, which is, if fact, the order in which the Consumer receives the events from the Router).

However, when the Router reaches a commit directive in the Router List, as shown in the "coordination point times" column, the Router must pause event forwarding and send the commit to the Consumer responsible for that transaction (3). Only upon receiving a commit response from the Consumer (4) can the Router proceed to pass further events to the Consumers. This procedure ensures that related data updates in multiple transactions are applied to the target database in proper order.

In the example in FIG. 15b, pausing at c2 prevents ub1 from being passed to Consumer 1. If Consumer 1 were to be ahead of Consumer 2, it might apply ub1 before Consumer 2 was able to apply ub2, thus causing a deadlock or a correctness violation (in which case, row B would end up being set to ub2 rather than to ub1).

As an alternate embodiment, the Router could command all Consumers but the one involved in the transaction to pause, but the Router would continue to pass updates to the Consumers. Consumers would hold the updates that originally occurred on the source after the commit and not apply them until they received permission from the Router. In some cases, this may improve the performance of database updating since the inactive Consumers would be queuing and preparing updates during their paused (idle) time.

Another alternate embodiment for transaction coordination is to allow the Consumers (as well as individual transactions being replayed at the same time inside one Consumer) to apply all updates as they receive them, up to the point of a commit in their sequence of received events. If a Consumer applies an update (and thus a lock) to a data item that is yet to be updated by an earlier transaction, the two Consumers (or replay threads inside the same Consumer) will deadlock. The Consumer (or replay thread) with the earlier transaction will not be able to update its data item and cannot continue to its commit. The Consumer (or replay thread) with the later transaction should not commit until the earlier transaction commits. Otherwise the data will end up with an incorrect value. To resolve the deadlock, the Consumer(s) and/or replay threads will coordinate thru some form of communication such as inter-thread or inter-process messages, shared memory, signals, or queues, and the one with the later transaction will back off and try later, thus letting the Consumer (or replay thread) with the earlier transaction complete its updates and commit its transaction.

An alternative method to correct the deadlock problem described above is to "precommit." With this procedure, an earlier transaction that finds that a later transaction has locked one of the data items that the earlier transaction is trying to commit will commit the updates that it has currently made. This will release the later transaction, which can commit and release its locks, thus allowing the earlier transaction to restart, apply its remaining updates, and commit those updates. In the event that the earlier transaction is aborted, means must be provided for backing out the precommitted updates.

Section 30: Consumer Transaction Control

In the case of Consumer transaction control as shown in FIG. 14a and FIG. 14b, the Consumers receive their associated commits as soon as the Router reaches those commits in its Router list. The different Consumer threads might apply updates and commits out of order if no means is provided to control the order of event execution. In these cases, it is up to the Consumers to coordinate with each other to ensure that updates are applied to the database in natural-flow or landed order as described above.

This method is also applicable to the architectures shown in FIGS. 13a-13b. In that prior art figure, the changes to each table were committed as independent transactions as described earlier in the Section entitled "Multithreaded Replication" in Section 26. Using the ordering method described above and in FIGS. 15a and 15b as an alternative embodiment to the present invention, each transaction may be applied to the target database as a single transaction, thus preserving the original source transaction's consistency. The Consumers can coordinate among themselves to ensure that updates are applied in natural-flow or landed order. Alternatively, with respect to FIG. 13a, the single Collector can provide the transaction event ordering of the Router as described with reference to FIG. 14 and send these events to the Consumers in natural-flow or landed order.

Section 31: Flow Chart for Target Transaction Resynchronization

A flowchart describing the steps in the target transaction resynchronization process is shown in FIG. 16. When the Router receives a transaction event from the source system (100), it stores it in its Router List in natural flow or landed order (depending upon the source system) based on an event time stamp, an event number, or some other sequencing information (110).

If this is a commit event (120), the Router checks to see if it is the next commit in the expected commit sequence (for instance, by a transaction identifier) (130). If it is not a commit or is not the next expected commit, the Router waits for another event from the source system (100).

If the event is the next commit event (130), the Router sends all of the events that have accumulated in the Router List up to the commit's coordination time point, as shown in FIG. 15a, to the appropriate Consumers (140). It then sends the commit to the Consumer that is handling that transaction (150).

The Router waits for that Consumer to acknowledge that it has committed its transaction (160), and then checks to see if the next commit has already been received (170). If so, steps 140 and 150 are repeated for all events that have been received up to the latter commit's coordination time point.

If the next commit has not yet been received (170), the Router waits for the next event from the source system (100).

Section 32: Methods to Improve the Efficiency of Reading Distributed Transaction Logs (Sections 33-36)

Even with multiple replication threads, the complexity of the Audit Trail structure is a limiting factor in the capacity of a replication engine. It presents several challenges to the replication engine:

1. The following of the Audit Trail requires a significant amount of disk accessing. First, the MAT disk must be read. Encountering an AUX pointer causes a transfer to an AUX disk and subsequently back to the MAT disk. Each switch between disks requires significant disk-access time to position the disk heads properly and to wait while the block is read.
2. A transaction may be distributed across multiple systems. On each system, the changes made to that system's database are recorded as an independent but linked transaction. Prior-art replication engines replicate these transactions as independent transactions to the target system, where they are applied as such. Thus, the original transaction end-to-end consistency is lost—it appears on the target system as a set of independent transactions.

A method to improve the efficiency of reading a distributed transaction log is described next. The description uses the NonStop TMF and Audit Trail architectures as well as the Shadowbase data replication engine to illustrate the procedure. However, the method is applicable in general to any distributed transaction log and replication engine.

The method decouples Collectors from the transaction-log disks and thus prevents them from being delayed by disk accesses. Consequently, Collectors can operate at memory speeds, thus significantly increasing replication capacity. Decoupling Collectors from the disks is accomplished by having separate readers for the MAT and each AUX (or for each individual disk in the MAT and AUX disk pools) to preload the contents of the MAT and the AUXs into memory buffers. The changes then can be merged from memory to create a single replication stream in natural-flow or landed order sequence for each replication environment that needs the replication data.

The methods described herein for improving the efficiency of reading distributed transaction logs are illustrated in FIG. 17a through FIG. 26. Though in these figures each MAT and AUX is shown as comprising one disk read by one AUDRDR, it is understood that these can comprise multiple disks for transaction log rollover, as described earlier and shown in FIG. 5. Each set of MAT or AUX disks may be read by one or more AUDRDR processes.

Section 33: Log Merging from Cache Memory

One method of improving Audit Trail reading efficiency is shown in FIG. 17a. In this embodiment, an audit-reading process, AUDRDR, is provided to read each MAT or AUX disk directly. Each AUDRDR reads blocks from its assigned MAT or AUX Audit Trail and writes them directly into its own circular memory buffer. The AUDRDRs can provide filtering of those events that are not needed by any target system. When AUDRDR writes a block into the last position of the memory buffer, it starts again at the beginning of the buffer and continues to write. If AUDRDR reaches a memory block that has not yet been processed, it pauses until blocks in the buffer become free before continuing its reading.

The memory buffer may be implemented as main memory, as solid-state disk, or as any other memory medium. When "memory" is referenced below, it refers to any of these implementations.

Meanwhile, a MERGE process performs the functions currently being performed by the Shadowbase Collector through ARLIB, as described earlier. MERGE reads blocks in sequence from the MAT memory buffer. When it reaches a link to an AUX file, it will continue to read the specified number of change blocks from the specified AUX buffer. It then returns to reading blocks from the MAT buffer until it reaches another AUX link.

In multiprocessor systems such as HP NonStop systems, the Audit Trail disks and the MERGE process may be distributed among multiple CPUs, as shown in FIG. 17b. One or more Audit Trail disks with their associated AUDRDRs and memory buffers may be located in each CPU. Typically, a memory buffer can be written and read only by processes resident in the same CPU. Therefore, to pass changes to a MERGE process that may be running in a different CPU, a local process (FETCH in FIG. 17b) may be needed to read its local memory buffer and to pass changes to MERGE via an interprocess message or some other inter-CPU means.

MERGE sends the changes over a communication line to the target system in natural-flow or landed order. As MERGE reads blocks from the Audit Trail buffers, it can filter out events that do not need to be replicated to its particular target environment in order to minimize the load on the replication channel. The MERGE process and/or the Consumers can reformat change events to comply with the needs of the replication target.

For applications with very high transaction rates, multiple Consumers can be configured for the target system, as shown in FIG. 18 for the case of a multiprocessor source system. The replication traffic is intercepted by one or more target-system Routers that route transactions to specified Consumers, as described earlier with respect to FIG. 14. The Routers coordinate among themselves to ensure natural-flow or landed order of the changes applied to the database or delivered to an application (W. H. Highleyman, P. J. Holenstein, B. D. Holenstein, Chapter 10, Referential Integrity, *Breaking the Availability Barrier: Survivable Systems for Enterprise Computing*; AuthorHouse, 2004).

Though the components that implement this embodiment are shown in FIG. 17a, FIG. 17b and FIG. 18 as being resident on the source system, only the Audit Trails and AUDRDRs typically need to be on the source system. The other components can be on the target system. Alternatively, the memory buffers and the FETCH processes can be on the source system with the FETCH processes feeding the MERGE process on the target system.

To illustrate these other possible embodiments, FIGS. 19a and 19b recast FIGS. 17a and 17b, respectively, and show the memory buffers and the MERGE process on the target system for a source system comprising a single CPU and for a source system comprising multiple CPUs. The AUDRDR process is separated into two processes—an AUDRDR transmitter and an AUDRDR receiver. The AUDRDR transmitter reads its assigned Audit Trail disk and sends the changes to its companion AUDRDR receiver. The AUDRDR receiver stores changes in its memory buffer for the MERGE process, which creates a transaction stream, as described earlier.

Alternatively, with reference to FIGS. 17a and 17b, just the MERGE process could be moved to the target system. The FETCH processes on the source system feed changes from their buffers to the MERGE process on the target system as shown in FIG. 20 for a multi-CPU environment.

FIG. 21 shows this embodiment being applied to a multithreaded environment, as shown in FIG. 18. The description of this embodiment is otherwise the same as that for FIG. 18.

In FIG. 17a through FIG. 21, the preferred embodiment shows processes as separate bubbles. However, multiple processes within a single CPU can be combined into a single process or be implemented as separate threads in one or more processes.

Section 34: Log Merging Using Publish/Subscribe

A modification of the above technique is for the MERGE process to receive MAT and AUX blocks from the memory buffers via a publish/subscribe mechanism, as shown in FIG. 22. In this configuration, the AUDRDRs read blocks from their assigned disks and write them into their circular buffers, as described earlier. However, in this case, the MERGE process subscribes to each AUDRDR to receive buffer updates. When an AUDRDR reads a new block, it publishes the block. A published block is made available to all subscribers, which in this case is the MERGE process, typically via an interprocess message, a queue, or some other inter-process means. When the MERGE process receives a block, it stores it in its own memory buffer with other unprocessed blocks. (The MERGE memory buffer is optional, as the MERGE process memory may be used instead to store the data blocks.)

Similar to earlier procedures, the MERGE process works its way through the MAT blocks, transferring to the specified AUX blocks when it receives a link in the MAT pointing to an AUX block. The result is the same as with the procedure described earlier. The replication stream is guaranteed to be in natural-flow or landed order; and if one Consumer can handle the transaction rate, it can apply the changes to the target directly.

However, if the transaction rate is too high for a single Consumer or for a single communication line, multiple communication lines and/or Consumers can be provided. In this case, the replication stream is received at the target system by one or more Routers (FIG. 23), which route transactions to specific Consumers. As described above with merging from cache memory, if multiple Routers are configured on the target system, the Routers coordinate among themselves to ensure natural-flow or landed order of the changes applied to the database or delivered to an application.

Though the components that implement this embodiment are shown in FIG. 22 and FIG. 23 as being resident on the source system, only the Audit Trails and AUDRDRs typically need to be on the source system. The other components can be on the target system. Alternatively, the queue of buffers feeding the MERGE process can be on the source system and the MERGE process can be on the target system.

To illustrate these other possible embodiments, FIG. 24 recasts FIG. 22 and shows the memory buffers and the MERGE process on the target system for a source system comprising a single CPU. The AUDRDR process is separated into two processes—an AUDRDR transmitter and an AUDRDR receiver. The AUDRDR transmitter reads its assigned Audit Trail disk and sends the changes to its companion AUDRDR receiver. The AUDRDR receiver stores changes in its memory buffer. The MERGE process subscribes to these changes; and as they become available, they are entered into the queue for the MERGE process, which creates a transaction stream, as described earlier.

Alternatively, with reference to FIG. 22, just the MERGE process could be moved to the target system. The AUDRDRs queue changes to MERGE via a source-resident queue that is read by MERGE across the network.

FIG. 25 shows this embodiment being applied to a multithreaded environment, as shown in FIG. 23. The description of this embodiment is otherwise the same as that for FIG. 23.

Section 35: Multiple Targets

In the preferred embodiment, multiple target databases and target applications can be driven with individualized replication streams by the replication architectures described above. As shown in FIG. 26, a MERGE process is provided for each target. All MERGE processes work off the same memory buffers fed by the AUDRDRs, but each MERGE process does its own filtering and reformatting according to the needs of its specific target. Therefore, the MAT and AUX disks comprising the Audit Trail need only be read once no matter the number of replication targets or the number of replication threads in each replication engine. This is a significant improvement over prior art, which typically requires that the Audit Trail be read independently for each replication thread for each replication target.

In a multiprocessor system such as the NonStop server, which can contain up to sixteen independent processors, multiple MERGE processes can be distributed among many processors. The AUDRDRs also can be distributed among different processors. This balances the load across the processors.

A multiprocessor environment such as NonStop servers also can provide fault tolerance for the replication engines. Using a process monitor such as HP NonStop Pathway, a failed MERGE process, a failed FETCH process, or a failed AUDRDR can be restarted automatically in a surviving processor. The MERGE and FETCH processes and the AUDRDRs can maintain persistent restart pointers so that they know where to continue in the Audit Trail following a restart.

Section 36: Flow Chart for Efficient Merging

A flow chart that describes the various methods for efficient merging of distributed transaction logs is shown in FIG. 27. AUDRDRs are provided to read the MAT and each AUX (200). An AUDRDR may be assigned to a MAT and/or one or more AUXs. When an AUDRDR reads an event from a MAT or an AUX (205), it stores that event in a memory buffer assigned to it. If the AUDRDR's memory buffer is in the same CPU (210), the event is stored AUDRDR's local memory buffer (215). If the AUDRDR's memory buffer is in a different CPU (220) and that CPU is a source CPU, the AUDRDR transfers the event to the source CPU's memory buffer (225), If the memory buffer is in the target CPU, AUDRDR transfers the event to the target CPU for storage in its memory buffer (230).

Events may be accessed directly by the MERGE process from the memory buffers or may be sent to MERGE via a publish/subscribe mechanism (235). If MERGE reads events directly from the memory buffers (240), and if the memory buffers are in the same CPU as MERGE (245), they are read directly from memory by MERGE (250). If they are in a different CPU (source or target), they are read from that CPU or those CPUs (255). In either event, the event stream in landed or natural-flow order is created. If the system uses a single Consumer (260), the event stream is sent to that Consumer (265). If the system uses multiple Consumers, the event stream is sent to one or more Routers for distribution to the Consumers (270).

If publish/subscribe is used to send events to MERGE (235), then the events are sent to MERGE (275) to store in its memory buffer. MERGE (280) will create an event stream (285) and send it to the Consumer(s) as described above (260, 265, 270).

Section 37: Methods to Consolidate Distributed Transactions (Sections 38-41)

The above sections have described methods to improve the efficiency of reading transactions that are distributed over multiple Audit Trail disks. Transactions also can be distributed over multiple systems, as discussed in the section entitled "Distributed Transactions" (Section 14). Such transactions result in independent transactions being recorded on each system involved in the transaction. Each independent transaction includes the changes made to that node's database along with transaction linkage information describing transaction attributes such as the root or subordinate nodes.

Independent replication engines are provided for each of the systems. In the prior art, these replication engines replicated only the transactions found on their nodes (see FIG. 7). Thus, a distributed transaction is applied to the target system as a set of independent, unrelated transactions.

In many applications, it is important for a distributed transaction to be applied to the target database as a single transaction containing the same updates that were applied to the source systems that were party to the transaction. Methods to achieve this goal are described next. One method involves consolidating the transaction on the source system. Another method involves consolidating the transaction on the target system.

Section 38: Source-Side Consolidation

One method for consolidating distributed transactions on the source system is shown in FIG. 28. As described earlier, a distributed transaction updates databases on two or more systems. It is recorded as independent transactions on the systems involved in the transaction. Each independent transaction contains the updates for its system. The system on which the transaction is initiated is called the root node. Other systems involved in the transaction are called subordinate nodes.

An ARRDR process is provided to read the Audit Trail on each node. As the ARRDR process on the root node (ARRDR1) reads the MAT Audit Trail on its system (1), it will come across the beginning of a new transaction. It follows the updates for that transaction through its local MAT and AUXs, as described earlier, passing them to a MERGE process (2). However, at some point, the MAT may link to a transaction on another system that is, in fact, part of this transaction. ARRDR1 must now go to the subordinate system to continue to access the updates of the original transaction.

Each system has a Daemon process that has access to the ARRDR process (ARRDR2) on its system. The root node will send a request to the Daemon process on the subordinate node (3) that asks for the updates contained in the subordinate transaction. The Daemon process will access the subordinate transaction via its ARRDR2 process (4) and will return these updates to the MERGE process on the root node (5).

The MERGE process merges the subordinate transaction updates with those of the root transaction and feeds the results as a single transaction to the replication engine (6).

As a result, the original transaction is replicated to the target system in its entirety as a single transaction.

Section 39: Target-Side Consolidation (Sections 40-41)

A method for consolidating transactions on the target system is shown in FIG. 29. No changes are made to the source systems. Rather, they replicate their root and subordinate transactions independently to the target system.

A MERGE process on the target system receives the replication streams and stores the transaction updates temporarily in a data structure. For instance, the data structure may be a Database of Change (DOC) file. The DOC file may either be memory resident for high performance, or it may be written to persistent storage such as disk for recovery purposes. The DOC file is read by a REPLAY process, which passes transaction information and updates to one or more Routers that, in turn, assign updates to one or more Consumers, as described earlier.

Section 40: Linkage

In order to merge distributed transactions into the original transaction, the REPLAY process must be able to identify root transactions and their subordinates. One method to do this is for each root transaction and/or each subordinate transaction to carry information linking the subtransactions that make up an original transaction. The target system then knows which transactions it must merge in order to recreate the original transaction.

For instance, as shown in FIG. 30, the root transaction may carry the identity of subordinate transactions in its commit directive (it is known at commit time which subordinate transactions have occurred). This information may include for each subordinate transaction its system identifier and transaction identifier. Likewise, the begin directive of each subordinate transaction may contain the system identifier and transaction identifier of the root transaction.

As soon as the first subtransaction (either root or subordinate) of a distributed transaction is received, a begin-transaction command is issued for the original transaction by the REPLAY process and is passed to the Routers. This action initiates a new target transaction. As updates are received for any of the subtransactions, they are passed by REPLAY to the Routers as part of the new target transaction. When the commits for all of the subtransactions have been received, the REPLAY process issues a commit directive for the target transaction to the involved Router so that it may inform its Consumer to commit the transaction, as described earlier. The complete set of subtransactions has now been applied to the target database as a single transaction equivalent to that originally specified by the application.

Section 41: Expected Ends

Another method for consolidating the subtransactions of a distributed transaction on the target system is called "expected ends," as shown in FIG. 31. When each subtransaction (root or subordinate) is completed, an expected-end token is attached to the commit directive or inserted following the commit directive. This token provides the system identifier and transaction identifier of the root transaction. If a system has not been involved in the transaction, it is directed to send an expected-end token for the transaction anyway. Alternatively, the source system can inform the target system as to the number of expected ends to expect for each transaction.

When the REPLAY process receives the first expected-end token from any of its source systems, it begins a transaction on behalf of the root transaction. As it receives subtransactions for the root transaction, it applies the updates of those transactions, if any, to the target database in proper order. When REPLAY has received expected-end tokens from all source systems or from the expected number of source systems, it knows that it has received and replayed the entire original source transaction; and it sends a commit directive to the Router.

Alternatively, once a transaction is begun, its events can be queued until all expected ends have been received. At this point, the entire transaction is replayed and committed.

In some embodiments of the above methods, the DOC file and MERGE process may not be necessary. The replication streams may be fed directly to the REPLAY process for distribution to the Routers. The REPLAY process will maintain an internal file in its memory equivalent to the DOC file so that it can manage distributed transactions.

Section 42: Flow Chart for Merging Distributed Transactions

Flowcharts showing the logical sequence for merging distributed transactions are shown in FIGS. 32a and 32b. FIG. 32a shows the flow for source-side merging. The ARRDR in the root node (ARRDR1) (500) reads an event from its Audit Trail (510). If this is not a link to an AUX on another subordinate system (520), it sends the event to the MERGE process for replication to the target system (530).

If it is a link to an AUX on a subordinate system, it accesses the Daemon process on that system and begins to follow the AUX event sequence on that system (540). The Daemon process uses the ARRDR2 on the subordinate system (550) and sends the events in the AUX sequence back to the MERGE process on the root system (or to the ARRDR1 on the root system for forwarding to the MERGE process) (560) for replication to the target system. When the end of the subordinate AUX event sequence is reached by the Daemon process (570), control is returned to the root node to continue reading from its MAT.

The merging of distributed transactions on the target system is shown in FIG. 32b. Events have been sent by the MERGE process to a Database of Change (DOC) file, and a REPLAY process (600) follows the DOC, reading events from it. If expected ends are not being used (605), REPLAY will process a transaction (610). To do so, it finds the next root transaction in the DOC file and reads its events (615). It sends these events to the Consumer if there is only one Consumer or to the Router(s) if there are multiple Consumers (620).

When it has processed the root transaction, it can read a token indicating what the subordinate transactions are (or this information may be implicitly contained in the root transaction commit directive). Using this information, REPLAY reads the subordinate transaction events from the DOC (625) and sends them to the Consumer or Router(s) (630). When it has completed processing all subordinate transactions, it begins processing the next root transaction in sequence (610).

If expected ends are being used (605), REPLAY will read the next event in the DOC (635). If it is a begin transaction for a transaction that REPLAY has not yet started (640), it will begin that transaction (660).

If the event is an expected end (645), REPLAY checks to see if all expected ends have been received (650). If so, the transaction is committed (655). In any event, the next event is read from the DOC and processed (635).

Section 43: Methods to Reduce Materialization Delays (Sections 44-45)

Section 44: Reducing or Eliminating Materialization Delays

The techniques described above for improving the efficiency of following the change sequence in distributed transaction logs are still burdened with the problem of materialization delays, which can cause the presentation of updates to the replication engine to be delayed.

In NonStop systems, the problem can be addressed by providing a capability for the replication engine to optionally read from the transaction log's prefetch buffer rather than from the disk itself, as shown in FIG. 33*a*. In this case, the next block for a MAT or an AUX disk can be read from the ADP's preflush buffer via an Audit Trail Process (ADT-PRC) as soon as data has been flushed by a data DP2 process even if that data has not yet been written to the physical Audit Trail disks. The ADTPRC creates a virtual Audit Trail with its MAT and AUXs and writes it to a disk file or to a memory structure for a replication engine to follow, thus bypassing part of the materialization delay.

Rather than waiting for the changes to appear in the preflush buffer, the Audit DP process (ADP) could send the data change buffer directly to ADTPRC as it was storing it into its preflush buffer (FIG. 33*b*).

Of course, this enhancement simply pushes the problem back one step. If the next block for the MAT or an AUX disk has not been flushed from its DP2 data disk to the Audit Trail preflush buffer, the replication engine must still wait for that flush.

An alternate solution is to have the stream of changes flow directly from the DP2 data-disk change queues to the ADTPRC process (FIG. 33*c*) and then to merge this stream with the commit and abort tokens. This approach effectively eliminates materialization delays.

Another approach would be to feed the ADTPRC process directly from the DP2 processes (FIG. 33*d*) so that changes would immediately become available to the replication engine as soon as these processes received the changes. TMF would insert commit and abort tokens into this stream for transaction control.

Section 45: Flow Chart for Reducing Materialization Delay

These methods are summarized in the flow chart of FIG. 34. The database changes could be presented to the ADTPRC as soon as a DP2 data disk process received them (FIG. 33*d*) (300). This method would effectively eliminate materialization delays. Alternatively, the system could wait until the DP2 data disk process wrote the changes to its change queue (FIG. 33*c*) (310) before presenting them to ADTPRC. This method would substantially eliminate materialization delays.

The submission of database changes to ADTPRC could occur when the DP2 change queue was flushed to the Audit disk process ADP (FIG. 33*b*) (320). This method adds some materialization delay. Finally, ADTPRC could wait until the DP2 change queue was written to the ADP preflush buffer (FIG. 33*a*) (330).

The above solutions will significantly reduce the incidence of data replication engine stalls due to delays in materialization. In today's prior art, the changes are not available to the replication engine until they have been flushed from ADP preflush buffers to the Audit Trail disk (340).

Section 46: Summary

Transaction-processing systems generally maintain a log of changes made to the database for recovery purposes. This transaction log can serve as a source for replicating changes to remote databases and applications. It is important that the data replication stream be in natural-flow or landed order so that the target database or the target application receives and applies changes in a correct and consistent order. That is, the sequence of changes applied by the target system should be in the same order as they were applied at the source system.

If transaction rates are high, the data replication engine may be multithreaded. Each replication thread handles a portion of the replication stream. However, transaction events flow across the different replication threads at different rates. Therefore, the events may arrive at the target system in other than natural-flow or landed order. It is one purpose of the present invention to provide a means of resynchronizing these events into natural-flow or landed order before applying them to the target database.

In order to keep up with high volumes of transactions, many transaction-oriented processing systems spread the transaction log across multiple disks or even systems. This adds significant complexity and processing time for a data replication engine to properly follow the transaction log so that changes can be replicated and applied in natural-flow or landed order. As a result, the replication engine may not be able to keep up with high replication rates because of disk-access times.

Methods described herein improve replication efficiency by providing processes to pre-fetch change blocks from the transaction log disks and to store them in memory. The data replication engine can then navigate its way through complex log structures in memory rather than on disk, allowing it to handle much higher transaction rates. Additionally, data is available in memory buffers for all replication instances to use. Data is read from disk only once and then is shared with all consumers of that data.

Another challenge is that a transaction may be distributed across multiple systems. On each system, the changes made to that system's database are recorded as an independent transaction. Prior-art replication engines replicate these transactions as independent transactions to the target system, where they are applied as such. Thus, the original transaction is lost—it appears on the target system as a set of independent transactions.

Methods are described herein for consolidating the independent transactions created by a distributed transaction into the original transaction before applying it to the target system.

The efficiency of a replication engine is impacted by the materialization delay—the time from when an update is applied to the source database to the time that it is made available to the replication engine. Other methods are described herein for reducing the materialization delay.

All of these methods may be used together to improve data replication. Methods are provided to coordinate replication between multiple replication threads. The efficiency of reading of the Audit Trail is improved by prefetching the Audit Trail contents into main memory for faster processing by multiple replication threads. Distributed transactions that are replicated independently to the target system can be reconstructed as a single transaction at the target system. The efficiency of replication can be further improved by reducing materialization delays.

The present invention may be implemented with any combination of hardware and software. If implemented as a computer-implemented apparatus, the present invention is implemented using means for performing all of the steps and functions described above.

When implemented in software, the software code can be executed on any suitable processor or collection of processors, whether provided in a single computer or distributed among multiple computers.

The present invention can also be included in an article of manufacture (e.g., one or more computer program products) having, for instance, non-transitory, tangible computer readable storage media. The storage media has computer readable program code stored therein that is encoded with instructions for execution by a processor for providing and facilitating the mechanisms of the present invention. The article of manufacture can be included as part of a computer system or sold separately.

The storage media can be any known media, such as computer memory, one or more floppy discs, compact discs, optical discs, magnetic tapes, flash memories, circuit configurations in Field Programmable Gate Arrays or other semiconductor devices, or other tangible computer storage medium. The storage media can be transportable, such that the program or programs stored thereon can be loaded onto one or more different computers or other processors to implement various aspects of the present invention as discussed above.

The computer(s) used herein may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable, mobile, or fixed electronic device.

The computer(s) may have one or more input and output devices. These devices can be used, among other things, to present a user interface. Examples of output devices that can be used to provide a user interface include printers or display screens for visual presentation of output and speakers or other sound generating devices for audible presentation of output.

Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

The various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

The terms "program" or "software" are used herein in a generic sense to refer to any type of computer code or set of computer-executable instructions that can be employed to program a computer or other processor to implement various aspects of the present invention as discussed above. The computer program need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, and the like, that perform particular tasks or implement particular abstract data types. The functionality of the program modules may be combined or distributed as desired in various embodiments.

Data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Preferred embodiments of the present invention may be implemented as methods, of which examples have been provided. The acts performed as part of the methods may be ordered in any suitable way. Accordingly, embodiments may be constructed in which acts are performed in an order different than illustrated, which may include performing some acts simultaneously, even though such acts are shown as being sequentially performed in illustrative embodiments.

It will be appreciated by those skilled in the art that changes could be made to the embodiments described above without departing from the broad inventive concept thereof. It is understood, therefore, that the present invention is not limited to the particular embodiments disclosed, but it is intended to cover modifications within the spirit and scope of the present invention.

What is claimed is:

1. A method of source-side merging of distributed transactions prior to replication in a transaction processing system that includes a plurality of nodes and a replication engine, wherein a distributed transaction occurs at a plurality of the nodes, a first node on a source system of the transaction processing system including (i) a database, (ii) an audit trail that stores database change events from the database of the first node, and (iii) an audit trail reader, and one or more other nodes on the source system each including (i) a database, (ii) an audit trail that stores database change events from the database of the respective node, and (iii) a daemon that receives the database change events from the audit trails of their respective nodes, the method comprising:

(a) initiating a distributed transaction in the transaction processing system which updates the database of the first node and the database at one or more of the other nodes;

(b) capturing the database updates in the audit trails of the respective nodes involved with the distributed transaction;

(c) the first node on the source system receiving and merging the database change events from the audit trails of each of the nodes involved in the distributed transaction; and (d) replicating the merged database change events via the replication engine to a target system of the transaction processing system only from the first node on the source system, wherein the audit trail reader sends requests to the respective daemons to send the database change events from the audit trails of each of the nodes involved in the distributed transaction to the first node on the source system for use in the merging, and wherein the first node on the source system receives the database change events from the audit trails of each of the nodes involved in the distributed transaction via the daemons of the respective nodes.

2. The method of claim 1 wherein the first node on the source system is a root node for the distributed transaction and the one or more other nodes on the source system are subordinate nodes for the distributed transaction.

3. The method of claim 1 wherein the merged database change events are in natural-flow order.

4. The method of claim 1 wherein the merged database change events are in landed order.

5. The method of claim 1 wherein merging the database change events from the audit trails of each of the nodes involved in the distributed transaction uses memory buffers.

6. A transaction processing system for source-side merging of distributed transactions prior to replication, wherein a distributed transaction occurs at a plurality of nodes, the transaction processing system comprising:

(a) a first node on a source system of the transaction processing system including:
(i) a computer database,
(ii) an audit trail that stores computer database change events from the computer database of the first node, and
(iii) an audit trail reader;

(b) one or more other nodes on the source system each including:
(i) a computer database,
(ii) an audit trail that stores computer database change events from the computer database of the respective node, and
(iii) a daemon that receives the computer database change events from the audit trails of their respective nodes;

(c) a computer-executable application that initiates a distributed transaction in the transaction processing system which updates the computer database of the first node and the computer database at one or more of the other nodes, wherein the computer database updates are captured in the audit trails of the respective nodes involved with the distributed transaction;

(d) a computer-executable component included only in the first node on the source system that merges computer database change events from the audit trail of the first node on the source system and audit trails of the respective other nodes involved with the distributed transaction; and (e) a replication engine that receives the merged computer database change events from the computer-executable component and replicates the merged computer database change events to a target system only from the first node on the source system, wherein the audit trail reader sends requests to the respective daemons to send the computer database change events from the audit trails of each of the nodes involved in the distributed transaction to the first node on the source system for use in the merging, and wherein the first node on the source system receives the computer database change events from the audit trails of each of the nodes involved in the distributed transaction via the daemons of the respective nodes.

7. The system of claim 6 wherein the first node, on the source system is a root node for the distributed transaction and the one or more other nodes on the source system are subordinate nodes for the distributed transaction.

8. The system of claim 6 wherein the merged computer database change events are in natural-flow order.

9. The system of claim 6 wherein the merged computer database change events are in landed order.

10. The system of claim 6 wherein the computer-executable component uses memory buffers.

* * * * *